(12) United States Patent
Kovacs

(10) Patent No.: US 8,561,887 B1
(45) Date of Patent: Oct. 22, 2013

(54) BANKING SYSTEM CONTROLLED RESPONSIVE TO DATA READ FROM DATA BEARING RECORDS

(75) Inventor: Douglas A. Kovacs, North Canton, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 440 days.

(21) Appl. No.: 12/925,355

(22) Filed: Oct. 20, 2010

Related U.S. Application Data

(60) Provisional application No. 61/279,534, filed on Oct. 21, 2009.

(51) Int. Cl.
*G06F 19/00* (2011.01)
*G06Q 40/00* (2012.01)

(52) U.S. Cl.
USPC .......... 235/379; 705/35; 705/39; 705/43

(58) Field of Classification Search
USPC .......... 235/379, 375; 705/16, 17, 43, 35, 39; 902/8, 22, 23, 30
See application file for complete search history.

(56) References Cited

U.S. PATENT DOCUMENTS 8,181,857 B1 * 5/2012 Lute et al. ............ 235/379
8,342,398 B2 * 1/2013 Douglass et al. ......... 235/379

* cited by examiner

*Primary Examiner* — Thien M Le
*Assistant Examiner* — April Taylor
(74) *Attorney, Agent, or Firm* — Ralph E. Jocke; Daniel D. Wasil; Walker & Jocke

(57) ABSTRACT

An automated banking machine operates responsive to data bearing records. The automated banking machine includes a card reader that reads card data from a user card. The read card data corresponds to a financial account and is used to authorize the machine user to carry out a transaction on the financial account. The automated banking machine includes a display and a printer to produce records of a financial transaction carried out with the card reader. The automated banking machine also includes a validator arrangement including a currency note validator which reads data from a currency note in determining validity of the note. The note validator, while remaining supported by the machine, is slidable to extend outside of the machine where it can be pivoted to an orientation at which it can be serviced.

20 Claims, 36 Drawing Sheets

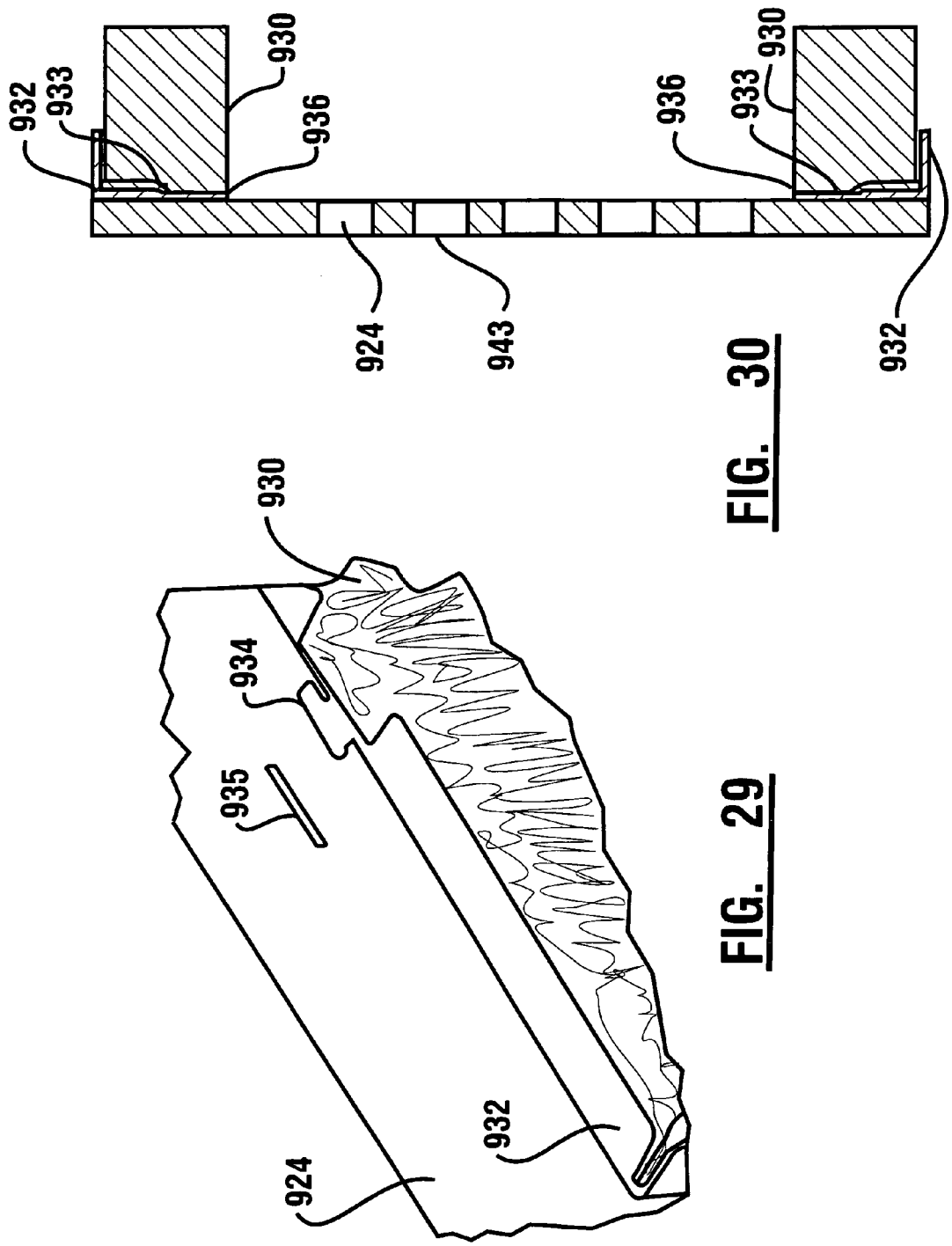

BANKING SYSTEM CONTROLLED RESPONSIVE TO DATA READ FROM DATA BEARING RECORDS

CROSS REFERENCE TO RELATED APPLICATION

This application claims benefit pursuant 35 U.S.C. §119(e) of U.S. Provisional Application 61/279,534 filed Oct. 21, 2009.

TECHNICAL FIELD

This invention relates to automated banking machines that operate responsive to data read from user cards and which may be classified in U.S. Class 235, Subclass 379.

BACKGROUND OF INVENTION

Automated banking machines may include a card reader that operates to read data from a bearer record such as a user card. Automated banking machines may operate to cause the data read from the card to be compared with other computer stored data related to the bearer or their financial accounts. The machine operates in response to the comparison determining that the bearer record corresponds to an authorized user, to carry out at least one transaction which may be operative to transfer value to or from at least one account. A record of the transaction is often printed through operation of the automated banking machine and provided to the user. A common type of automated banking machine used by consumers is an automated teller machine (ATM) which enables customers to carry out banking transactions. Automated banking machines may be used to carry out transactions such as dispensing cash, the making of deposits, the transfer of funds between accounts, and account balance inquiries. The types of banking transactions that a customer can carry out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine, automated transaction machine, or an ATM shall be deemed to include any machine that may be used to electronically carry out transactions involving transfers of value.

Automated banking machines may benefit from improvements.

OBJECTS OF EXEMPLARY EMBODIMENTS

It is an object of an exemplary embodiment to provide a banking system apparatus that is operated responsive to data bearing records.

It is an object of an exemplary embodiment to provide an automated banking machine.

It is a further object of an exemplary embodiment to provide an automated banking machine that has an attractive appearance.

It is a further object of an exemplary embodiment to provide an automated banking machine which is more readily serviced.

It is a further object of an exemplary embodiment to provide an automated banking machine which is more readily manufactured.

It is a further object of an exemplary embodiment to provide a method for more efficiently manufacturing an automated banking machine.

It is a further object of an exemplary embodiment to provide a method for servicing an automated banking machine which requires less space for servicing.

It is a further object of an exemplary embodiment to provide a method for servicing an automated banking machine which provides improved access for servicing of internal components.

It is a further object of an exemplary embodiment to provide a method for servicing an automated banking machine which provides more efficient servicing of internal components.

Further objects of exemplary embodiments will be made apparent in the following Detailed Description of Exemplary Embodiments and the appended claims.

The foregoing objects are accomplished in an exemplary embodiment by an automated banking machine which includes a top housing bounding an interior area. The automated banking machine includes a card reader that reads data from user cards. The data read from user cards is used to enable the machine to carry out financial transactions. The top housing defines a front opening to the interior area and may define a rear opening into the interior area. The top housing is mounted above a secure enclosure which is alternatively referred to herein as a chest or safe. The top housing may further include at least one wall, the at least one wall formed to include one or more housing vents operative to enable air to pass therethrough. Such housing vents enable the movement of air, for example, to assist in removing heat generated by components within the housing.

The top housing houses upper banking machine components which may include, for example, a display, the card reader, a receipt printer, a keypad, a camera, controllers, processors, including computer processors, actuators, sensors, and other devices. As used herein "keypad" means input keys whether arranged in a keypad arrangement, keyboard arrangement, or otherwise, and the designations are interchangeable unless expressly identified as being used in a restricted manner. The banking machine components may be further enclosed within a case. The case may be formed to include one or more component case vents operative to enable air to pass therethrough. The processor, for example, may be further enclosed in a processor case with processor case vents. Such processor case vents enable the movement of air, for example, to assist in removing heat generated by processor components. The chest houses lower banking machine components which may include, for example, a currency dispenser mechanism, a currency recycler, a secure deposit holding container and other devices.

The exemplary automated banking machine includes an upper fascia, preferably secured by a lock, moveably mounted in supporting connection with the top housing and adapted to selectively cover the front opening. In one embodiment, the upper fascia is operatively supported by the top housing through two horizontally disposed members. In one embodiment, the two horizontally disposed members are slideable. In one embodiment, the upper fascia includes a rearwardly extending projection which selectively overlies a forward region of the top housing adjacent the front opening to provide an attractive appearance to the machine. In one embodiment, the upper fascia is movable from a first position where the upper fascia covers the front opening, and a second position where the fascia is disposed away from the front opening.

In addition to the top housing including banking machine components, the upper fascia may have supported thereon, for example, banking machine components such as those exemplary components listed herein above.

The top housing may include, for example, a moveable rear panel, preferably secured by a lock, moveably mounted in supporting connection with the top housing and adapted to selectively cover a top housing rear opening. In one embodiment, the moveable rear panel is operatively supported by the top housing through two horizontally disposed members. In one embodiment, the two horizontally disposed members are slideable. In one embodiment, the moveable rear panel is movable from a first position where the rear panel covers the rear opening, and a second position where the rear panel is disposed away from the rear opening.

In a further exemplary embodiment, the moveable rear panel may have supported thereon, for example, banking machine components such as those exemplary components listed herein above.

A lower fascia is movably mounted in supporting connection with the chest. The lower fascia of an exemplary embodiment is selectively movable between a covering position where the lower fascia covers a closed chest door and an accessible position where the lower fascia is disposed away from the closed chest door.

The lower fascia includes first and second side extensions so that when the lower fascia is in the covering position the first and second side extensions respectively cover forward portions of the first and second side walls of the chest housing.

In one exemplary embodiment, a rollout tray is moveably mounted in supporting connection with the top housing. Several of the upper banking machine components may be supported on the rollout tray. Additionally, the upper fascia may be mounted to the rollout tray. The rollout tray is movable between a retractable position where the rollout tray is in the interior area and an extended position where the rollout tray extends from the front opening. When the rollout tray is in the retracted position, the upper fascia selectively covers the front opening. When the rollout tray is in the extended position, the banking components mounted thereon may be more readily serviced.

The chest of the exemplary embodiment includes a door selectively movable between a closed position and an open position. In one embodiment, when the lower fascia is in the accessible position and the chest door is in the open position, the lower fascia is adapted to engage the chest door to retain the door in the open position. The lower fascia is adapted for movement away from the chest door in order to release the door from engagement with the lower fascia.

In one exemplary embodiment, the chest housing includes a first opening at a first end thereof and a second opening at a second end thereof. Thus, a master ATM chest housing may be used in either front-load or rear-load ATM. A first chest door is an operable door and is adapted for selectively closing the first opening. A locking bolt mechanism is carried on the operable chest door.

A second chest door, not generally used during regular operation of the automated transaction machine, can be adapted to semi-permanently close the second opening. An alternate securing mechanism, such as bolts or other fasteners, may be used to semi-permanently engage the second chest door with the housing. As a result, the functional uses of the first and second chest doors can be selected so that the second chest door becomes the operational door, and the other door is securely mounted in a fixed position.

In one exemplary embodiment, a processor case housing the primary processor for the automated transaction machine, is rotationally mounted in supporting connection with the chest. The processor case is adapted for rotational movement between an operational position and a service position. In the operational position, a first functional side of the processor case faces a side wall of the top housing. In the service position, the first functional side of the processor case faces a front opening of the top housing.

In one embodiment, a rollout tray, supporting several upper banking machine components, is movable from a retracted position to an extended position to allow the processor case to rotate into the service position. In the service position, cables, connections, and other components, including one or more processors, are accessible for servicing.

In another exemplary embodiment, a top housing cover is mounted in slidable supporting relationship with the chest housing. Several upper banking machine components may be supported on a mounting tray equipped with side flanges. The top housing cover may include channel members for slidable engagement with the side flanges. The upper banking machine components may be accessed for servicing by rearwardly sliding the top housing cover. A plurality of fasteners and/or locking mechanisms may be employed to secure the top housing cover in an operational position. Alternately, the mounting tray may include channel members for slidable engagement with flange members carried on the top housing cover.

In another embodiment, a duct is operatively mounted between at least one component case vent and at least one housing vent. The duct is operative to enable air to pass therethrough. In another embodiment, a duct frame is operatively mounted to the duct. In another embodiment, the frame is secured to the duct with adhesive. In another embodiment, the frame is operatively mounted to the component case. In another embodiment, the frame includes at least one hook portion and the component case includes at least one slot and the hook portion engages and cooperates with the slot to releasibly engage the duct to the component case. In another embodiment, the frame includes at least one tab portion and the component case includes at least one fastener hole. At least one fastener is in operative connection with the tab and cooperates with and engages the hole to secure the duct to the component case.

In another embodiment, the duct comprises a deformable resilient material and is operatively engaged with the component case with adhesive. In other embodiments the duct is engaged with the housing. In another embodiment, the adhesive is releasable, resealable, or a combination thereof. In another embodiment, the frame is secured to the duct with adhesive and the duct is secured to the component case, the frame held between the duct and the case.

In another embodiment, a method is provided comprising moving a fascia from a position adjacent an opening to an interior of a housing of an automated banking machine to a position away from the opening, wherein the fascia is in operatively-supported connection with the housing, and wherein the automated banking machine includes a card reader operative to read indicia corresponding to financial accounts on user cards, a printer operative to print information corresponding to financial accounts and financial transactions, a cash dispenser, at least one housing wall, the at least one housing wall including at least one housing vent operative to enable air to pass therethrough, a component case in operatively-supported connection with the housing, the component case including at least one component case vent formed therein, the at least one component case vent is operative to enable air to pass therethrough, and a duct assembly operatively disposed between the at least one component case vent and the at least one housing vent, the duct assembly operative to enable air to pass therethrough. The duct assembly is at least partially secured to the component case with a releasable resealable adhesive. The method further comprises moving the component case from a position within the interior of the housing to a position at least partially extending through the opening, releasing the duct assembly from the component case, servicing a component at least partially contained within the component case, adhering the duct assembly to the component case, moving the component case from the position at least partially extending through the opening to the position within the interior of the housing, and moving the fascia from the position away from the opening to the position adjacent to the opening. In a further embodiment, the duct is deformable with releasable resealable adhesive secured thereto and the duct is deformed against the component case, whereby the duct adheres to the case. In a further embodiment, the duct assembly further comprises a duct frame having at least one hook portion and the component case further comprises at least one slot and the at least one hook portion is engageable with the at least one slot. In a further embodiment, the duct assembly further comprises a duct frame having at least one tab portion and at least one fastener capable of being placed in operative connection with the tab portion and the component case further includes at least one fastener hole and the duct assembly is secured to the component case by mating the at least one fastener with the at least one fastener hole.

In another embodiment, a method is provided comprising mounting a housing in supporting connection with a chest adapted for use in an automated banking machine, wherein the housing includes an interior area, at least one opening into the interior area, and at least one wall, the at least one wall including at least one housing vent formed therein, the at least one housing vent operative to enable air to pass therethrough. The method further includes installing a card reader in operative-supported connection with the housing, wherein the card reader is operative to read indicia on user cards corresponding to financial accounts, installing a display in operatively-supported connection with the housing, installing a cash dispenser in operatively-supported connection with the housing, installing a component case in operatively-supported connection with the housing, the component case including at least one component case vent formed therein, the at least one component case vent operative to enable air to pass therethrough, and adhering a duct assembly to the component case, the duct assembly including a duct operative to enable air to pass therethrough. In a further embodiment, the duct assembly further includes a frame, the frame including at least one hook portion and the component case further includes at least one slot, the at least one slot adapted to accept the at least one hook portion, the method further comprising adhering the frame to the duct. In a further embodiment, the duct assembly further includes a frame, the frame including at least one tab portion, and a fastener capable of being placed in operative connection with the tab portion, and the component case further includes at least one fastener hole, the method further comprising securing the duct assembly to the component case with the fastener cooperating with the fastener hole.

In a further exemplary embodiment, an automated banking machine comprises a secure enclosure, including a chest, a housing in operatively supported connection with the chest and including an interior and at least one opening, a card reader in operatively supported connection with the housing, the card reader operative to read indicia on user cards corresponding to financial accounts, a display in operatively supported connection with the housing, a cash dispenser in operatively supported connection with the housing, and a fascia assembly in operatively supported connection with the housing and moveable between a secure closed position adjacent the housing opening, at least a portion of the housing opening covered by the fascia assembly, and a released away position, the fascia assembly at least partially separated from the housing opening. The fascia assembly comprises a fascia frame and a fascia cover in operatively supported connection with the fascia frame. The automated banking machine further comprises a support in operatively supported connection with the housing and moveable between a position substantially within the interior of the housing and a position wherein at least a portion of the support is extended through the housing opening, and wherein at least one of the fascia frame and the support comprises at least a first hook and the other comprises at least a first slot, the at least first hook and the at least first slot formed to engage each other, and the fascia assembly is mounted to the support with the at least first hook engaged with the at least first slot.

In a further exemplary embodiment, the automated banking machine further comprises an at least first tab adjacent the at least first slot, the at least first tab formed to guide the at least first hook into the at least first slot. In a further exemplary embodiment, the support is slideably mounted to the housing.

In a further exemplary embodiment, a method is provided for manufacturing an automated banking machine. The method comprises mounting a housing in supporting connection with a chest adapted for use in an automated banking machine, the housing comprising an interior and at least one opening into the interior. Installing a card reader in operatively supported connection with the housing, wherein the card reader is operative to read indicia on user cards corresponding to financial accounts. Installing a display in operatively supported connection with the housing. Installing a cash dispenser in operatively supported connection with the housing. Installing a support in operatively supported connection with the housing, the support moveable between a position substantially within the interior area of the housing and a position wherein at least a portion of the support is extended through the housing opening. Mounting a fascia assembly to the support, the fascia assembly comprising a fascia frame and a fascia cover in operatively supported connection with the fascia frame. At least one of the fascia frame and the support comprises at least a first hook and the other comprises at least a first slot, the at least first hook and the at least first slot formed to engage each other. Engaging the at least first hook with the at least first slot.

In a further exemplary embodiment, the method further comprises moving the at least first hook to an offset position relative to the at least first slot.

In a further exemplary embodiment, the method further comprises securing the fascia assembly to the support.

In a further exemplary embodiment, a method is provided for servicing an automated banking machine. The method comprises moving a fascia assembly, which is in operatively supported connection with a housing of an automated banking machine, from a secure closed position adjacent an opening to an interior of the housing to a released away position away from the opening. The automated banking machine comprises a card reader in operatively supported connection with the housing and operative to read indicia corresponding to financial accounts on user cards, a display in operatively supported connection with the housing, a printer in operatively supported connection with the housing and operative to print information corresponding to financial accounts and financial transactions, a cash dispenser in operatively supported connection with the housing, and a support in operatively supported connection with the housing, the support moveable between a position substantially within the interior of the housing and a position wherein at least a portion of the support is extended through the housing opening. The fascia assembly comprises a fascia frame and a fascia cover in operatively supported connection with the fascia frame. At least one of the fascia frame and the support comprises at least a first hook and the other comprises at least a first slot, the at least first hook and the at least first slot formed to engage each other. The method further comprises disengaging the at least first hook from the at least first slot, servicing at least one of a serviceable automated banking machine component, engaging the at least first hook with the at least first slot, and moving the fascia assembly from the released away position from the opening to the secure closed position adjacent the opening.

The fascia assembly may be further secured to the support with one or more fasteners and the method further comprises releasing the one or more fasteners securing the fascia assembly to the support. The method may further comprise securing the one or more fasteners securing the fascia assembly to the support.

The above-described exemplary embodiments allow ready access to the banking machine components for servicing, as well as simplifying the manufacturing and/or assembly process. The principles described may be applied to numerous automated banking machine configurations.

BRIEF DESCRIPTION OF DRAWINGS

FIG. 29 is an isometric view of a portion of a duct assembly portion and a portion of a component case portion of an automated banking machine of an exemplary embodiment illustrating the details of the duct assembly and component case.

FIG. 30 is a partial section view taken along the line 30-30 of FIG. 26.

DETAILED DESCRIPTION OF EXEMPLARY EMBODIMENTS

Figure 1:
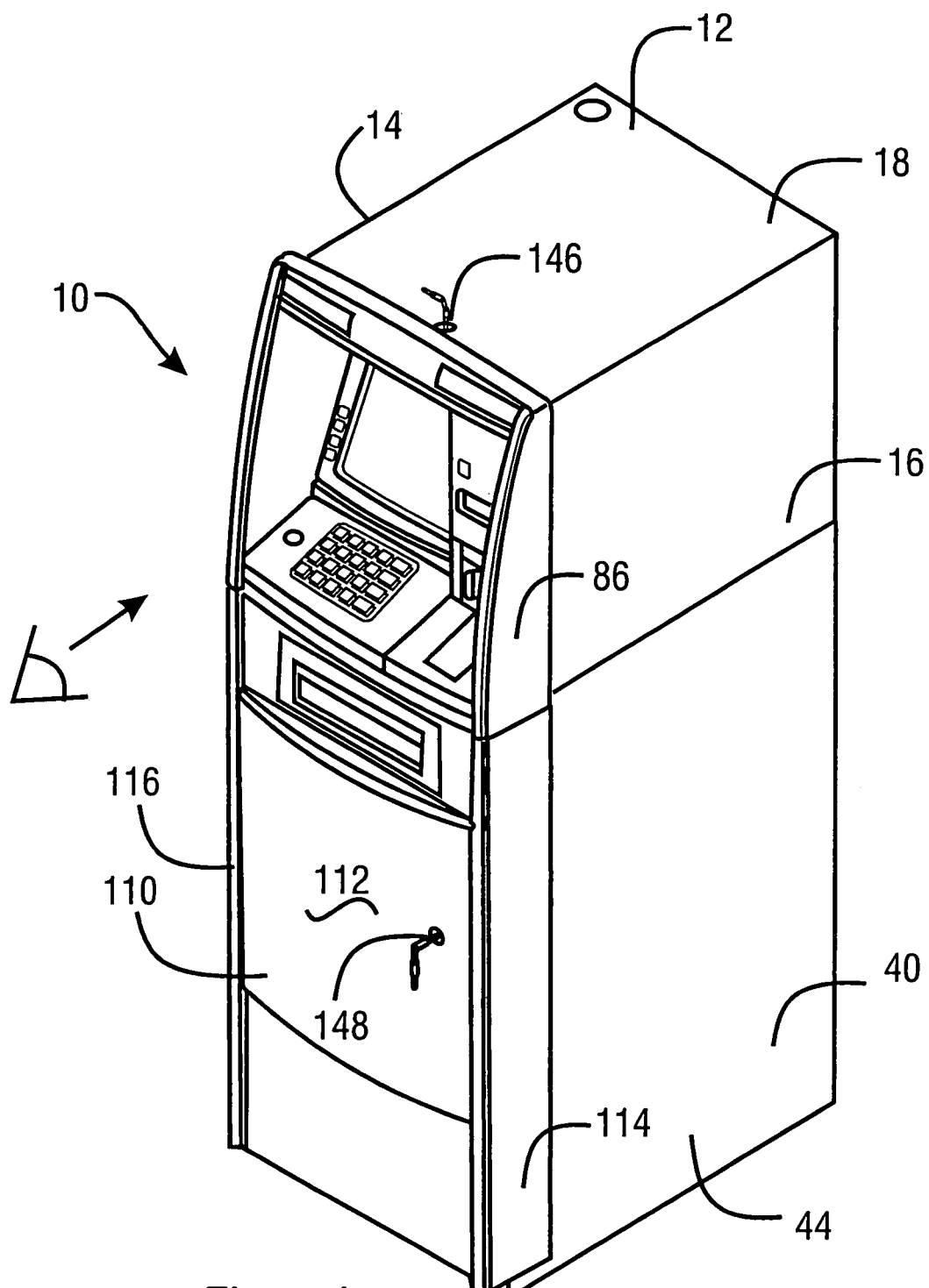
FIG. 1 is an isometric view of an automated banking machine of an exemplary embodiment.
Figure 2:
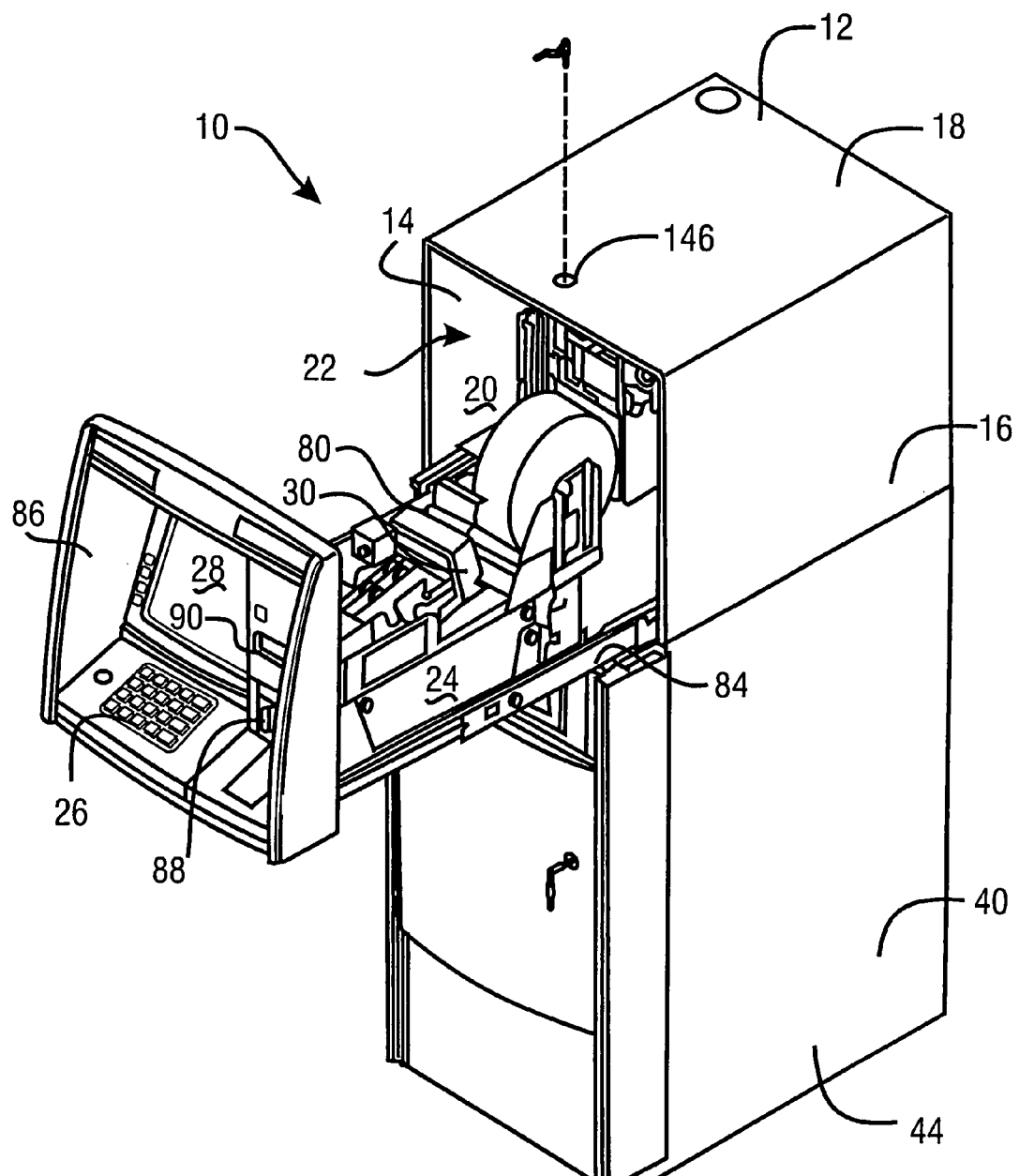
FIG. 2 is an isometric view of the automated banking machine of FIG. 1 with a rollout tray extended.

Referring now to the drawings, and particularly to FIGS. 1-2, there is shown therein an automated banking machine of a first exemplary embodiment, generally indicated 10. In this exemplary embodiment, automated banking machine 10 is an automated teller machine (ATM). ATM 10 includes a top housing 12 having side walls 14 and 16, and top wall 18. Housing 12 encloses an interior area indicated 20. Housing 12 has a front opening 22. In this exemplary embodiment, the rear of housing 12 is closed by a rear wall 19, shown in FIG. 7. However, in other embodiments, the rear of housing 12 may be accessible through an access door or similar device. Top housing 12 is used to house certain banking machine components such as input and output devices.

Figure 3:
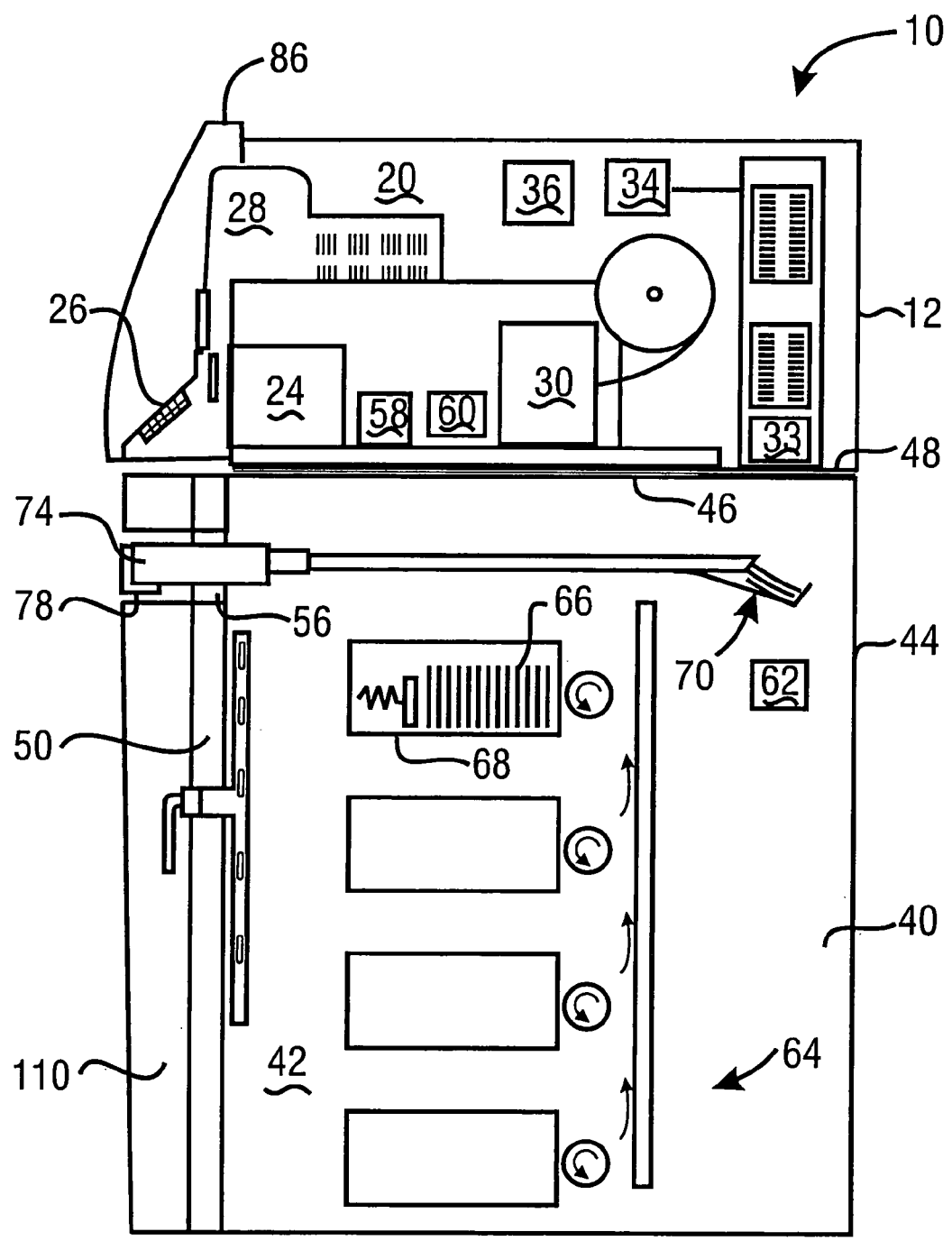
FIG. 3 is a side schematic view of an automated banking machine illustrating various banking machine components.

With reference to FIG. 3, in this exemplary embodiment the input devices include a card reader schematically indicated 24. Card reader 24 is operative to read a customer's card which includes indicia thereon. The indicia may correspond to information about the customer and/or information about a customer's financial account, such as the customer's account number. In some embodiments the card reader 24 may be a card reader adapted for reading magnetic stripe cards and/or so called "smart cards" which include a programmable memory. Other embodiments may read data from cards wirelessly such as radio frequency identification (RFID) cards. Exemplary embodiments may include features of the type discussed in U.S. Pat. No. 7,118,031 the disclosure of which is incorporated herein by reference in its entirety. Another input device in the exemplary embodiment includes input keys 26. Input keys 26 may in some embodiments, be arranged in a keypad or keyboard. Input keys 26 may alternately or in addition include function keys or other types of devices for receiving manual inputs. It should be understood that in various embodiments other types of input devices may be used such as biometric readers, speech or voice recognition devices, inductance type readers, infrared (IR) type readers, and other devices capable of communicating with a person, article or computing device, radio frequency type readers and other types of devices which are capable of receiving information that identifies a customer and/or their account.

The exemplary embodiment of machine 10 also includes output devices providing outputs to the customer. In the exemplary embodiment machine 10 includes a display 28. Display 28 may include an LCD, CRT or other type display that is capable of providing visible indicia to a customer. In other embodiments output devices may include devices such as audio speakers, radio frequency (RF) transmitters, IR transmitters or other types of devices that are capable of providing outputs which may be perceived by a user either directly or through use of a computing device, article or machine. It should be understood that embodiments may also include combined input and output devices such as a touch screen display which is capable of providing outputs to a user as well as receiving inputs.

The exemplary embodiment of the automated banking machine 10 also includes a receipt printer schematically indicated 30. The receipt printer is operative to print receipts for users reflecting transactions conducted at the machine. Embodiments may also include other types of printing mechanisms such as statement printer mechanisms, ticket printing mechanisms, check printing mechanisms and other devices that operate to apply indicia to media in the course of performing transactions carried out with the machine.

Automated banking machine 10 further includes one or more processors schematically indicated 33. Processor 33, alternately referred to as a computer or a controller, is in operative connection with at least one memory or data store which is schematically indicated 34. The processor 33 is operative to carry out programmed instructions to achieve operation of the machine in accomplishing transactions. The processor 33 is in operative connection with a plurality of the transaction function devices included in the machine.

The exemplary embodiment includes at least one communications device 36. The communications device 36 may be one or more of a plurality of types of devices that enable the machine to communicate with other systems and devices for purposes of carrying out transactions. For example, communications device 36 may include a modem for communicating messages over a data line or wireless network, with one or more other computers that operate to transfer data representative of the transfer of funds in response to transactions conducted at the machine. Alternately the communications device 36 may include various types of network interfaces, line drivers or other devices suitable to enable communication between the machine 10 and other computers and systems. Exemplary embodiments may include features like those disclosed in U.S. Pat. No. 7,266,526 the disclosure of which is incorporated herein by reference in its entirety.

ATM 10 further includes a safe or chest 40 enclosing a secure area 42. Secure area 42 is used in the exemplary embodiment to house critical components and valuable documents. Specifically in the exemplary embodiment secure area 42 is used for housing currency, currency dispensers, currency stackers, and other banking machine components. For purposes of this disclosure a cash dispenser shall include any mechanism that makes currency stored within the machine accessible from outside the machine. Cash dispensers may include features of the type disclosed in U.S. Pat. Nos. 7,261,236; 7,240,829; 7,114,006; 7,140,607 and 6,945,526 the disclosures of each of which are incorporated herein by reference in their entirety. Chest 40 includes a chest housing 44 including a top wall 46 having an upper surface 48 outside of the secure area 42. Top housing 12 is supported on the chest 40 such that the secure area 42 is generally below the interior area 20.

Chest 40 also includes a chest door 50 that is moveably mounted in supporting connection with the housing. Chest door 50, shown in the closed position in FIG. 4 and in an open condition in FIG. 5, is generally closed to secure the contents of the chest 40. In this exemplary embodiment, the chest door 50 is used to close a first opening 52 at a first end 54 of the chest housing 44. In other embodiments the chest opening and door may have other configurations. In the exemplary embodiment, chest door 50 includes a first device opening 56 therethrough and cooperates with mechanisms inside and outside the chest for passing currency or other items between a customer and devices located inside the chest 40.

Referring again to FIG. 3, machine 10 also includes a plurality of sensing devices for sensing various conditions in the machine. These various sensing devices are represented schematically by component 58 for simplicity and to facilitate understanding. It should be understood that a plurality of sensing devices is provided in the machine for sensing and indicating to the processor 33 the status of devices within the machine.

Exemplary automated banking machine 10 further includes a plurality of actuators schematically indicated 60 and 62. The actuators may comprise a plurality of devices such as motors, solenoids, cylinders, rotary actuators and other types of devices that are operated responsive to the processor 33. It should be understood that numerous components within the automated banking machine are operated by actuators positioned in operative connection therewith. Actuators 60 and 62 are shown to schematically represent such actuators in the machine and to facilitate understanding.

Machine 10 further comprises at least one currency dispenser mechanism 64 housed in secure area 42. The currency dispensing mechanism 64 is operative responsive to the processor 33 to pick currency sheets from a stack of sheets 66 housed in one or more canisters 68. The picked currency sheets may be arranged by a currency stacker mechanism 70 for presentation through a delivery mechanism 74 which operates to present a stack of note or other documents to a customer.

When chest door 50 is in the closed position, at least an end portion of a sheet delivery mechanism 74 extends through first opening 56 in the chest door 50. In response to operation of the processor 33, when a desired number of currency sheets have been collected in a stack, the stack is moved through delivery mechanism 74.

As the sheets are moved through delivery mechanism 74 toward the first opening 56, the controller 32 operates a suitable actuating device to operate a gate 78 so as to enable the stack of sheets to pass outward through the opening. As a result the user is enabled to receive the sheets from the machine. After a user is sensed as having removed the stack from the opening, the controller may operate to close the gate 78 so as to minimize the risk of tampering with the machine.

With reference to FIG. 2, in this exemplary embodiment, ATM 10 further includes a rollout tray 80. Rollout tray 80 is moveably mounted in supporting connection with slides 84. The slides 84 enable movement of the rollout tray 80 between the extended position shown in FIG. 2 and a retracted position within the interior area 20 of the top housing 12. Rollout tray 80 in the exemplary embodiment may be similar to that shown in U.S. Pat. No. 6,082,616, the disclosure of which is incorporated by reference as if fully rewritten herein.

Rollout tray 80 may have several upper banking machine components supported thereon including card reader 24, input keys 26, display 28, receipt printer 30, and other components as appropriate for the particular ATM 10.

This exemplary embodiment further includes an upper fascia 86 in supporting connection with rollout tray 80. The upper fascia 86 may include user interface openings such as a card opening 88 through which a customer operating the machine 10 may insert a credit, debit or other card, or a receipt delivery slot 90 through which printed transactions receipts may be delivered to the customer. Rollout tray 80 moveably supports upper fascia 86 relative to the top housing 12 so that upper fascia 86 is movable between a first position covering the front opening and a second position in which the upper fascia is disposed from the front opening 22.

As illustrated in FIG. 1, in the operative condition of ATM 10, the rollout tray 80 is retracted into the interior area 20 of the housing 12. Upper fascia 86 operates to close front opening 22 and provide an attractive appearance for ATM 10, while allowing a customer to input information and receive outputs from ATM 10.

Figure 6:
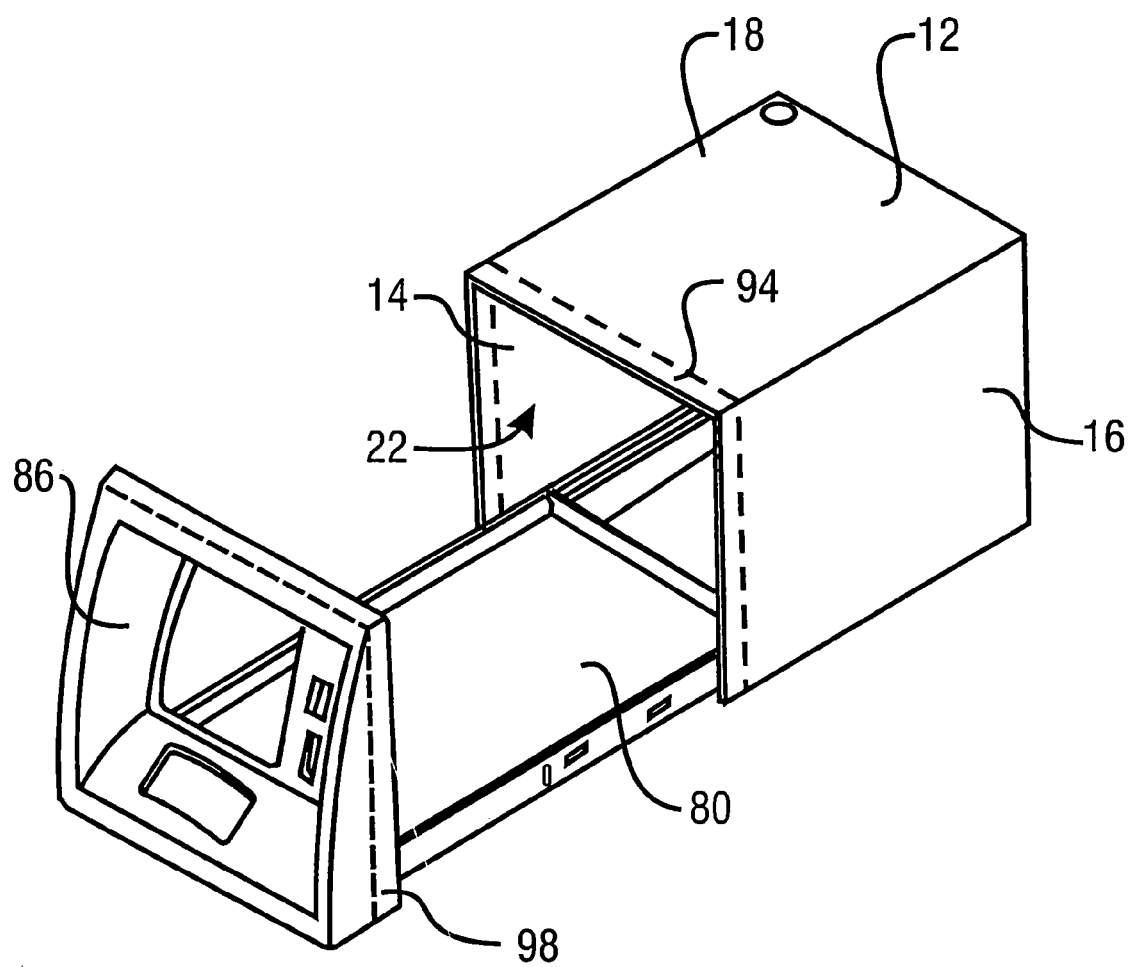
FIG. 6 is an isometric view of a top housing for an automated banking machine supporting a rollout tray in an extended position.

With reference to FIG. 6, in this exemplary embodiment, the forward-most parts of side walls 14 and 16 and top wall 18 of housing 12 define a forward region 94, shown in dashed lines, bounding the front opening 22. In this exemplary embodiment, upper fascia 86 includes a rearwardly extending portion 98, also shown in dashed lines. Rearwardly extending portion 98 is dimensioned to overlie in generally surrounding relation, the forward region 94 when rollout tray 80 is retracted and upper fascia 86 is in the first position. In some embodiments the rearwardly extending portion may be contoured or tapered so as to extend further inwardly with increasing proximity to the front of the fascia. Such tapered control may engage and help to close and/or align the fascia and the top housing 12.

Figure 7:
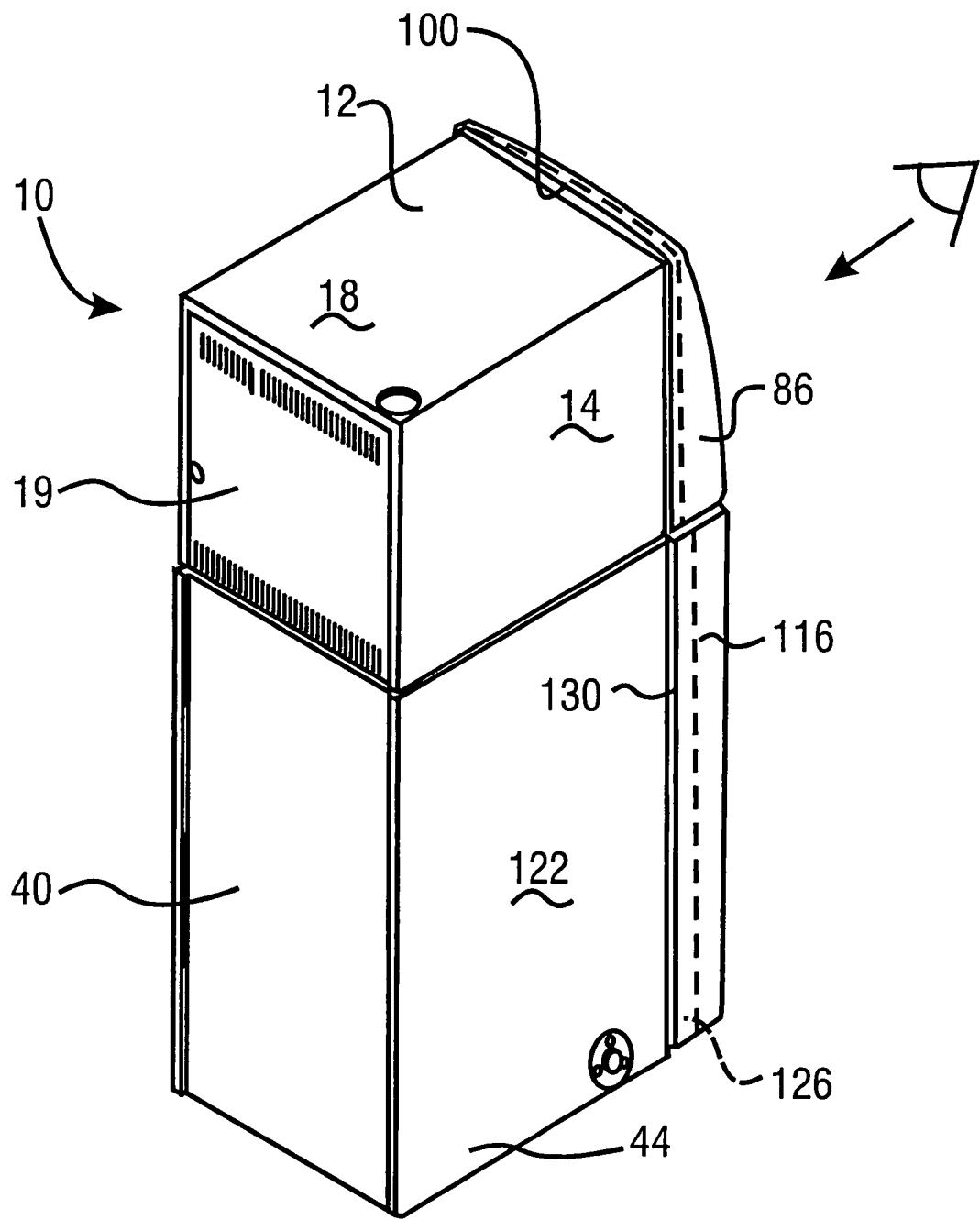
FIG. 7 is an isometric rear view of the automated banking machine of FIG. 1.

With reference to FIG. 7, when ATM 10 is viewed from the rear, there may be a first gap 100 separating the rearwardly extending portion 98 of upper fascia 86 from the top housing 12. In some embodiments it may be desirable that first gap 100 be minimal to prevent unauthorized access to interior area 20. First gap 100 in the exemplary embodiment is not visible when ATM 10 is viewed from the front.

In this exemplary embodiment, the upper fascia 86 is formed of a plastic material and the top housing 12 is formed of sheet metal. Alternately, the extending portion 98 or forward portion 94 shown in FIG. 6, or both, may include resilient materials to provide for engagement and sealing of the housing and the fascia in the closed position. However, other materials may be chosen, and these approaches are exemplary.

Figure 4:
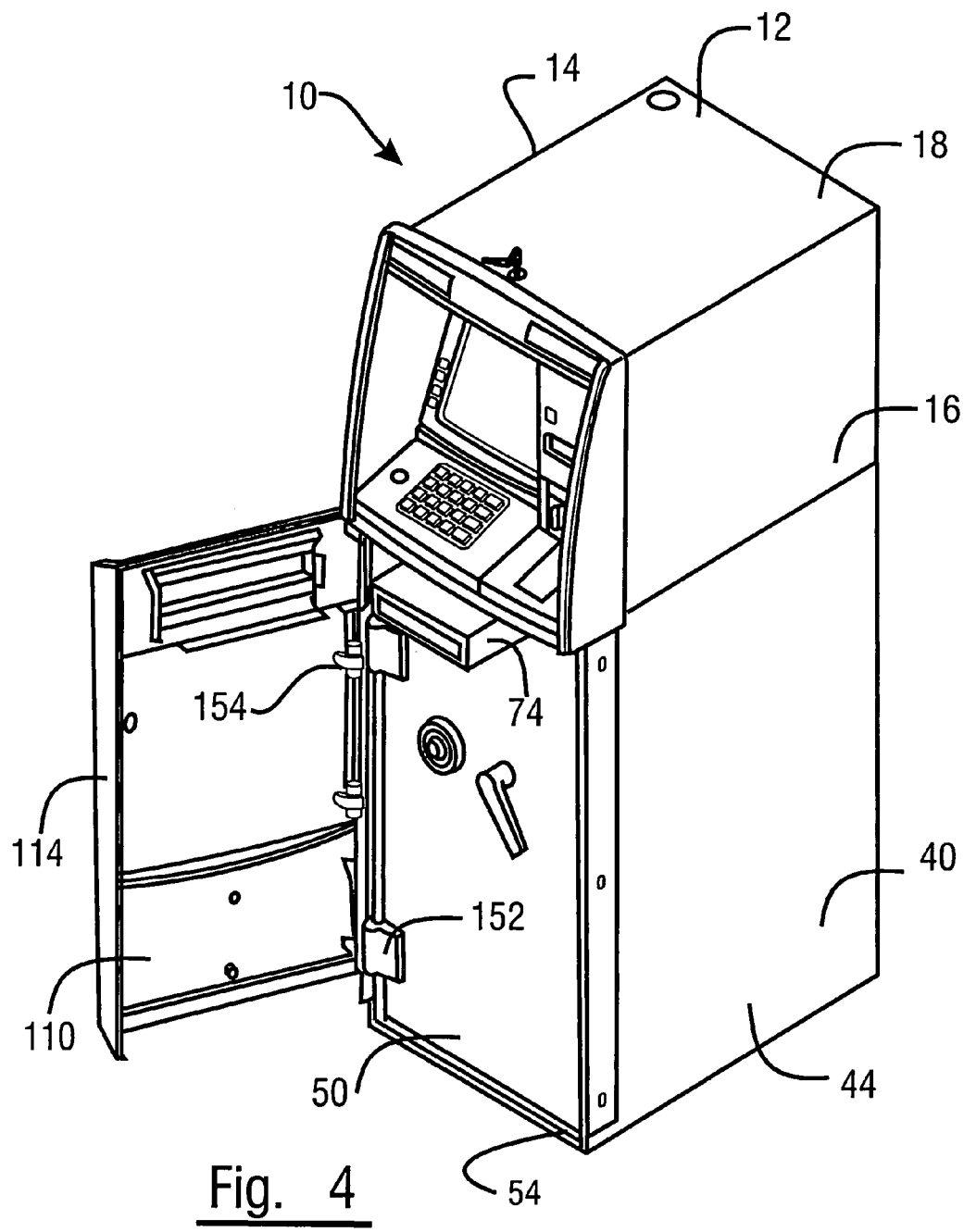
FIG. 4 is an isometric view of the automated banking machine of FIG. 1 with a lower fascia in an accessible position.
Figure 5:
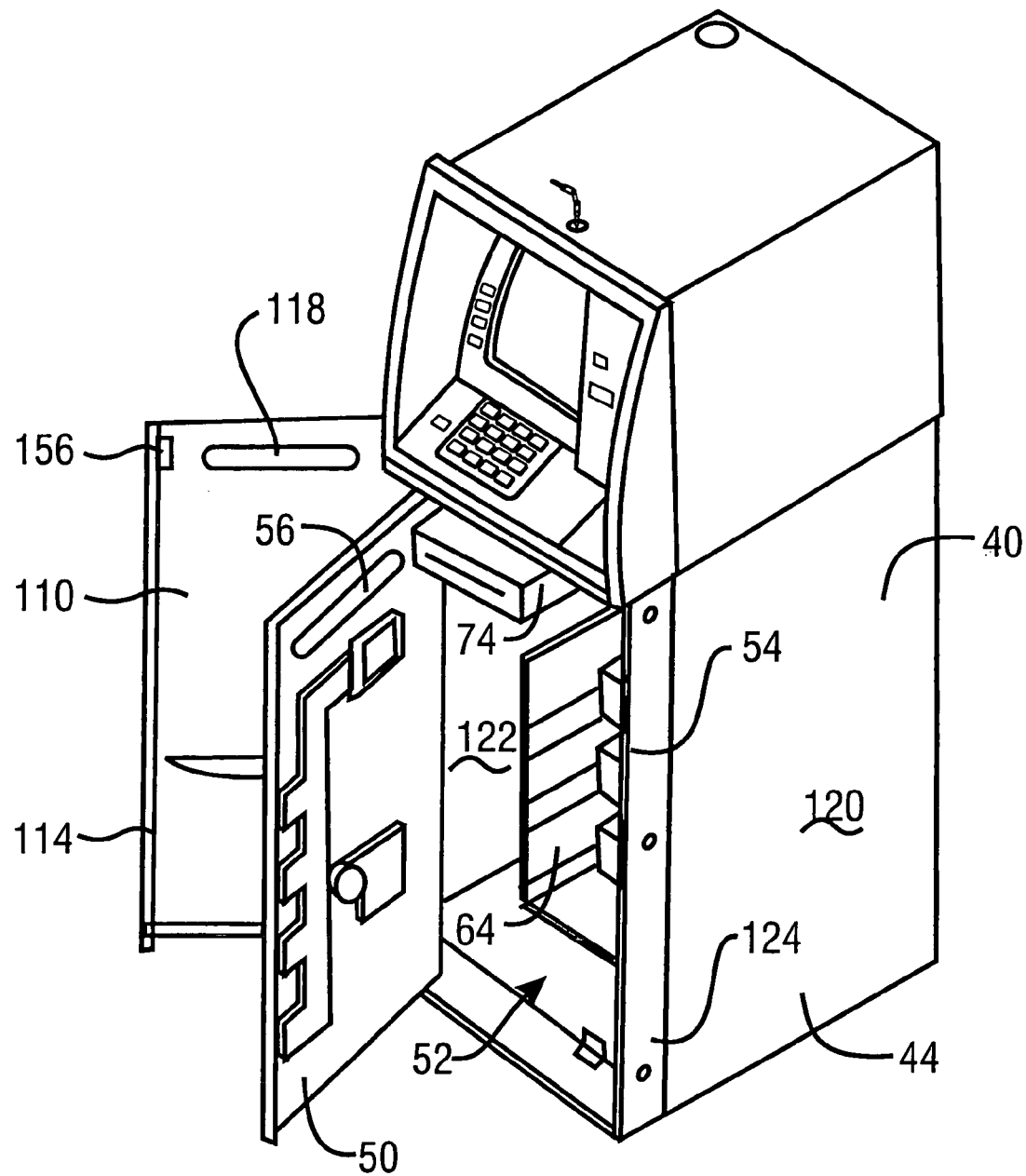
FIG. 5 is an isometric view of the automated banking machine of FIG. 1 with a lower fascia in an accessible position and a chest door in an open position.

With reference to FIGS. 1, 4 and 5, the exemplary embodiment further includes a lower fascia 110 moveably mounted on the chest housing 44. In this exemplary embodiment, lower fascia 110 is operable to move between a covering position as illustrated in FIG. 1, and an accessible position as illustrated in FIGS. 4-5. In other applications, it may be preferable to provide a selectively removable lower fascia, or other approaches to supporting the lower fascia on the chest portion.

The exemplary lower fascia 110 operates to cover the chest 40 to thereby provide a more attractive appearance to ATM 10. In the exemplary embodiment, lower fascia 110 includes a front face 112 and first and second side extensions 114, 116, respectively.

In the exemplary embodiment, illustrated in FIGS. 5 and 7, chest housing 44 includes first and second side walls 120, 122, respectively. First side wall 120 includes a forward portion 124 and second side wall includes a forward portion 126 (shown in phantom in FIG. 7). When the chest door 50 is in the closed position and the lower fascia 110 is in the covering position, the first and second side extensions 114, 116, respectively, overlie forward portions 124, 126.

Thus, when ATM 10 is viewed from the front (see FIG. 1), the lower fascia 110 covers the chest 40 from side to side. When ATM 10 is viewed from the rear (see FIG. 7), a lower gap (not shown) between the first side extension 114 and the first side wall 120 of the chest housing 44 and a lower gap 130 between the second side extension and 116 the second side wall 122 may be visible, although such lower gaps are not viewable from the front of ATM 10. In some applications, it may be desirable to minimize the lower gaps 130.

Figure 8:
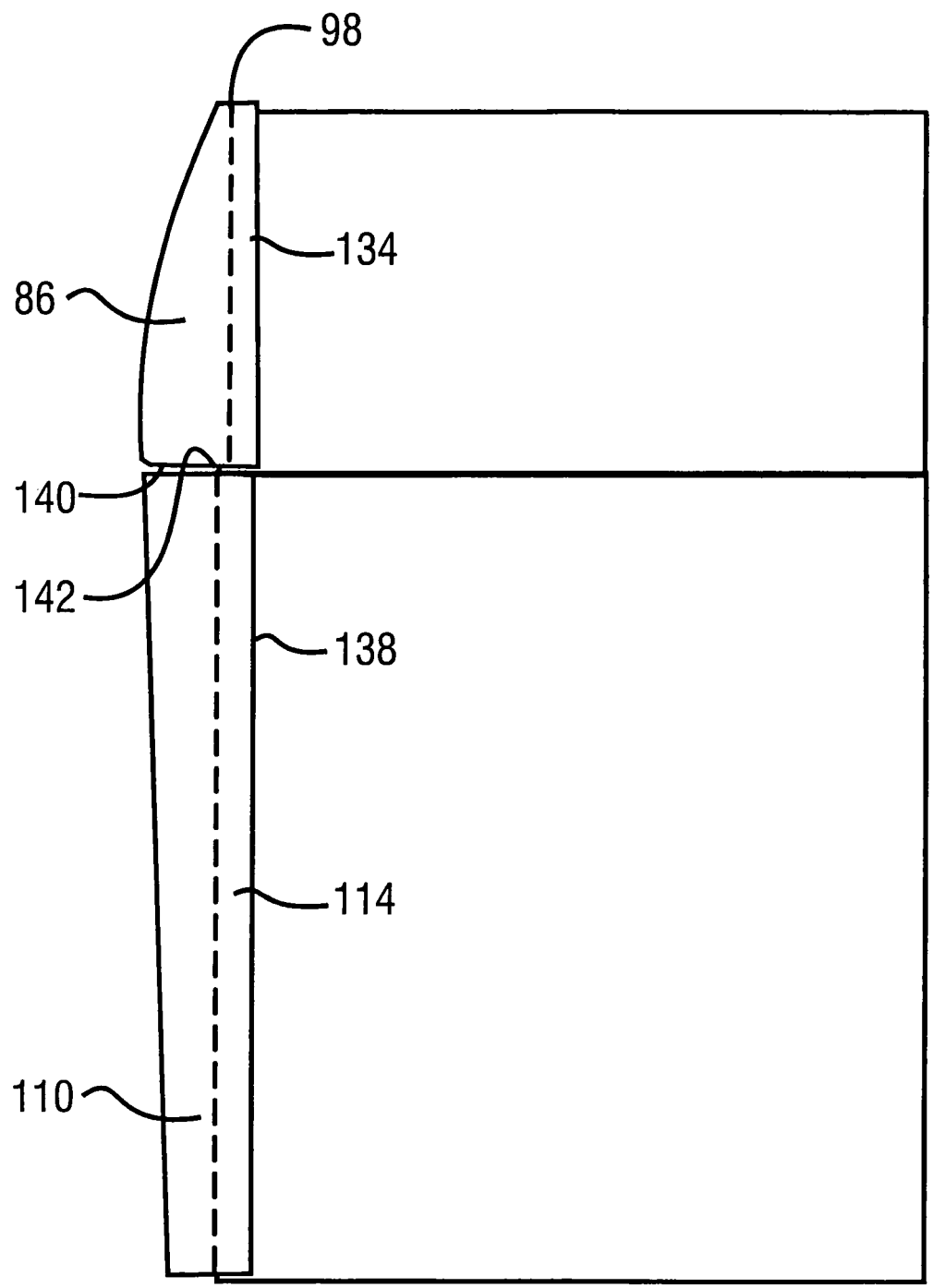
FIG. 8 is a side schematic view of an exemplary embodiment of an automated banking machine illustrating the alignment of an upper fascia and a lower fascia.

As best illustrated in FIG. 8, in the exemplary embodiment, the rearwardly extending portion 98 of upper fascia 86 includes a rearward facing end edge 134. Also, in the exemplary embodiment, first side extension 114 of lower fascia 110 includes rearward facing end edge 138. When viewed from the first side of ATM 10, in the exemplary embodiment, end edge 134 of upper fascia 86 and end edge 138 of lower fascia 110 are substantially vertically aligned along a first side of ATM 10 when the upper fascia 86 is in the first position and the lower fascia 110 is in the covering position.

With continued reference to FIG. 8, in the exemplary embodiment, upper fascia 86 is bounded by a lower surface 140. Lower fascia 110 is bounded by an upper surface 142. In the exemplary embodiment, lower surface 140 is adapted for substantial parallel horizontal alignment with upper surface 142 when the upper fascia 86 is in the first position and the lower fascia 110 is in the covering position. The alignment of the fascia surfaces presents an attractive appearance to ATM 10.

In this exemplary embodiment, the rearwardly extending portion 98 further operates to simplify the manufacture and assembly of the ATM 10. In some previous machines, it was necessary to more precisely control the alignment of the walls of the upper fascia 86 with the perimeter of the front opening. However, in this disclosed exemplary embodiment, because the rearwardly extending portion 98 overlies the forward region 94, the required precision is lessened. Further, in those embodiments which include a tapered engagement, alignment of the top housing 12 and upper fascia 86 is facilitated.

With particular reference to FIG. 5, lower fascia 110 may include an access opening 118 therein. In this exemplary embodiment, access opening 118 in the lower fascia 110 is adapted to be substantially aligned with first device opening 56 in chest door 50 when chest door is closed and lower fascia 110 is in the covering position. In this exemplary embodiment, when the chest door 50 is closed and lower fascia 110 is in the covering position, at least an end portion of sheet delivery mechanism 74 extends in the first device opening 56 in chest door 50 and access opening 118 in lower fascia 110.

As illustrated in FIGS. 1 and 2, in this exemplary embodiment, ATM 10 includes a first locking mechanism 146 for selectively retaining the rollout tray 80 in the retracted position when upper fascia 86 covers the front opening 22. The first locking mechanism may be of the type described in U.S. Pat. No. 6,082,616 the disclosure of which is incorporated herein by reference in its entirety.

In the exemplary embodiment, ATM 10 also includes a second locking mechanism 148 for selectively securing lower fascia 110 in the covering position.

Figure 9:
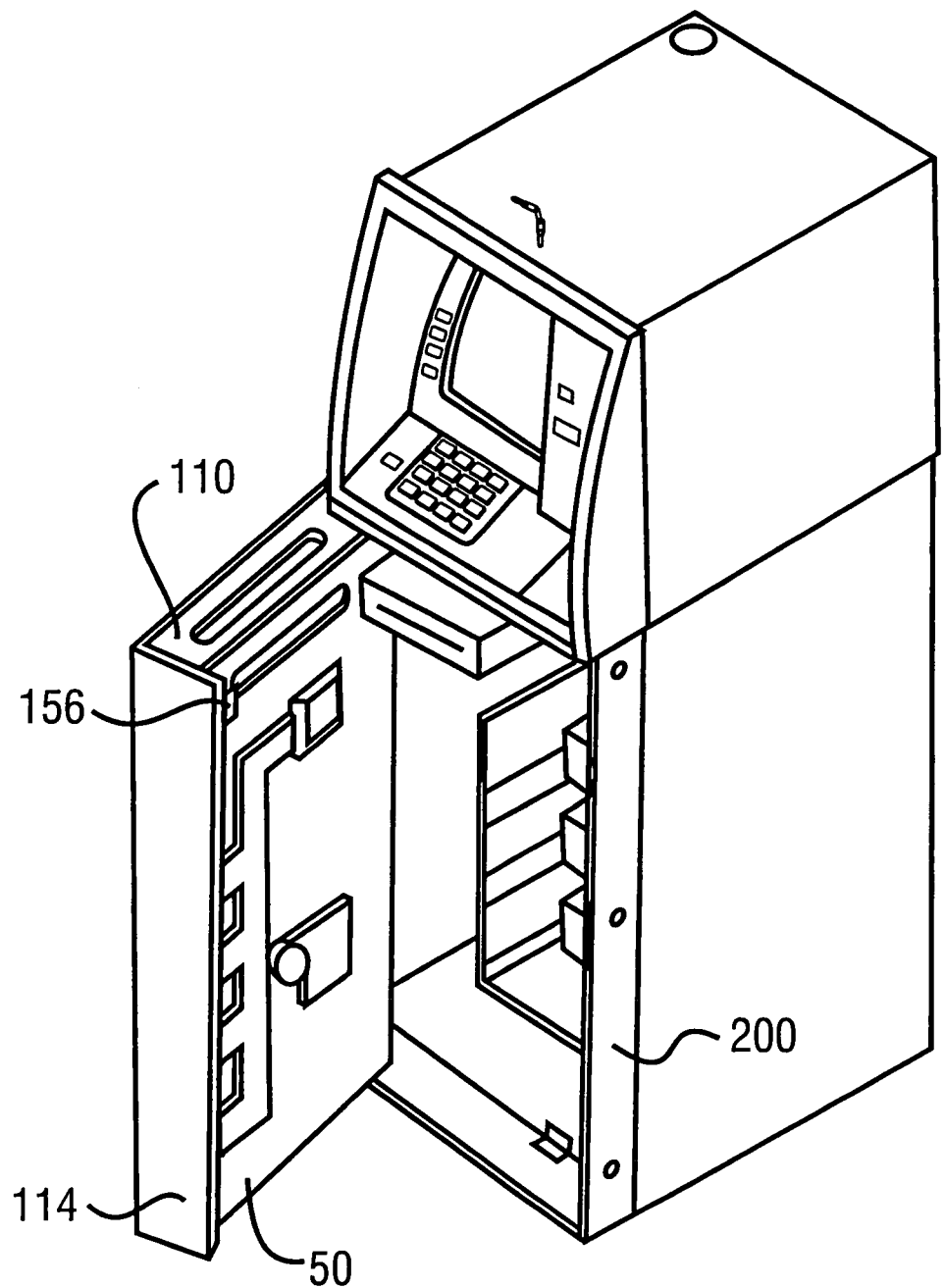
FIG. 9 is an isometric view of an automated banking machine similar to FIG. 5 showing the chest door selectively engaged with the lower fascia.

With particular reference to FIGS. 4, 5 and 9, in another exemplary embodiment ATM 10 may include a top housing 12 as previously described. ATM 10 further includes chest 40 having chest door 50 mounted to the housing 44 by one or more chest door hinge assemblies 152. Lower fascia 110 is moveably mounted to chest housing 44 by one or more fascia hinges 154. In this exemplary embodiment, fascia hinge 154 and chest door hinge assembly 152 are situated on the same side of the chest housing 44 so that lower fascia 110 and chest door 50 pivot generally in the same direction relative to the chest.

From time to time, the banking machine components enclosed within secure enclosure 42 must be accessed for replenishment or other servicing activity. Thus, lower fascia 110 may be selectively moved from a covering position into an accessible position to allow access to chest door 50. Chest door 50 may then be selectively opened.

In this exemplary embodiment, as best seen in FIG. 9, lower fascia 110 is operable to engage the open chest door 50 to prevent its movement back to a closed position. In this exemplary embodiment, lower fascia 110 includes an inwardly directed flange 156 carried on an inner surface at a side opposite the fascia hinge 154. Inwardly directed flange 156 is dimensioned to engage at least a portion of chest door 50 when the lower fascia 110 is in the accessible position and the chest door 50 is in the open position. In the exemplary embodiment, lower fascia 110 is adapted to pivot away from the chest door 50 to at least an extent where the chest door may be disengaged from inwardly directed flange 156. Exemplary embodiments may include features of the type discussed in U.S. Pat. Nos. 7,159,767; 7,152,784; 7,000,830; and 6,871,602 the disclosures of each of which are incorporated herein by reference in their entirety.

An exemplary embodiment includes a method for accessing the contents of the secure area for servicing components housed therein or to replenish currency sheets. The method includes placing the lower fascia into an accessible position from a covering position to uncover the chest door; opening the chest door to provide access to the secure area through an opening in the chest housing; and engaging the chest door and the lower fascia to hold the chest door in an open condition. Thus a currency dispenser mechanism or other components may be accessed. Servicing the currency dispenser may include adding or removing currency sheets from operative engagement with the currency dispenser mechanism.

The method may further include engaging the chest door with an inwardly directed flange that is mounted in supporting connection with the lower fascia.

To return the ATM to an operational condition, the method includes moving the lower fascia outwardly relative to the engaged chest door to disengage the chest door; closing the chest door; and repositioning the lower fascia into the covering position.

Repositioning the lower fascia into the covering position includes overlying a first forward portion of the chest housing with a first side extension of the lower fascia and overlying a second forward portion of the chest housing with a second side extension of the lower fascia.

Prior to placing the lower fascia into the accessible position, the method includes unlocking a first locking mechanism operable to selectively retain the lower fascia in a covering position.

Figure 10:
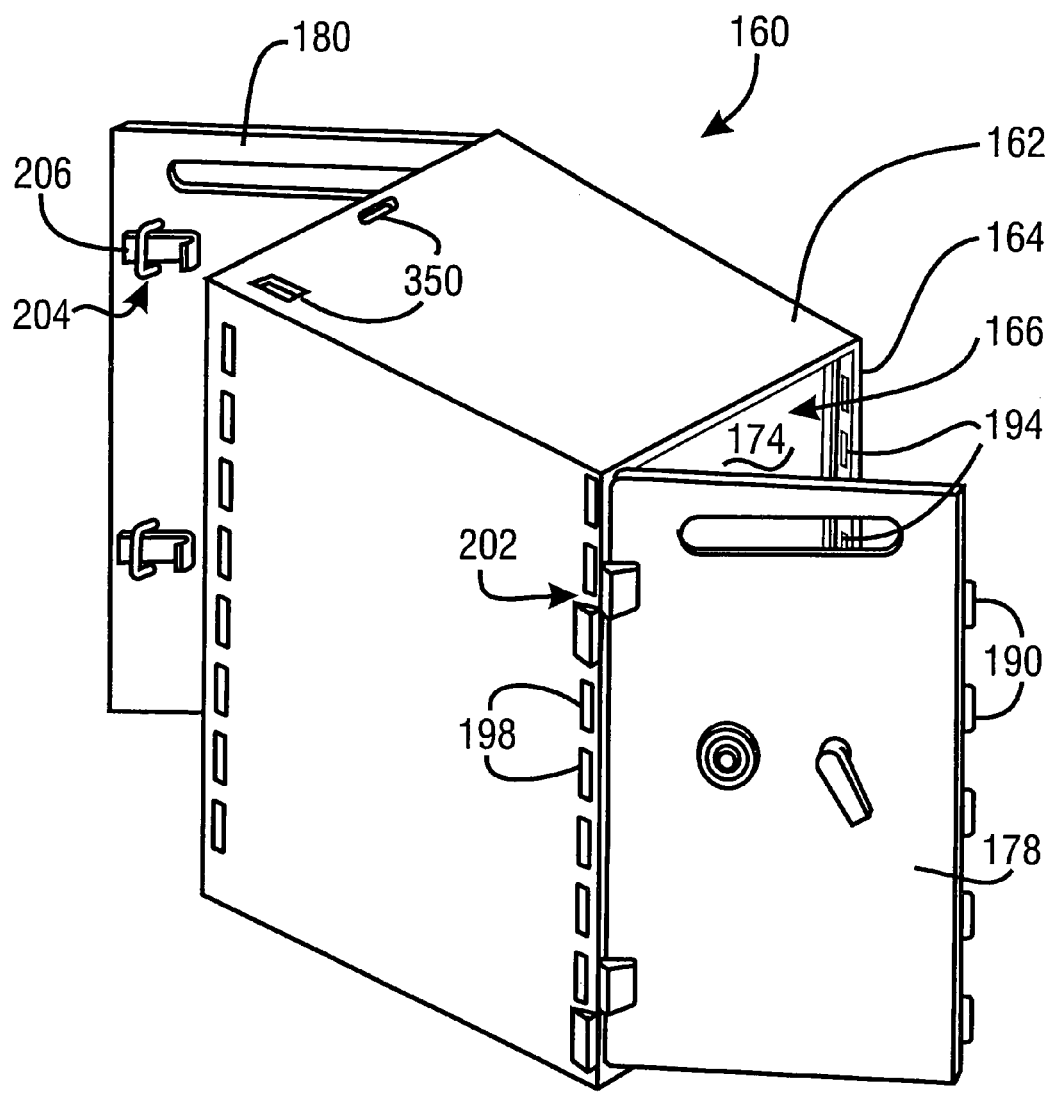
FIG. 10 is a schematic view of an alternate embodiment of a chest for an automated banking machine, as viewed from the front.
Figure 11:
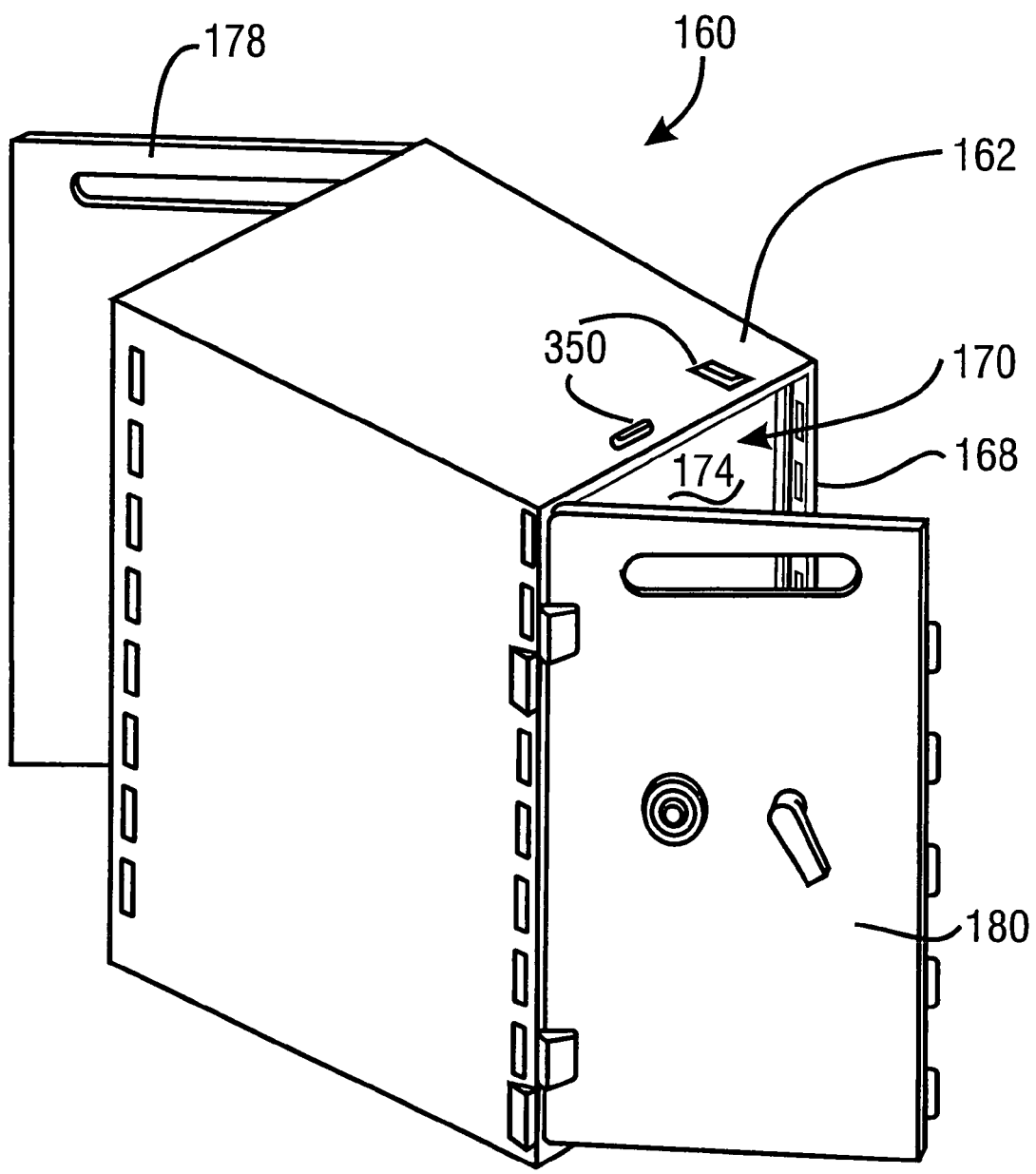
FIG. 11 is a schematic view of the alternate embodiment of the chest shown in FIG. 10, as viewed from the rear.

Some ATMs may be equipped with another exemplary embodiment of a chest or safe 160, as best seen in FIGS. 10-11. Chest 160 includes a chest housing 162 having first end 164 defining a first opening 166 therein and second end 168 defining a second opening 170 therein. The chest of this exemplary embodiment is particularly adapted for applications wherein a common chest housing can be utilized in either "front-load" ATMs or "rear-load" ATMs. By "front-load" ATM it is meant that access to a secure area 174 in an operable machine may be selectively attained from the front of the ATM, which is the same side that customers use to provide input to the machine. By "rear-load" ATM it is meant that access to the secure area 174 in an operable machine may be selectively attained from the rear of the ATM, while customer inputs are provided at the front of the ATM.

In this exemplary embodiment, chest 160 includes a first chest door 178 moveably mounted adjacent a first end 164 of chest housing 162 to selectively close the first opening 166. Chest 160 further includes a second chest door 180 moveably mounted adjacent the second end 168 to selectively close the second opening 170.

In the exemplary embodiment illustrated in FIG. 10, chest 160 is adapted for use in a front load ATM wherein under usual operating conditions, first chest door 178 is selectively movable to open or close first opening 166 to allow access to secure area 174. In this exemplary embodiment, second chest door 180 is adapted to remain closed during usual operation of the ATM, including those times when access to secure area 174 is desired. For purposes of this disclosure, the term "semi-permanently" closed is used to describe a condition of a chest door that closes an opening in the chest housing in a manner that does not readily permit access to the secure area. In this way, a "semi-permanently" closed chest door is not used as the primary means for accessing the chest interior. However, under appropriate conditions the semi-permanently closed chest door can be opened.

In this exemplary embodiment, first chest door 178 is the operable door and second chest door 180 is adapted to be semi-permanently closed. In other embodiments, for instance in rear-load ATMs, it may be desirable to utilize chest 160 as illustrated in FIG. 11 where the second chest door 180 is the operable door while first chest door 178 is adapted to be semi-permanently closed.

Figure 12:
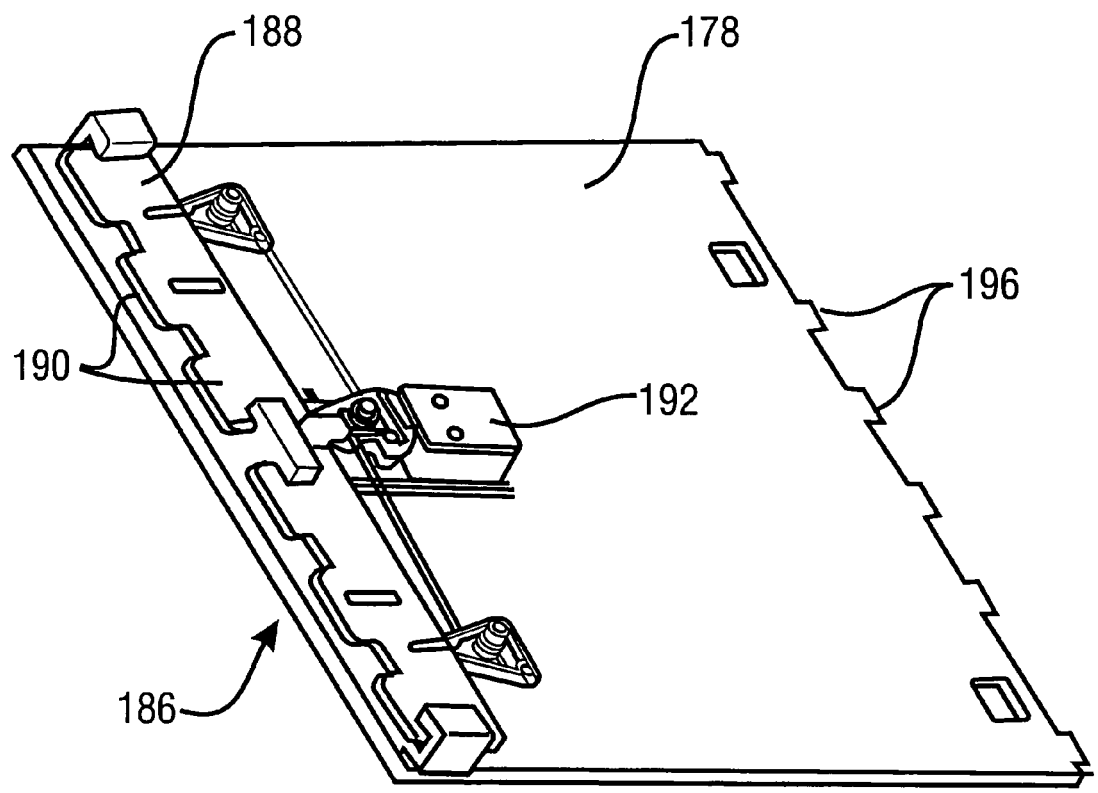
FIG. 12 is an isometric view of a chest door illustrating a locking bolt mechanism.

With particular reference to FIGS. 10 and 12, in the exemplary embodiment, the first chest door 178 is equipped with a suitable locking bolt mechanism generally denoted 186. Locking bolt mechanism 186 is operative to selectively enable securing first chest door 178 in a locked condition. Locking bolt mechanism 186 may be of the type described in U.S. Pat. No. 6,089,168 which is incorporated by reference in its entirety as if fully rewritten herein. Of course, other suitable bolt works can be utilized to accomplish the objectives.

Locking bolt mechanism 186 of the exemplary embodiment includes a locking bolt 188 which includes a plurality of locking bolt projections 190. Locking bolt 188 is mounted in operatively supported connection with an interior surface of first chest door 178 so as to be slideably movable between an extended position and a retracted position.

First chest door 178 also has a lock 192 mounted thereto. Lock 192 cooperates with locking bolt mechanism 186 so that first chest door 178 is enabled to be changed from a locked condition to an unlocked condition. As shown in FIG. 10, the chest housing 162 includes a plurality of vertically spaced locking bolt apertures 194 which are sized and positioned for accepting the locking bolt projections 190.

It will be appreciated by those skilled in the art that the locking bolt mechanism because it provides multiple places for engagement with the chest housing, achieves more secure locking of the door in the closed position than a locking bolt mechanism providing a single place for engagement with the chest housing.

In the exemplary embodiment, first chest door 178 includes a plurality of dead bolt projections 196 extending on a hinge side of the door. These dead bolt projections 196 are preferably positioned and sized to be accepted in the dead bolt apertures 198 in housing 162. As will be appreciated, the acceptance of the dead bolt projections 196 into the dead bolt apertures 198 provides enhanced security. In an exemplary embodiment, the dead bolt apertures and the locking bolt apertures are covered by trim pieces 200 (shown in FIG. 9) that extend on the outside of the housing.

With reference to FIG. 10, in the exemplary embodiment, the first chest door 178 is operably connected to the chest housing via one or more first chest hinge assemblies 202. The exemplary chest hinge assembly 202 may be of the type described in U.S. Pat. Nos. 6,089,168 and/or 7,156,297, the disclosures of which are incorporated herein in their entirety. It will be readily understood that other hinge constructions may be used in other embodiments.

In the exemplary embodiment, the second chest door 180 may be secured in a closed position by a securing mechanism that generally mirrors the locking bolt mechanism 186 and lock 192. Alternately, as illustrated in FIG. 10, second chest door 180 may be "semi-permanently" secured by an alternate securing mechanism 204. The alternate securing mechanism 204 may include a bolt member 206 or other mechanism that is less complex than the locking bolt mechanism and lock previously described. In this exemplary embodiment, routine access to the secure area 174 via second chest door 180 is not necessary during normal operation of the ATM. Thus, the alternate securing mechanism 204 is operable to "semi-permanently" engage the chest door 180. This may be done, for example, by securing the bolt with fasteners or other devices that are only accessible from within the interior of the chest portion. Of course, in some alternative embodiments both chest doors may be equipped with operational locking bolt mechanisms and locks.

The manufacture of an exemplary ATM may be simplified by use of chest 160. A common chest housing may be utilized in applications requiring a front-load ATM or a rear-load ATM. After the housing has been assembled, the positioning of a locking bolt mechanism may be chosen according to the configuration of the chest. Additionally, at a subsequent time, the operational features may be changed so that the initial operational chest door becomes the non-operational door and vice versa. Thus, the manufacturing process is simplified by the versatility of the chest housing.

Of course it will be readily appreciated that ATMs incorporating this exemplary embodiment of chest 160 may include any of the other features described elsewhere.

An exemplary embodiment includes a method for utilizing an ATM that is equipped with a chest having two opposed openings. The chest housing includes a first opening at a first end thereof and a second opening at a second opposed end. The first door is moveably mounted in supporting connection with the chest housing so that the first chest door is operative to selectively close the first opening. A second chest door is moveably mounted in supporting connection with the chest housing so that the second door is operative to semi-permanently close the second opening. At least one lower banking machine component is mounted in supporting connection with the chest housing in the secure area.

In the exemplary method, a first locking bolt mechanism in supporting connection with the first chest door is operated to selectively securely engage the first chest door with the chest housing. A first securing mechanism in supporting connection with the second chest door is operated to semi-permanently securely engage the second chest door with the chest housing.

The method includes accessing at least one lower banking machine component of an ATM through a first opening in a chest housing bounding a secure area; and preventing access to the at least one lower banking machine component through the second opening.

The method further includes replacing the first locking bolt mechanism with a second securing mechanism in supporting connection with the first chest door, wherein the second securing mechanism is operative to semi-permanently securely engage the first chest door with the chest housing; and replacing the first securing mechanism with a second locking bolt mechanism in supporting connection with the second chest door, wherein the second locking bolt mechanism is operative to selectively securely engage the second chest door with the chest housing. Thus, the door chosen as the operative door can be selected and changed.

The exemplary ATM may include a lower fascia that is mounted in supporting connection with the chest housing, wherein the lower fascia is selectively movable between a covering position and an accessible position. The exemplary method may include moving the lower fascia from the covering position to the accessible position prior to accessing the lower banking machine component. Further, the method may include engaging the first chest door with the lower fascia to hold the first door in the open condition.

The at least one lower banking machine component may comprise a currency dispenser mechanism. The exemplary method includes servicing the currency dispenser mechanism after the at least one lower banking machine component is accessed. This may include for example features included in U.S. Pat. Nos. 7,195,237 and/or 7,111,776 the disclosures of each of which are incorporated herein by reference in their entirety.

The at least one lower banking machine component may comprise a currency stacker. The exemplary method includes servicing the currency stacker.

Figure 13:
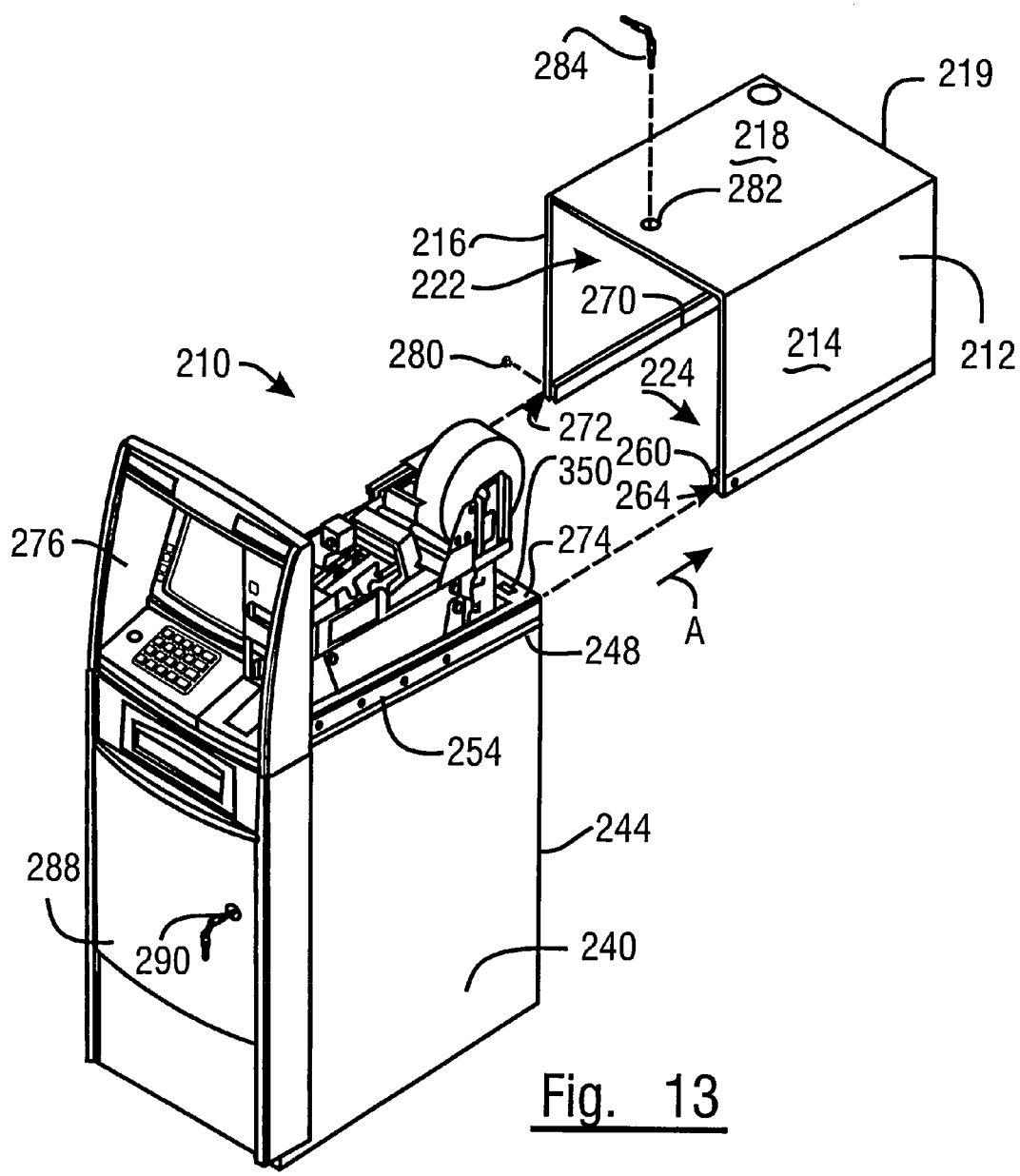
FIG. 13 is an isometric exploded view of an alternate embodiment of an automated banking machine.
Figure 14:
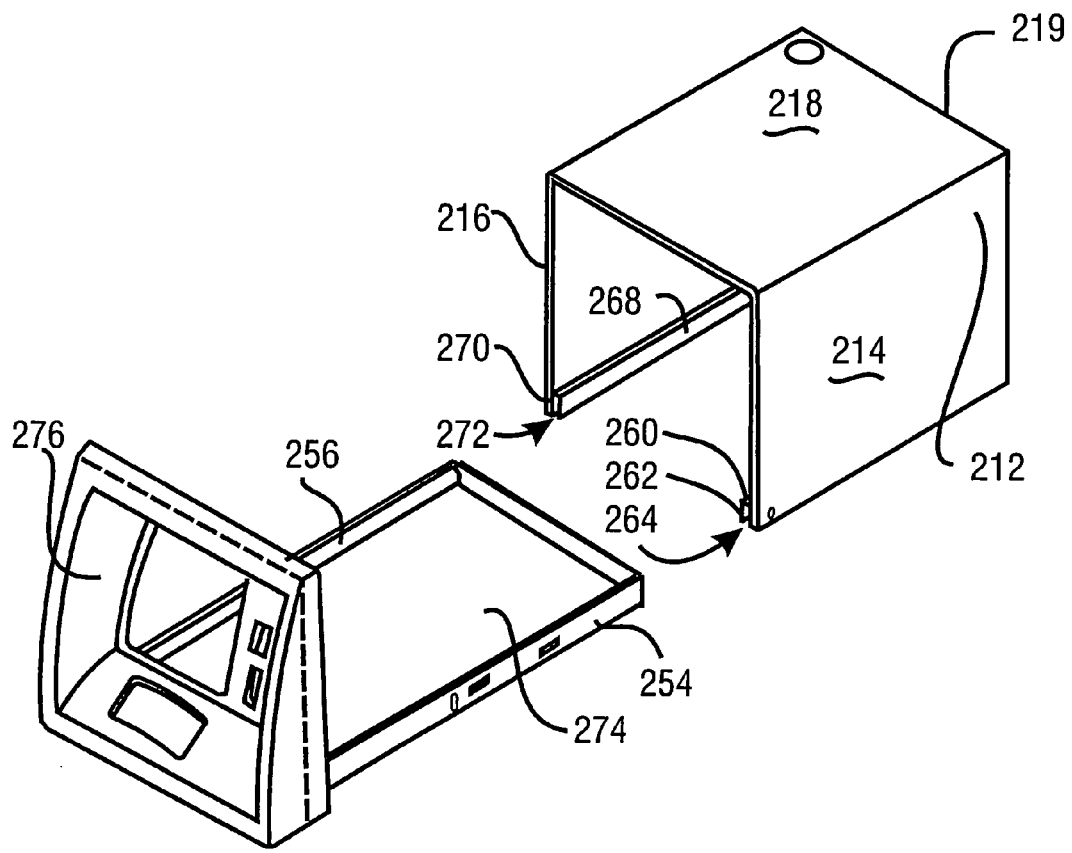
FIG. 14 is an isometric view of a top housing cover, a mounting tray and an upper fascia of an automated banking machine.
Figure 15:
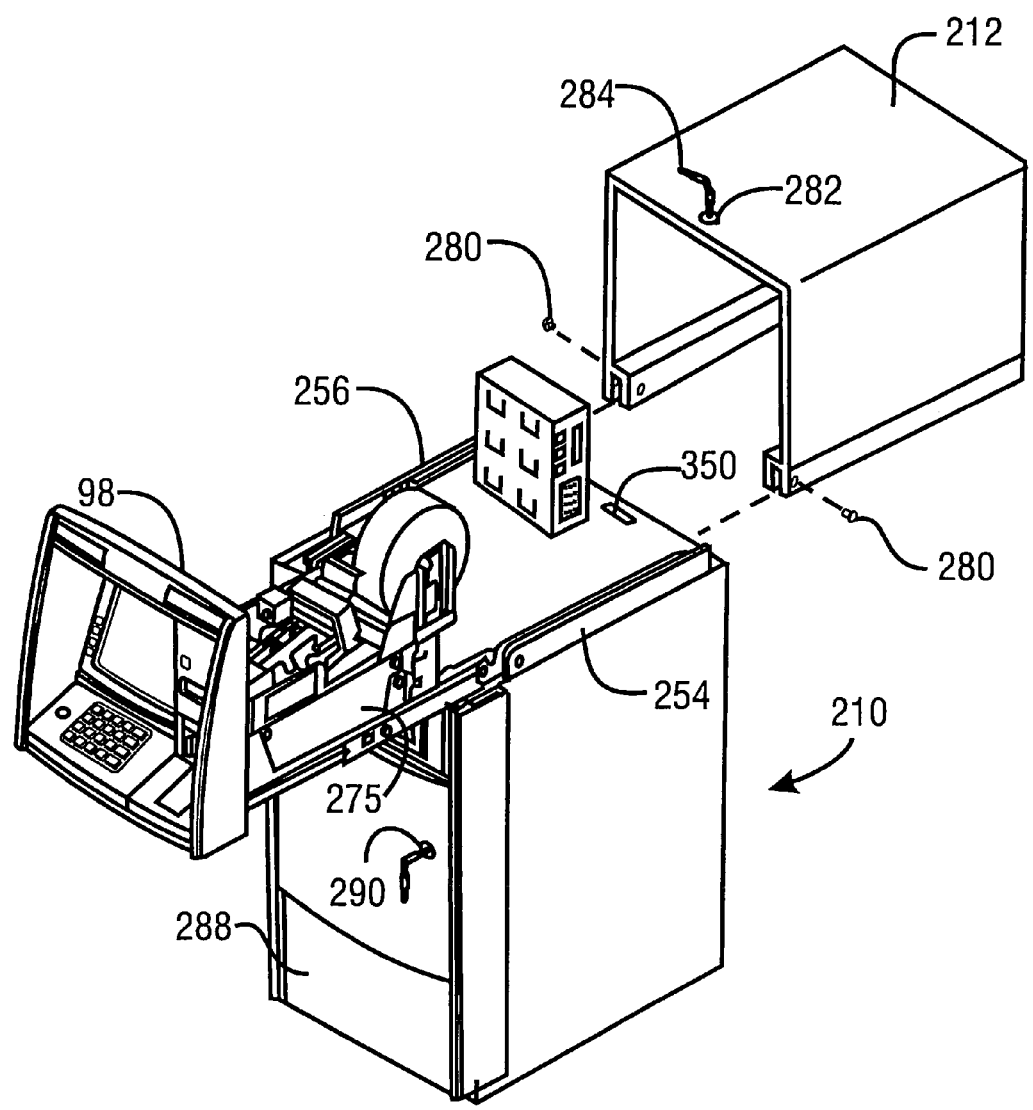
FIG. 15 is an isometric view of an alternate embodiment of an automated banking machine.

Yet another exemplary embodiment of an ATM 210 is illustrated in FIGS. 13-15. ATM 210 includes a top housing cover 212 including first and second side walls 214, 216, top wall 218, and rear wall 219. Top housing cover 212 defines a front opening 222 and a bottom opening 224. In a first (operable) position, top housing cover 212 covers an interior area in which various upper banking machine components such as a display, a receipt printer, a card reader, input keys, a controller, communication device, and others may be disposed.

In this exemplary embodiment, ATM 210 further includes a chest 240 bounding a secure area in a manner similar to that previously described. Chest 240 includes a housing 244 having a top wall 248. Top housing cover 212 is adapted for rearward slidable movement relative to top wall 248 to a second position for service.

In this exemplary embodiment, a first upwardly extending flange member 254 is mounted in supporting connection with top wall 248 along a first side thereof. A second upwardly extending flange member 256 (not shown in this view) is mounted in supporting connection with top wall 248 along a second side thereof.

Supported on the first side wall 214 of top housing cover 212 is a first cooperating channel member 260 having a pair of spaced downwardly extending projections 262 defining a first channel 264 therebetween. Likewise, on the second side wall 216 of top housing cover 212 there is supported a second cooperating channel member 268 having a pair of spaced downwardly extending projections 270 defining a second channel 272 therebetween.

Top housing cover 212 is adapted for slidable movement relative to the top wall 248 by the slidable engagement of the first flange member 254 within first channel 264 and the slidable engagement of the second flange member 256 within second channel 272.

In this exemplary embodiment, ATM 210 includes an upper fascia 276 operable to selectively cover the front opening 222. The top housing cover 212 is adapted for rearward movement relative to the top wall 248 in the direction of arrow A such that rearward displacement of the top housing cover 212 allows access to the upper banking machine components in the interior area, for example, for servicing.

It is contemplated that in exemplary embodiments the positioning of the flange members 254, 256 and the channels 264, 272 be reversed. For example, the top housing cover 212 may support flange members and the mounting tray may support cooperating channel members to accomplish a similar slidable relationship therebetween.

FIG. 14 illustrates an exemplary embodiment wherein the flange members 254, 256 are incorporated into a mounting tray 274 which is operable to receive and support one or more upper banking machine components, which for ease of illustration are not shown in this view. This embodiment allows for ease of assembly of the exemplary ATM 210. The applicable upper banking machine components can be readily mounted onto mounting tray 274, which is mounted in supporting connection with top wall 248 of chest housing 244. Top housing cover 212 may thereafter be positioned by slidable movement of flange members 254, 256 in respective channels 264, 272.

In an alternate exemplary embodiment, illustrated in FIG. 15, ATM 210 may include a rollout tray 275 similar to rollout tray 80 as previously described. Flange members 254,256 may be mounted in supporting connection with rollout tray 275. Thus, upper banking machine components may be accessed by rearwardly sliding the top housing cover 212, extending the rollout tray 275, or a combination of both.

ATM 210 may further include at least one removable fastener 280 for selectively engaging the top housing cover 212 with at least one flange member 254, 256 to prevent relative slidable movement therebetween. In the exemplary embodiment, first and second fasteners 280 are used to secure the top housing cover 212.

ATM 210 may further include a first locking mechanism 282 to secure the top housing cover to upper fascia 276. In this exemplary embodiment, the locking mechanism is operable in response to a key 284. In the exemplary embodiment illustrated in FIG. 15 it is contemplated that fasteners 280 are covered by a rearwardly extending portion of upper fascia similar to portion 98 shown in FIG. 6. Thus, fasteners 280 are not accessible from outside the ATM until first locking mechanism 282 has been operated to release upper fascia 276 so that the upper fascia 276 can be moved away from top housing cover 212.

In the exemplary embodiment, ATM 210 may include a lower fascia 288 with features similar to a lower fascia previously described. Lower fascia 288 may be secured in the covering position by a second locking mechanism 290.

This exemplary embodiment provides ready access to the upper banking machine components, for-example, for servicing or replacing. To access the upper banking machine components, fasteners 280 are removed. It is contemplated that in an exemplary embodiment, the fasteners may not be accessible until after the first locking mechanism 282 is unlocked and the upper fascia is displaced slightly to uncover fasteners 280. In other embodiments, the fasteners may be directly accessed.

The top housing cover 212 may then be moved rearwardly, away from upper fascia 276 so that the interior area is accessible. During servicing, the top housing cover 212 may be selectively positioned so that some portion or none of the upwardly extending flanges 254, 256 remain engaged with the channel members 260, 268, respectively.

In one exemplary embodiment, a method is provided for accessing banking machine components of an ATM. The exemplary method includes supporting the top housing cover in a slidable relationship with the top wall of the chest housing, wherein the top housing cover includes a front opening; selectively rearwardly sliding the top housing cover away from a first position in which an upper fascia covers the front opening; and accessing at least one upper banking machine component that is mounted in supporting connection with the top wall of the chest housing.

The exemplary method further includes removing fasteners that may be used to selectively secure the top housing cover in the first position.

The exemplary method further includes operating a locking mechanism to release the top housing cover and the upper fascia.

The exemplary method further includes accessing an upper banking machine component for servicing. The at least one upper banking machine component may be a display that is accessed for servicing.

In one embodiment the ATM includes side flange members mounted in supporting connection with a top wall of a chest housing and cooperative channel members mounted in supporting connection with the top housing cover. In this exemplary embodiment, the method further includes slideably engaging a first flange member with a first channel of a first channel member.

Figure 16:
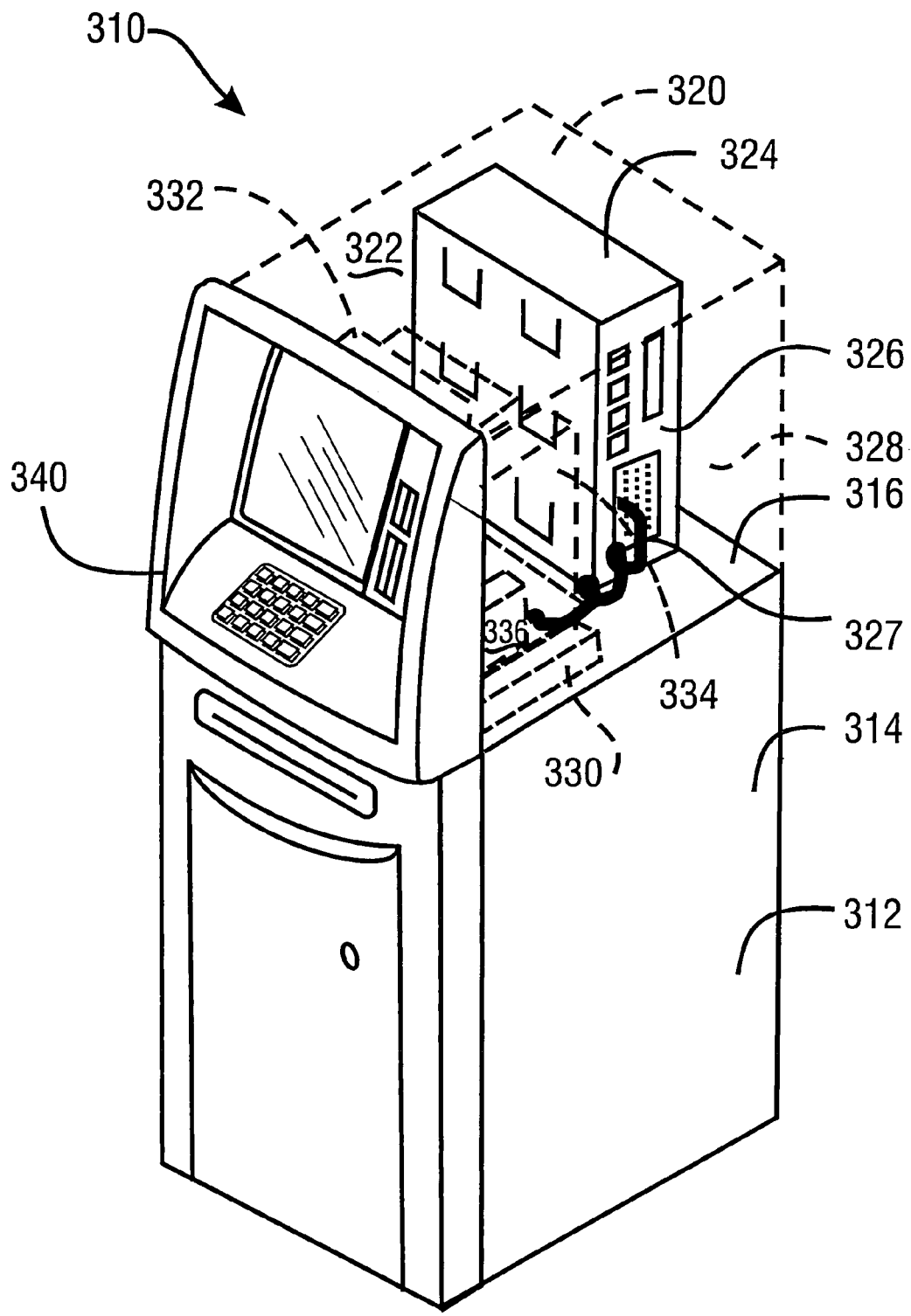
FIG. 16 is an isometric view, partly in phantom, of an alternate exemplary embodiment of an automated banking machine in an operational condition.
Figure 17:
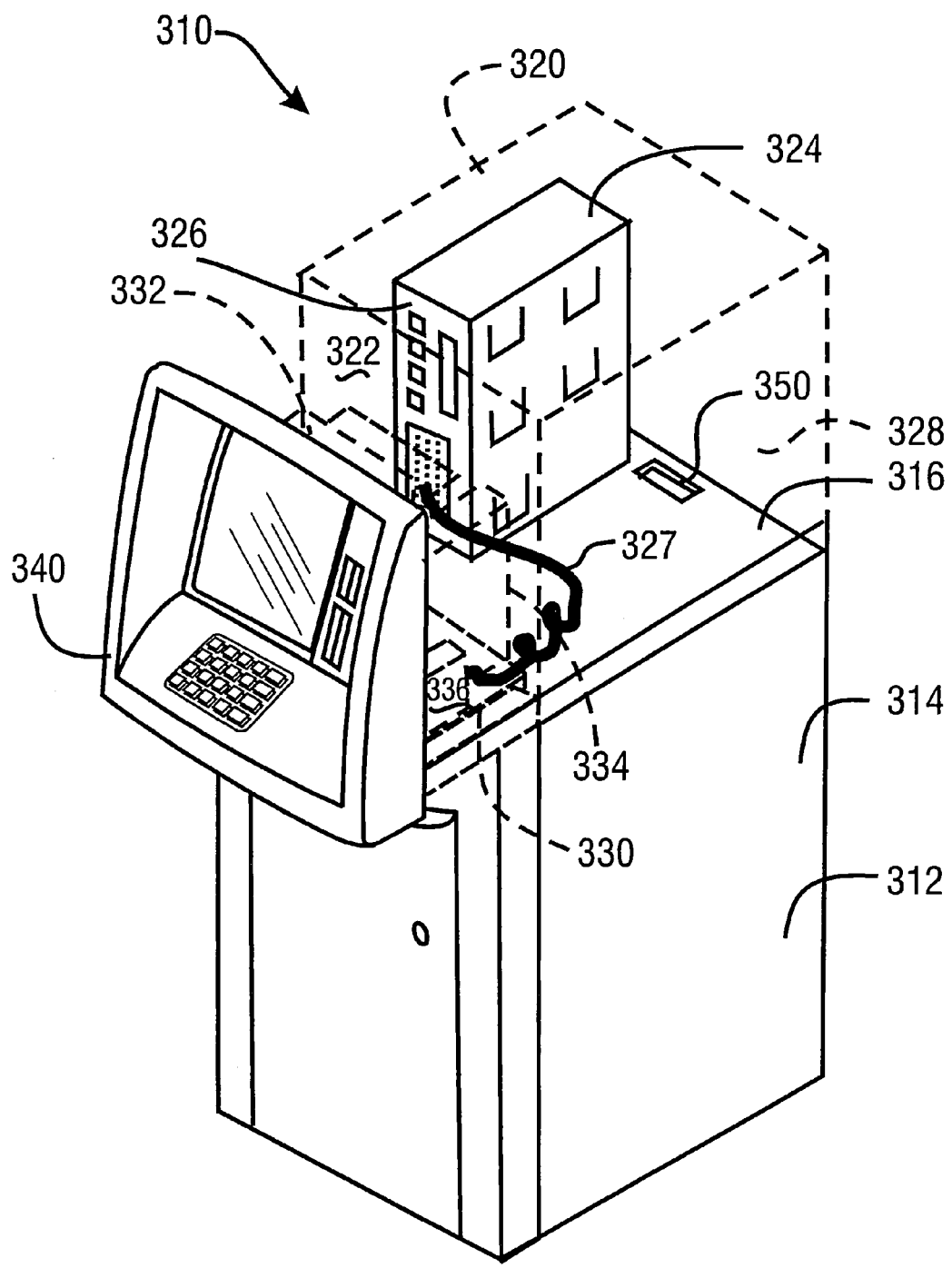
FIG. 17 is an isometric view, partly in phantom, of the automated banking machine of FIG. 16, in a serviceable condition.

In another exemplary embodiment, illustrated in FIGS. 16 and 17, ATM 310 may include a chest 312 having a chest housing 314 including top wall 316. As in previously described embodiments, chest housing 314 bounds a secure area which holds lower banking machine components including a currency dispenser mechanism which may be similar to mechanism 64 shown in FIG. 3. ATM 310 further includes a top housing 320 (shown in phantom) bounding an interior area 322.

In this exemplary embodiment, ATM 310 includes a processor case 324 that houses the primary ATM processor. The processor may be an Intel Pentium (PL type) processor. Of course, in some embodiments the case may house multiple processor or no processors at all. The ATM processor causes operation of the various devices and mechanisms in the ATM.

In this exemplary embodiment, processor case 324 is in supporting connection with top wall 316 of chest housing 314. Processor case 324 includes a first functional side 326 that is operable to establish connections, such as through cable 327, from the various banking machine components. Other processor components, including but not limited to circuit cards having various functions, additional processors, drives (CD, DVD, floppy), power supplies, memory, or encryption cards, may be carried on or within processor case 324. Such components may also be accessed, removed and/or replaced and routine maintenance performed through access to the functional side of the processor case.

In order to minimize the space occupied by ATM 310, it is advantageous to orient processor case 324 of the exemplary embodiment so that the first functional side 326 is substantially parallel to a first side wall 328 (shown in phantom) of top housing 320. However, in order to easily access first functional side 326 for servicing or connecting cables, it is advantageous to orient processor case 324 so that the first functional side 326 is substantially perpendicular to the first side wall 328, facing the front opening of the ATM. In order to accomplish both these purposes, the processor case 324 of the exemplary embodiment is rotationally supported in connection with the top wall 316 of the chest housing 314. The processor case 324 is selectively rotationally movable between an operational position, shown in FIG. 17, wherein the first functional side 326 is substantially parallel to the first side wall 328, and a service position, shown in FIG. 16, wherein the first functional side 326 is substantially perpendicular to the first side wall 328.

In this exemplary embodiment, a rollout tray 330 is supported on the top wall 316 of the chest housing 314. As in earlier described exemplary embodiments, the rollout tray 330 is selectively movable between a retracted position wherein the rollout tray 330 is within the interior area 322, and an extended position wherein the rollout tray 330 extends outwardly from the interior area through a front opening in the top housing 320. In the exemplary embodiment, various upper banking machine components such as display 332, receipt printer 334, and card reader 336 are supported on rollout tray 330. Also, an upper fascia 340 may be mounted in supporting connection with rollout tray 330. As in other described embodiments, when the rollout tray is in the retracted position, the upper fascia 340 covers the front opening in the top housing.

In the exemplary embodiment, when rollout tray 330 is in the retracted position, as illustrated in FIG. 16, the processor case 324 is prevented from rotating from the operational position to the service position. When the rollout tray 330 is in the extended position, as illustrated in FIG. 17, there is enough clearance in the interior area 322 to permit the processor case 324 to be rotated into the service position. Thus, when the rollout tray 330 is in the extended position, the upper banking machine components supported thereon are readily accessible for service. Likewise, the cable connections and any processor components carried on the processor case are accessible for service.

In a method for servicing banking machine components of an ATM, a rollout tray 80 mounted in supporting connection with a top housing 320 is extended from a retracted position so that the rollout tray extends through a front opening in the top housing 320. The method includes disengaging any locking mechanisms that operate to retain the rollout tray 80 in the retracted position.

A processor case 324 disposed in an interior area 322 bounded by the top housing 320 may be rotated from an operational position to a service position. At least one processor component mounted in supporting connection with the processor case 324 may be accessed for servicing. After servicing of the processor component is complete, the processor case 324 may be rotationally returned to the operational position from the service position. Thereafter, the rollout tray 80 may be repositioned into the retracted position.

The step of servicing the processor component may include connecting or disconnecting cables or connections, adding or replacing components such as circuit cards, performing diagnostic tests and other functions to facilitate operation of the ATM.

Prior to repositioning the rollout tray 80, other banking machine components may be serviced while the rollout tray is extended. For example, a display, card reader, and receipt printer assembly are readily accessible for service. The service can include routine maintenance, replacement of non-working components, addition of other banking machine components, and the like. Connections with the processor can be readily made while the rollout tray is in the extended position and the processor case is in the service position.

The ATM may include a slidable top housing cover 212 as earlier described. The service method includes the step of rearwardly sliding the top housing cover 212. After the servicing of banking machine components is completed, the method includes returning the top housing cover 212 to an operational position.

During servicing of the ATM, the lower banking machine components may also be accessed for servicing. The service method includes disengaging any locking mechanisms that retain the lower fascia in a covering position. The lower fascia may thereafter be moved into the accessible position. The locking bolt mechanism that securely engages the chest door with the chest housing may be disengaged so that the chest door may be placed in the open position.

An exemplary method further includes the step of engaging the chest door with the lower fascia when the chest door is in the open position and the lower fascia is in the accessible position in order to retain the door in the open position.

The lower banking machine components, such as currency stacker, currency dispenser mechanism, and currency delivery mechanism (as shown in FIG. 3). An exemplary service method includes performing routine maintenance, replenishing currency, removing sheets, disengaging sheets from the currency dispenser mechanism, replacing components and the like.

The ATM can include connections and/or cables that extend between the processor case and lower banking machine components that are generally housed within the secure chest. The chest housing may include various openings 350 through the walls to accommodate the connections and/or cables (FIGS. 10-11 and 17). When the processor case is in the service position, the connections can be readily established, maintained and/or changed.

An exemplary method of constructing an ATM apparatus is provided. The exemplary method includes mounting a top housing in supporting connection with a chest adapted for use in an automated banking machine apparatus. A first chest door is operable to selectively close a first opening in the chest housing.

The method further includes mounting an upper fascia in supporting connection with the top housing and mounting a lower fascia in movable supporting connection with the chest housing.

The upper fascia and the top housing are selectively positioned relative each other so that a front opening in the top housing is selectively covered by the upper fascia, and wherein a rearwardly extending portion of the upper fascia overlies a forward region of the top housing.

The lower fascia is selectively positioned in a covering position relative a chest door wherein a first side extension of the lower fascia overlies a first forward portion of the chest housing and wherein a second side extension of the lower fascia overlies a second forward portion of the chest housing.

In an exemplary method, a lower edge surface of the upper fascia is placed in substantially parallel alignment with an upper edge surface of the lower fascia and an end edge of a rearwardly extending portion of the upper fascia is substantially vertically aligned with an end edge of a first side extension of the lower fascia at a first side of the ATM.

In an exemplary method, a second chest door is moveably mounted in supporting connection with the chest housing to operably close a second opening in the chest housing. A first locking bolt mechanism may be mounted to the first chest door and an alternate securing mechanism may be mounted to the second chest door.

In an exemplary method, a processor case is mounted in supporting rotational connection with a top wall of the chest housing wherein the processor case is selectively movable between an operational position and a service position, and wherein the processor case houses at least one processor.

In an exemplary method, at least one upper banking machine component is mounted in supporting connection with a rollout tray which is mounted in movable supporting connection with the chest housing, wherein the rollout tray is selectively movable between a retracted position wherein the rollout tray is within an interior area, and an extended position wherein the rollout tray extends outwardly from the interior area through the front opening in the top housing.

The exemplary method includes selectively placing the rollout tray in the extended position, selectively rotating the processor case into the service position, and establishing an operable connection between the at least one upper banking machine component and the at least one processor.

In an exemplary method, the lower fascia is equipped with an inwardly extending flange operative to selectively engage the chest door when the lower fascia is in the accessible position and the chest door is in the open position.

Figure 18:
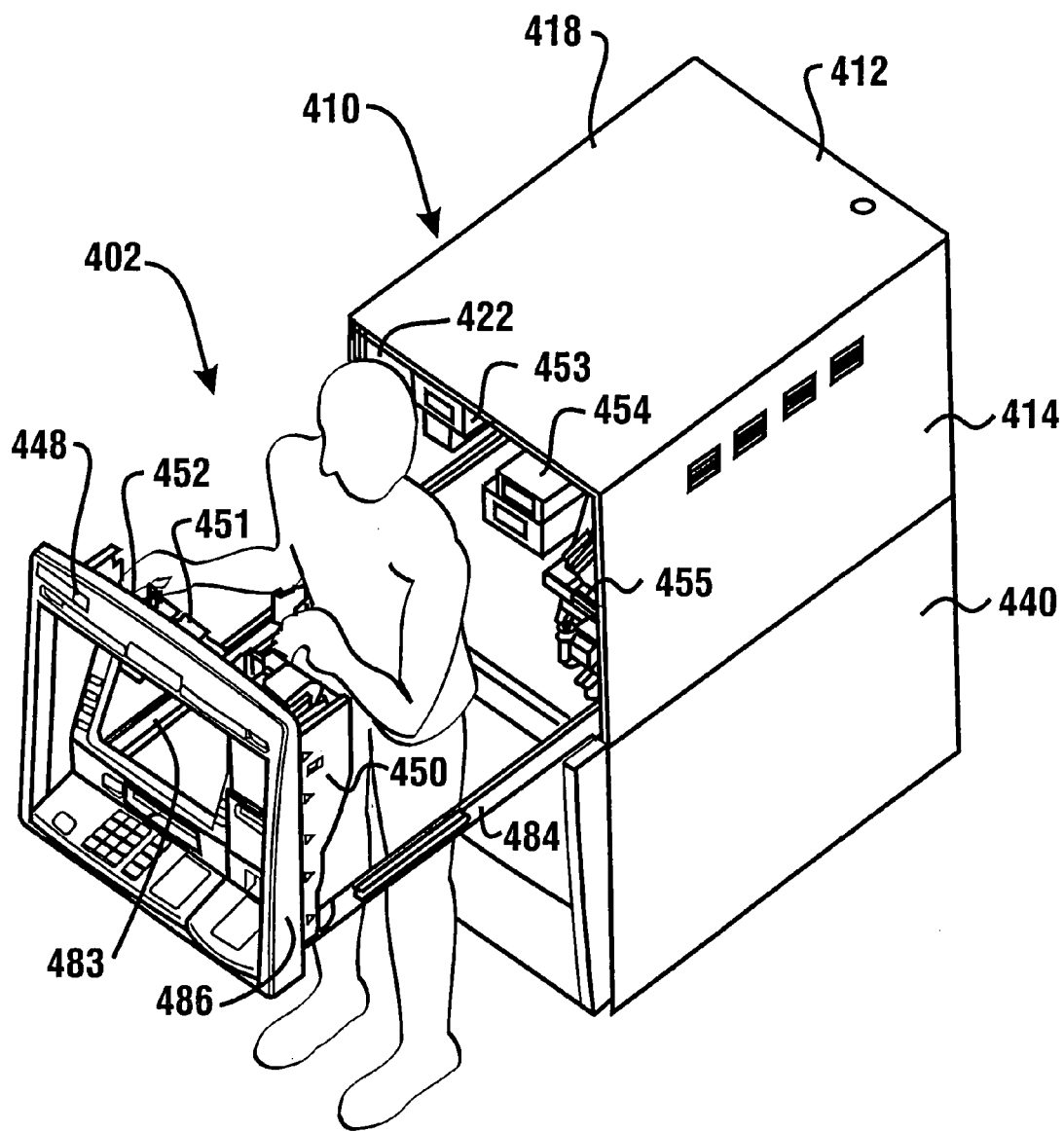
FIG. 18 is an isometric view of an automated banking machine of an exemplary embodiment.

With reference to FIG. 18, in this exemplary embodiment there is shown therein an automated banking machine, generally indicated as 410. In this exemplary embodiment, the automated banking machine 410 is an automated teller machine (ATM). The ATM 410 includes a housing 412 mounted atop a chest 440. The housing 412 includes a first side wall 414, a second side wall 416 (FIG. 19), a rear wall or panel 419, and a top wall 418, and defines a front opening 422. A fascia 486 is adapted to cover the front opening 422 of the housing 412 and may be secured to the housing 412 with a lock 448. The fascia 486 is in operatively supported connection with the housing 412 and is operatively supported by the housing 412 through two horizontally disposed members 483, 484. As will be appreciated by those skilled in the art, the fascia 486 may additionally or alternatively be secured to the chest 440. In an exemplary embodiment, the two horizontally disposed members 483, 484 are slideable members adapted to enable the fascia 486 to be moved away from the front opening 422 of the housing 412. Further, the fascia 486, when moved away from the front opening 422, cooperates with the housing 412 and the two horizontally disposed members 483, 484 to define a space which may be at least partially occupied by a servicer 402 while servicing the ATM 410. Various serviceable components, generally identified in FIG. 18 as components 450-455, may be supported by the fascia 486, the housing 412, the chest 440, or combinations thereof.

Figure 19:
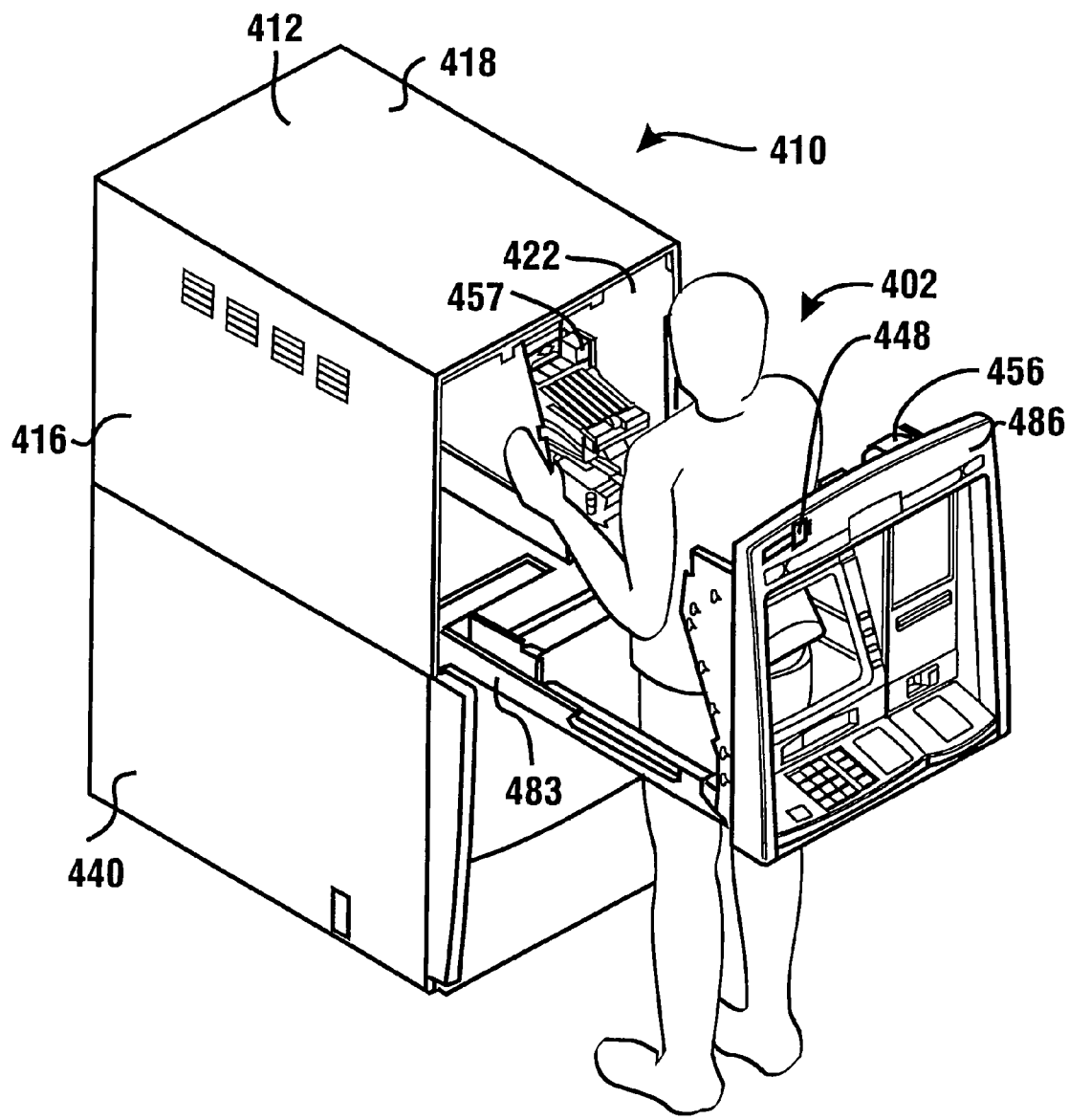
FIG. 19 is a further isometric view of the automated banking machine of the exemplary embodiment shown in FIG. 18.

With reference to FIG. 19, there is shown a further view of the exemplary embodiment of the ATM 410 described under FIG. 18. Shown is the servicer 402 at least partially occupying the space defined by the fascia 486, the housing 412, and the two horizontally disposed members 483, 484.

Figure 20:
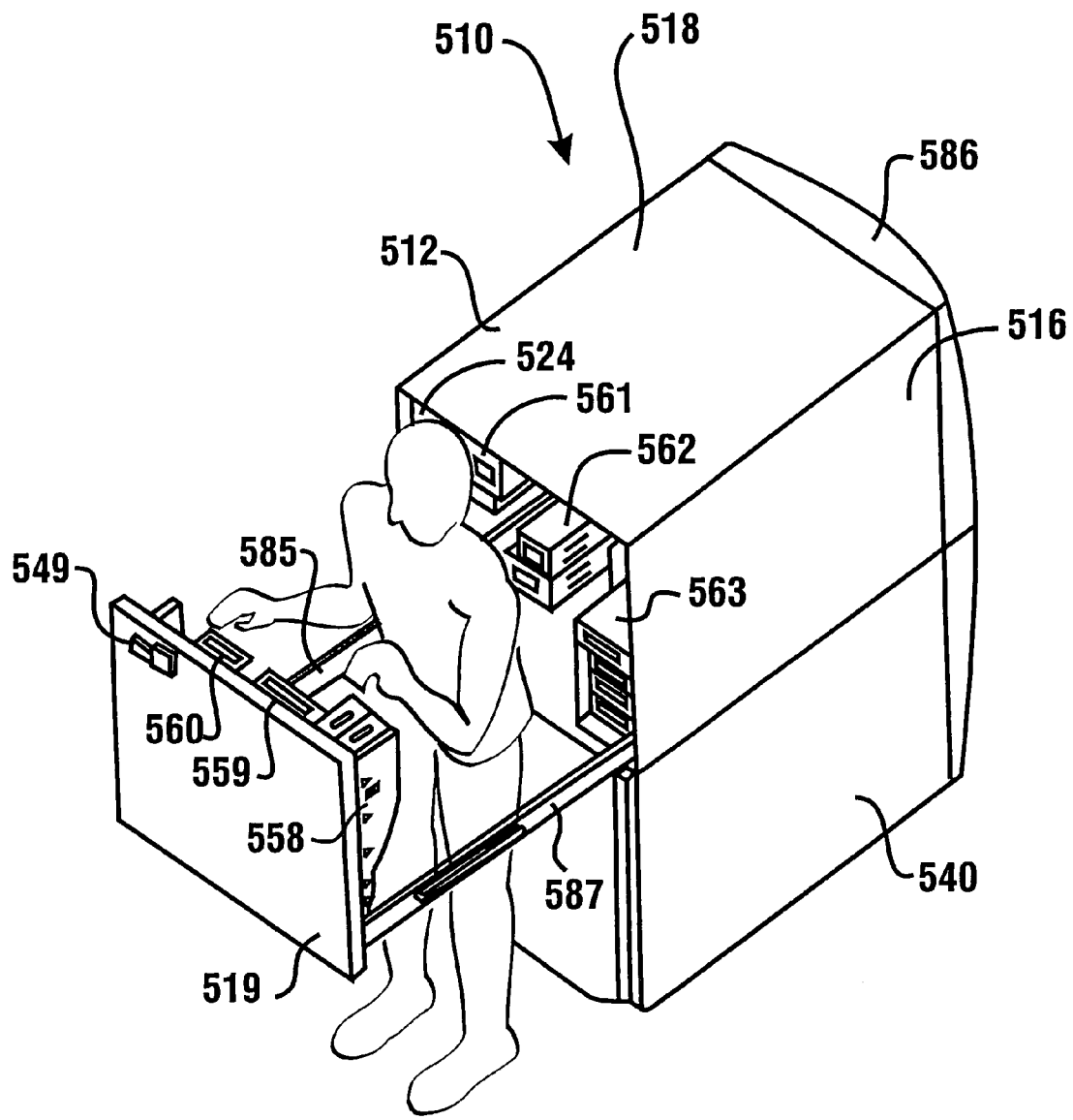
FIG. 20 is an isometric view of an automated banking machine of an exemplary embodiment.

With reference to FIG. 20, in this exemplary embodiment there is shown therein an automated banking machine, generally indicated as 510. In this exemplary embodiment, the automated banking machine 510 is an automated teller machine (ATM). The ATM 510 includes a housing 512 mounted atop a chest 540. The housing 512 includes a first side wall 514 (not shown), a second side wall 516, and a top wall 518, and defines a rear opening 524. A rear panel 519 is adapted to cover the rear opening 524 of the housing 512 and may be secured to the housing 512 with a lock 549. The rear panel 519 is in operatively supported connection with the housing 512 and is operatively supported by the housing 512 through two-horizontally disposed members 585, 587. In an exemplary embodiment, the two horizontally disposed members 585, 587 are slideable members adapted to enable the rear panel 519 to be moved away from the rear opening 524 of the housing 512. Further, the rear panel 519, when moved away from the rear opening 524, cooperates with the housing 512 and the two horizontally disposed members 585, 587 to define a space which may be at least partially occupied by the servicer 402 while servicing the ATM 510. Various serviceable components, generally identified in FIG. 20 as components 558-563, may be supported by the rear panel 519, the housing 512, the chest 540, or combinations thereof.

Figure 21:
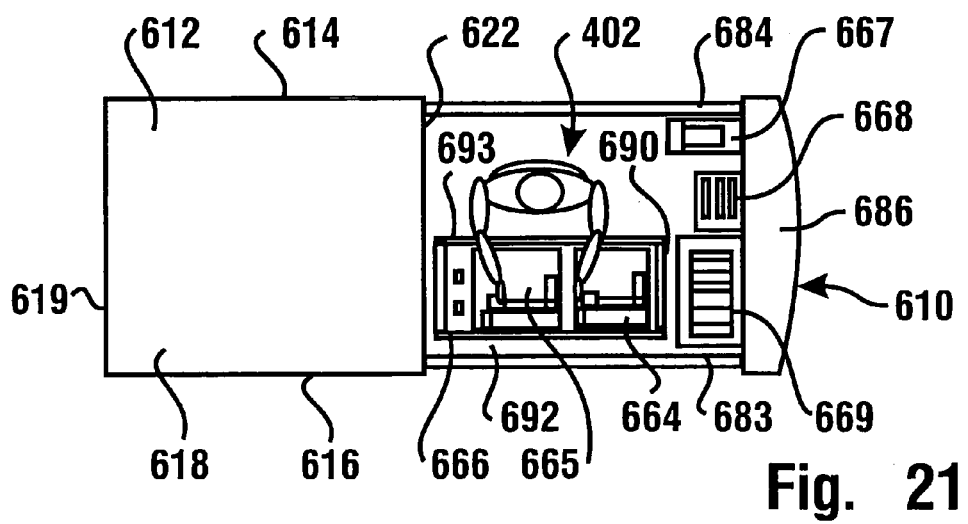
FIG. 21 is a plan view of an automated banking machine of an exemplary embodiment.

With reference to FIG. 21, in this exemplary embodiment there is shown therein an automated banking machine, generally indicated as 610. In this exemplary embodiment, the automated banking machine 610 is an automated transaction machine (ATM). The ATM 610 includes a housing 612 mounted atop a chest (not shown). The housing 612 includes a first side wall 614, a second side wall 616, a rear wall 619, and a top wall 618, and defines a front opening 622. A fascia 686 is adapted to cover the front opening 622 of the housing 612 and may be secured to the housing 612 with a lock (not shown). The fascia 686 is in operatively supported connection with the housing 612 and is operatively supported by the housing 612 through two horizontally disposed members 683, 684. In an exemplary embodiment, the two horizontally disposed members 683, 684 are slideable members adapted to enable the fascia 686 to be moved away from the front opening 622 of the housing 612. Further, the fascia 686, when moved away from the front opening 622, cooperates with the housing 612 and the two horizontally disposed members 683, 684 to define a space which may be at least partially occupied by the servicer 402 while servicing the ATM 610. Various serviceable components, generally identified in FIG. 21 as components 664-669, may be supported by the fascia 686, the housing 612, the chest (not shown), or combinations thereof.

Also shown in FIG. 21, is an exemplary embodiment of a moveable component tray 690. The moveable component tray 690 may support one or more components, generally 664-666. The tray 690 is in operatively supported connection with the housing 612 and is operatively supported by the housing 612 through two horizontally disposed members 692, 693. In an exemplary embodiment, the two horizontally disposed members 692, 693 are slideable members adapted to enable the one or more components, generally 664-669, and their support tray 690 to be moved away from the housing 612 for servicing by the servicer 402. Even when the support tray 690 is moved away from the housing 612, the housing 612, the tray 690, one of the horizontally disposed members 684, for example, and the fascia 686 cooperate to define a space which may be at least partially occupied by the servicer 402. As will be appreciated by those skilled in the relevant art, the moveable tray 690 described herein and illustrated in FIG. 21 may also or additionally be included in a rear-access housing as illustrated in exemplary fashion in FIG. 20. As will also be appreciated by those skilled in the art, the support tray 690 may be disposed in a vertical orientation.

Figure 22:
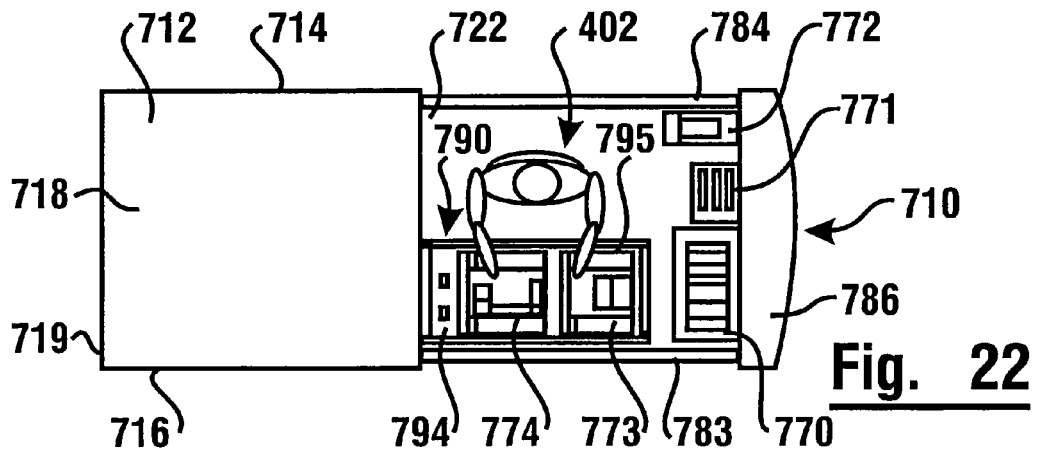
FIG. 22 is a plan view of an automated banking machine of an exemplary embodiment.

With reference to FIG. 22, in this exemplary embodiment there is shown therein an automated banking machine, generally indicated as 710. In this exemplary embodiment, the automated banking machine 710 is an automated teller machine (ATM). The ATM 710 includes a housing 712 mounted atop a chest (not shown). The housing 712 includes a first side wall 714, a second side wall 716, a rear wall 719, and a top wall 718, and defines a front opening 722. A fascia 786 is adapted to cover the front opening 722 of the housing 712 and may be secured to the housing 712 with a lock (not shown). The fascia 786 is in operatively supported connection with the housing 712 and is operatively supported by the housing 712 through two horizontally disposed members 783, 784. In an exemplary embodiment, the two horizontally disposed members 783, 784 are slideable members adapted to enable the fascia 786 to be moved away from the front opening 722 of the housing 712. Further, the fascia 786, when moved away from the front opening 722, cooperates with the housing 712 and the two horizontally disposed members 783, 784 to define a space which may be at least partially occupied by the servicer 402 while servicing the ATM 710. Various serviceable components, generally identified in FIG. 22 as components 770-775, may be supported by the fascia 786, the housing 712, the chest (not shown), or combinations thereof.

Also shown in FIG. 22, is an exemplary embodiment of a moveable component rack 790. The moveable component rack 790 may support one or more serviceable components, generally 773-775. The rack 790 is in operatively supported connection with the housing 712 and is operatively supported by the housing 712 through two horizontally disposed members 794, 795. In an exemplary embodiment, the two horizontally disposed members 794, 795 are slideable members adapted to enable the one or more components, generally 773-775, and their supporting rack 790 to be moved away from the housing 712 for servicing by the servicer 402. Even when the supporting rack 790 is moved away from the housing 712, the housing 712, the rack 790, one of the horizontally disposed members 784, for example, and the fascia 786 cooperate to define a space which may be at least partially occupied by the servicer 402. As will be appreciated by those skilled in the relevant art, the moveable rack 790 described herein and illustrated in FIG. 22 may also or additionally be included in a rear-access housing as illustrated in exemplary fashion in FIG. 20. As will also be appreciated by those skilled in the art, the supporting rack 790 may be disposed in a vertical direction.

Figure 23:
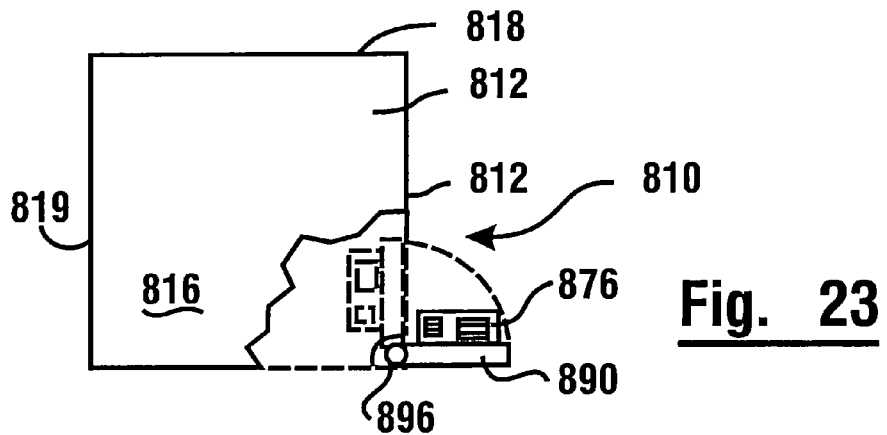
FIG. 23 is an elevation view, partly in phantom, of a portion of an automated banking machine of an exemplary embodiment.

With reference to FIG. 23, in this exemplary embodiment there is shown therein a portion of an automated banking machine, generally indicated as 810. In this exemplary embodiment, the automated banking machine 810 is an automated teller machine (ATM). The ATM 810 includes a housing 812 mounted atop a chest (not shown). The housing includes a first side wall (not shown), a second side wall 816, a rear wall 819, and a top wall 818, and defines a front opening 822. Also shown in FIG. 23, is an exemplary embodiment of a pivotable component rack 890. The pivotable component rack 890 is in operatively supported connection with the housing 812 and is operatively supported by the housing 812 through a pivot 896. The pivotable component rack 890 may support one or more serviceable components, generally 876. The pivot 896 is adapted to enable the one or more components, generally 876, and their pivotable component rack 890 to be moved away from the housing 812 for servicing by the servicer 402. As will be appreciated by those skilled in the art, the pivot 896 may alternatively be disposed in a vertical orientation.

An exemplary embodiment includes a method for accessing and servicing the contents, and particularly the serviceable components, of the housing to, but not limited to, clean, repair, or replace parts, make adjustments, replenish consumables such as paper, print materials, and lubricants, or exchange components. The method includes releasing the lock holding the cover adjacent to the opening of the housing of the automated banking machine and moving the cover away from the housing, wherein the cover remains in operatively supported connection with the housing, and wherein the cover is operatively supported by the housing through two horizontally disposed members. In an exemplary embodiment, the members are slideable horizontally disposed members and the method includes the step of sliding the cover away from the housing. The method further includes standing between the two horizontally disposed members and servicing at least one serviceable component of the automated banking machine. In a further exemplary embodiment, the method includes moving out from between the two horizontally disposed members, moving the cover back toward the housing, whereby the cover is positioned adjacent the housing opening, and securing the lock.

In a further exemplary embodiment, the method further includes moving the at least one component away from the housing for servicing. In a further exemplary embodiment, the step of moving the at least one component away from the housing includes sliding the at least one component away from the housing, pivoting at least a portion of the at least one component away from the housing, sliding a tray supporting the at least one component away from the housing, and sliding a rack supporting the at least one component away from the housing while standing between the two horizontally disposed members.

In a further exemplary embodiment, the method further includes moving the at least one component back into the housing after servicing. In a further exemplary embodiment, the step of moving the at least one component back into the housing includes sliding the at least one component back into the housing, pivoting the at least one portion of the at least one component back into the housing, sliding the tray supporting the at least one component back into the housing, and sliding the rack supporting the at least one component back into the housing while standing between the two horizontally disposed members.

As will be appreciated by those skilled in the art, the at least one component may alternatively be in operatively supported connection with the cover and the method include moving the at least one component moved away from the cover for servicing, servicing the at least one component, and subsequently moving the at least one component back to the cover. As will also be appreciated by those skilled in the art, the cover may comprise a fascia or a rear panel.

Exemplary embodiments may also include features described in U.S. Patent Nos. 7,255,266; 7,251,626; 7,249,761; 7,246,082; 7,240,829; 7,240,827; 7,234,636; 7,229,009; 7,229,012; 7,229,008; 7,222,782; 7,216,801; 7,216,800; 7,216,083; 7,207,478; 7,204,411; 7,195,153; and 7,195,237, the disclosures of each of which are herein incorporated by reference in their entirety.

Figure 24:
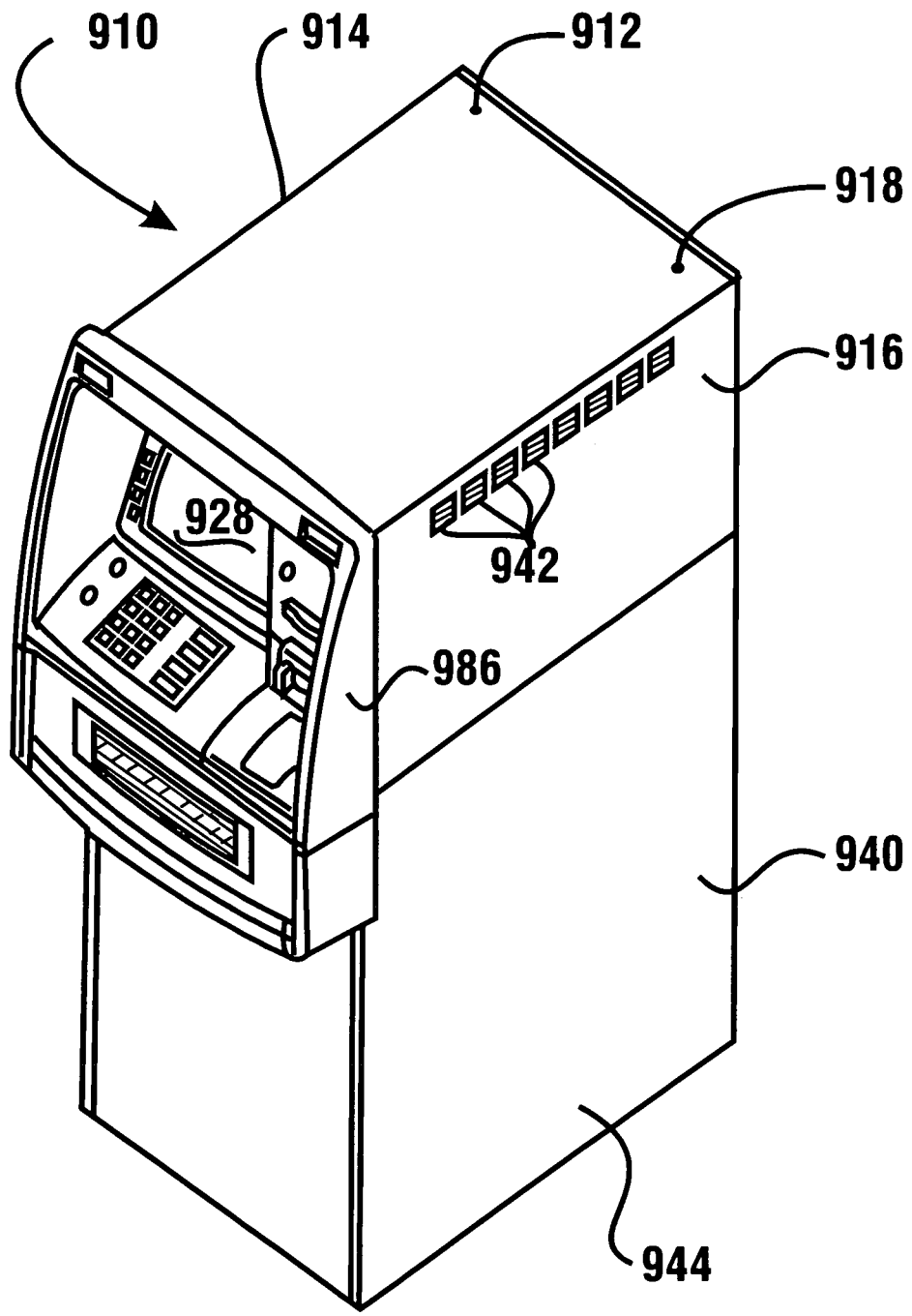
FIG. 24 is an isometric view of an automated banking machine of an exemplary embodiment.
Figure 25:
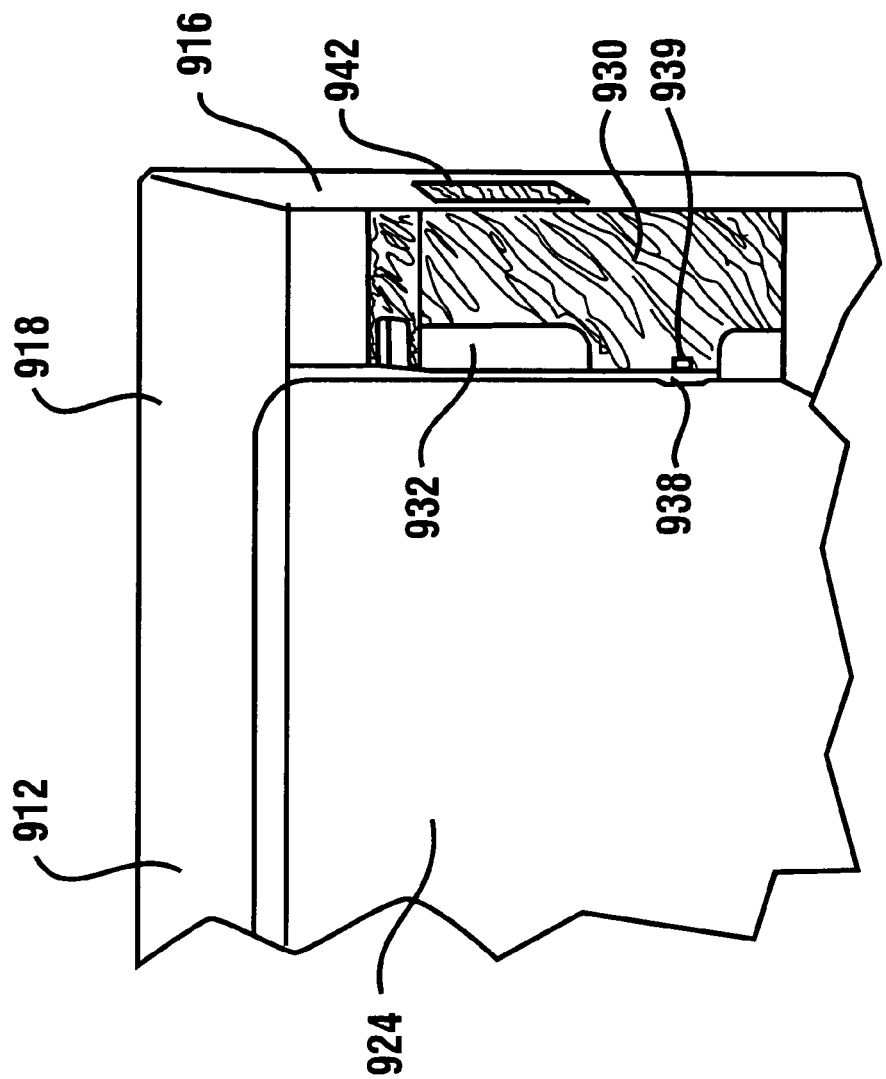
FIG. 25 is a view of a portion of an automated banking machine of an exemplary embodiment illustrating a component case assembled into a top housing.

With reference to FIG. 24, in this exemplary embodiment there is shown therein an automated banking machine, generally indicated as 910. In this exemplary embodiment, the automated banking machine 910 is an automated teller machine (ATM). The ATM 910 includes a housing 912 mounted atop a secure chest 940. The chest 940 may be enclosed in a chest housing 944 or may itself comprise the exterior walls of a portion of the machine. The housing 912 bounds an interior area and includes a first sidewall 914, a second sidewall 916, and a top wall 918. The walls define an opening 22 (shown in exemplary fashion in FIG. 2) to an interior area 20 (shown in exemplary fashion in FIG. 2). The housing 912 further includes housing vents 942 formed in the sidewalls 914, 916 which provide ventilation and enable the movement of air into or out of the housing 912. In the exemplary embodiment air is moved to help cool electronic parts contained, for example, in a component case 924 (FIG. 25).

An upper fascia 986 provides an attractive appearance as well as security. The fascia 986 is in operatively supported connection with the housing 912 and moveable between a secure closed position adjacent to the housing opening 22 and a released away position. (FIGS. 1 and 2.) In the exemplary embodiment, a card reader 24 (shown in exemplary fashion in FIG. 3) is in operatively supported connection with the housing 912 and is operative to read indicia on user cards corresponding to financial accounts. The read data is usable to authorize the machine user to carry out a transaction on the financial account.

The automated banking machine computer is operative to cause card data read by the card reader to be compared with card information stored in an authorized machine user information data store. The computer is also operative to cause biometric data read by a biometric reader to be compared with biometric information stored in the authorized machine user information data store. A customer of the machine can be authorized to request a (cash dispense) transaction responsive at least in part to computer-determined correspondence between both the read card data and stored card information, and the read biometric data and stored biometric information. The computer is further operative to cause a financial account to be assessed a value associated with cash dispensed by a cash dispenser of the machine.

Figure 26:
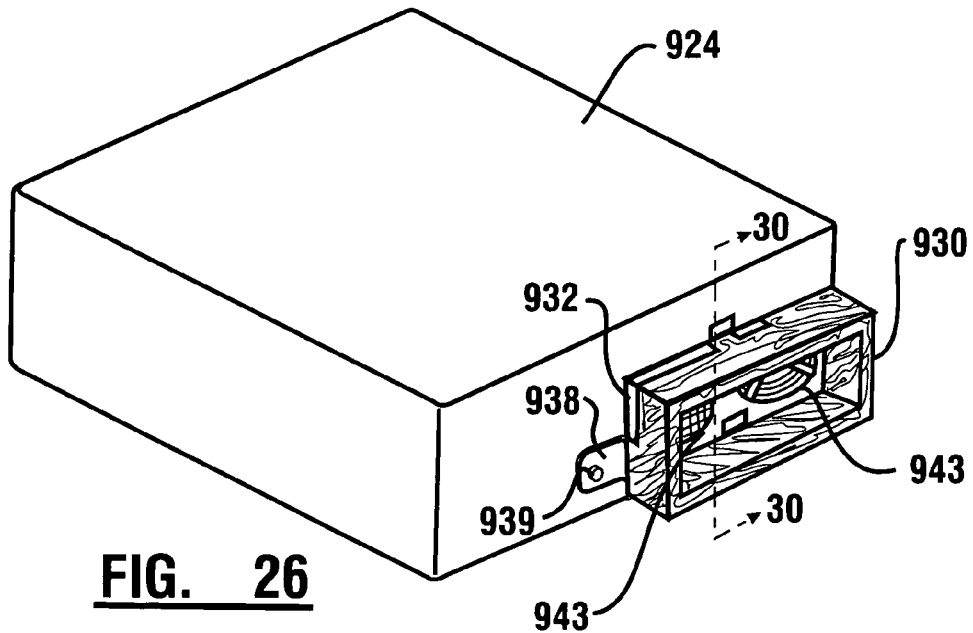
FIG. 26 is an isometric view of a portion of an automated banking machine of an exemplary embodiment illustrating a component case in combination with a duct assembly.

Also, in the exemplary embodiment, a display 928 and a cash dispenser 64 (shown in exemplary fashion in FIG. 3) are in operatively supported connection with the housing 912. The component case 924 (FIG. 25), which in the exemplary embodiment comprises a processor case, is in operatively supported connection with the housing 912 and may contain computer processors, circuit cards, memory devices and other electronic components (not shown). As shown in FIG. 26, but best seen in FIG. 27, the component case 924 further includes one or more component case vents 943 which may cooperate with one or more fans or other air movement devices (not shown) to help move air to and from the inside of the case and ventilate the interior of the component case 924.

As will be understood from FIGS. 24 and 25, ventilation air from the interior of the component case 924 may not easily reach or be drawn from outside the housing 912 which encloses the case 924 as well as other components of the ATM 910. As shown in exemplary fashion in FIG. 25, a duct 930 is operatively disposed between the component case 924 at the component case vents 943 (FIGS. 26 and 27) and the housing sidewall 916 at the at least one housing vent 942 (FIGS. 24 and 25). Air from the interior of the component case 924, by way of example only, warm air heated by the operation of processors or other components within the case 924, may then be guided within the duct to outside the housing 912. Likewise, in some embodiments and depending upon the direction of air flow, cooler air from outside the housing 912 may be guided to the interior of the component case 924. In an exemplary embodiment, the duct 930 is adhered to the component case 924 with an adhesive 936 (shown in exemplary fashion in FIG. 30). In a further exemplary embodiment, the duct 930 may be alternatively and/or in addition adhered to the inside wall of the housing 912. In a further exemplary embodiment, the adhesive 936 is releasable. In a further exemplary embodiment, the adhesive is resealable. Thus, the duct 930 may be released from its position and later resealed. This may be accomplished in exemplary embodiments by sealants which remain flexible and tacky at ambient temperatures.

Figure 27:
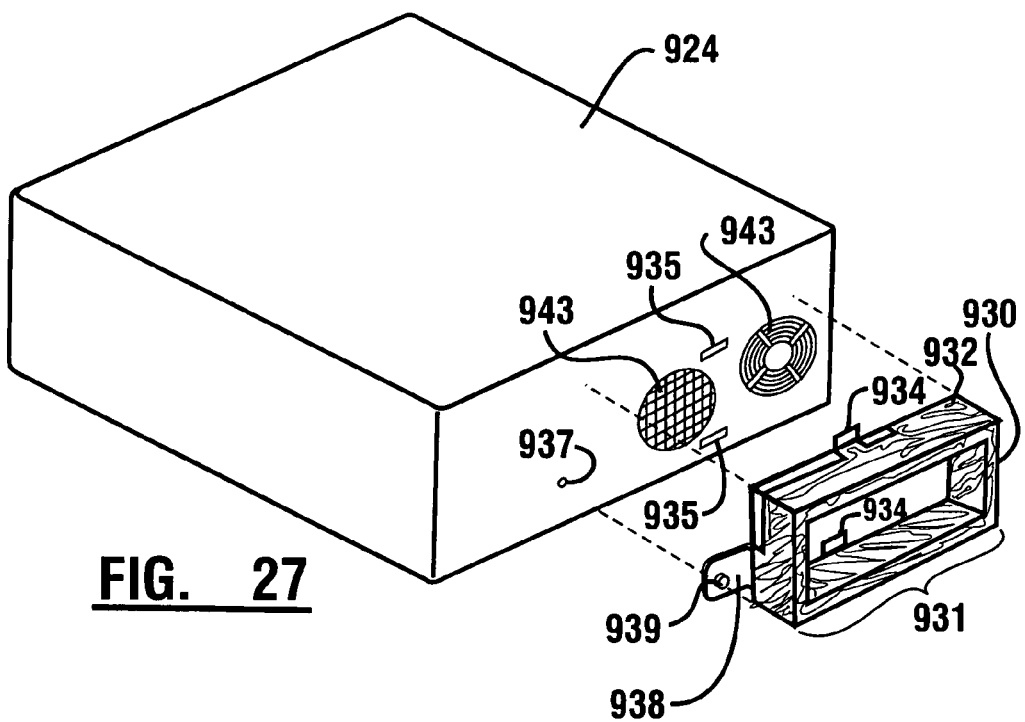
FIG. 27 is an exploded isometric view of the automated banking machine of the exemplary embodiment of FIG. 26.
Figure 28:
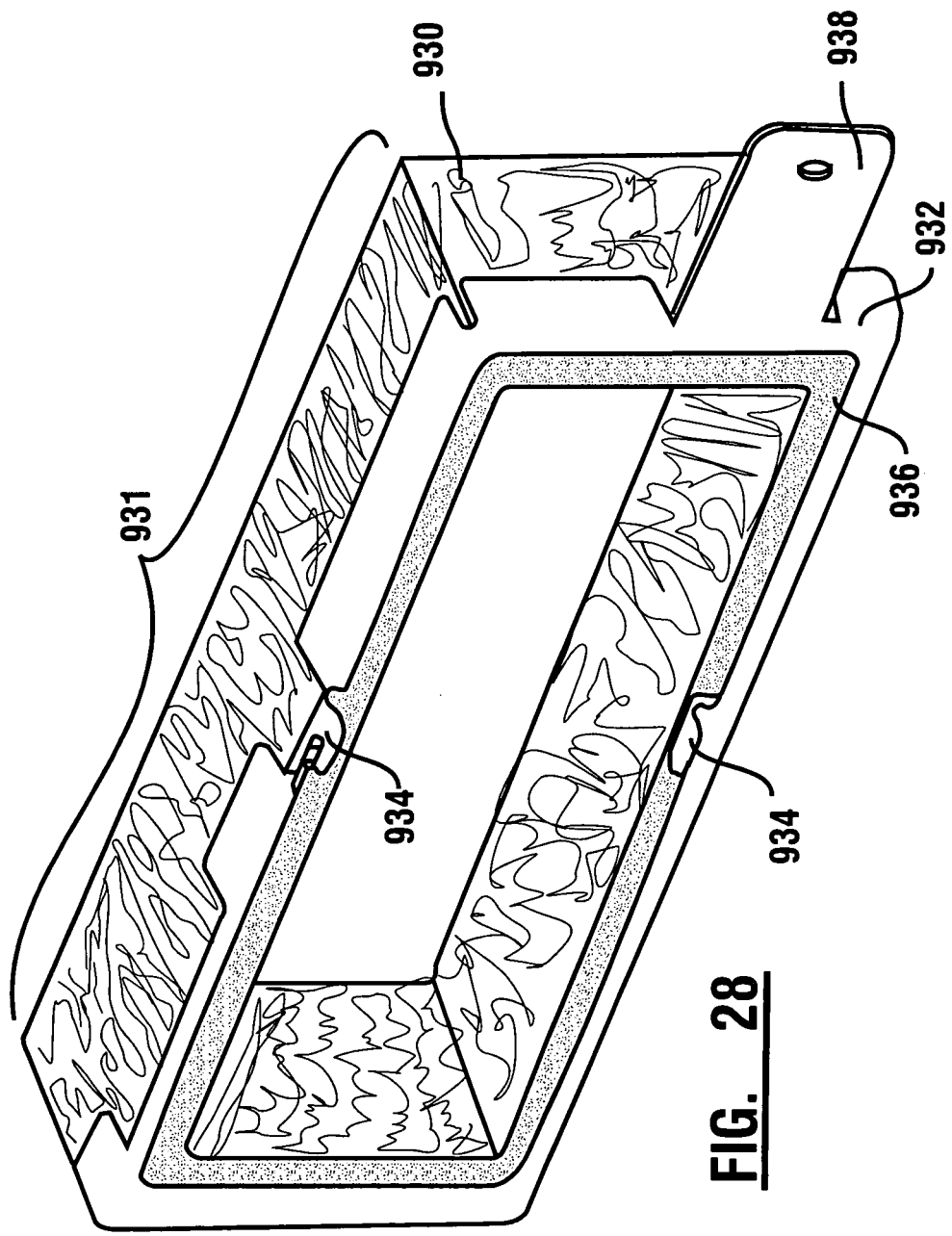
FIG. 28 is an isometric view of a duct assembly portion of an automated banking machine of an exemplary embodiment illustrating the details of the duct assembly.

A further exemplary embodiment is shown in FIGS. 27 and 28 which generally illustrate an exemplary duct assembly 931. The duct assembly 931 may comprise a resilient deformable duct 930 to which a frame 932 has been secured. In other embodiments ducts may be comprised of other enclosed structures operative to conduct air therethrough. In a further exemplary embodiment, the frame 932 may be comprised of relatively rigid material and may include one or more tab portions 938, one or more hook portions 934, or combinations of tab portions 938 and hook portions 934. In an exemplary embodiment, the frame 932 is adhered to the duct 930 with an adhesive 936 (FIGS. 28 and 30). In a further exemplary embodiment, the one or more tab portions 938 cooperate with, for example, one or more fasteners 939 (FIGS. 25 and 27) which can extend in and engage one or more apertures 937 in the component case 924 to reliably secure the duct 930 to the component case 924. While the fastener 939 is shown as a screw, it is to be understood that other fasteners may be employed. In an exemplary embodiment, the one or more hook portions 934 are configured to cooperate with and engage one or more component case slots 935 to reasonably secure the duct 930 to the component case 924. In the secured position the duct extends in surrounding relation of one or more processor case vents. While the duct assembly 931 is shown in exemplary fashion as secured to the component case 924, the duct assembly 931 may be secured to the housing 912, for example, the housing sidewall 916, or to other cases or elements of the ATM 910.

In a further exemplary embodiment, as shown in FIG. 30, the duct assembly 931 is adhered to the component case 924 with adhesive 936. The adhesive 936 is secured to an edge face 933, proximate the component case 924, and the duct assembly 931 adhered to the component case 924. As shown in FIG. 30, the adhesive 936 may secure the frame 932 to the duct 930 and the adhesive 936 may secure the duct assembly 931 to the component case 924. It is to be understood that the adhesive material used to secure the frame 932 to the duct 930 may not be the same adhesive material used to secure the duct assembly 931 to the component case 924. In a further exemplary embodiment, the frame 932 is secured to the duct 930 by other means. As can be seen from FIG. 30, forming the duct 930 from deformable resilient material, such as foam, enables the duct 930 to deform around the frame 932 thickness and contact the component case 924.

In an exemplary embodiment, a method is performed. The fascia 986 is moved from a position adjacent the opening 22 (FIG. 2) to the interior 20 of the housing 912 of the automated banking machine 910, to a position away from the opening 22. The component case 924 is moved from a position within the interior 20 of the housing 912 to a position at least partially extending through the opening 22. The duct assembly 931, at least partially secured to the component case 924 with the releasable resealable adhesive 936, is released and separated from the component case 924. A component (not shown), at least partially contained within the component case 924 is serviced. This may include replacing or adjusting a circuit card, processor board, a hard drive, a transformer or other component, for example. The duct assembly 931 is adhered to the component case 924, and the component case 924 moved from the position at least partially extending through the opening 22 to the position within the interior 20 of the housing 912. The fascia 986 is moved from the position away from the opening 22 of the housing 912 to the position adjacent the opening. In a further embodiment, the duct assembly 931, comprising the resilient deformable duct 930 with releasable resealable adhesive 936 secured thereto, the duct 930 is deformed to adhere to the component case 924. The duct 930 may also be comprised of combinations or portions of relatively rigid and other portions of resilient material. In a further embodiment, the duct assembly 931, further comprising the duct frame 932 having at least one hook portion 934 and the component case 924, further comprising the at least one slot 935, the at least one hook portion 934 is mated and engaged with the at least one slot 935. In a further embodiment, the duct assembly 931 further comprises the frame 932 having at least one tab portion 938 and an least one fastener 939 in operative connection with the at least one tab 938 and the component case 924 further includes at least one fastener hole 937. The at least one fastener 939 is mated with the at least one fastener hole 937. In some embodiments the duct 930 may be comprised of a relatively rigid material such as rigid plastic or sheet metal, for example.

In a further exemplary embodiment, a method is provided. The housing 912 is mounted in supporting connection with the chest 44 (FIG. 2). The card reader 24 (FIG. 3) is installed in operatively supported connection with the housing 912, the display 928 is installed in operatively supported connection with the housing 912, and a cash dispenser 64 (FIG. 3) is installed in operatively supported connection with the housing 912. The component case 924, having at least one component case vent 943, is installed in operatively supported connection with the housing 912. The duct assembly 931, including a duct 930 is adhered to the component case 924. In a further exemplary embodiment, the duct assembly 931 further includes a frame 932 and the method further includes securing the frame 932 to the duct 930. In a further exemplary embodiment, the frame 932 is adhered to the duct 930. In a further exemplary embodiment, the frame includes at least one hook portion 934 and the component case 924 further includes at least one slot 935, the slot 935 adapted to accept the at least one hook portion 934, the method further comprising mating the at least one hook portion 934 and the at least one slot 935. In a further exemplary embodiment, the frame 932 includes at least one tab portion 938, the duct assembly 931 further includes at least one fastener 939, and the component case 924 further includes at least one fastener hole 937. The method further comprises mating the at least one fastener 939 and the at least one fastener hole 937.

In still other embodiments a resilient duct may be positioned within the interior of the ATM. The duct may extend in surrounding relation of one or more housing vents and processor case vents. The duct face at one or more ends may be secured to an adjacent wall surface with a resealable or a single use adhesive. In some embodiments the adhesive may be replenished each time the duct is reengaged.

While the exemplary embodiments include particular structures to achieve the desirable results, those having skill in the art may devise numerous other embodiments with other structures which employ the principles described herein and which are encompassed by the subject matter as claimed.

Figure 31:
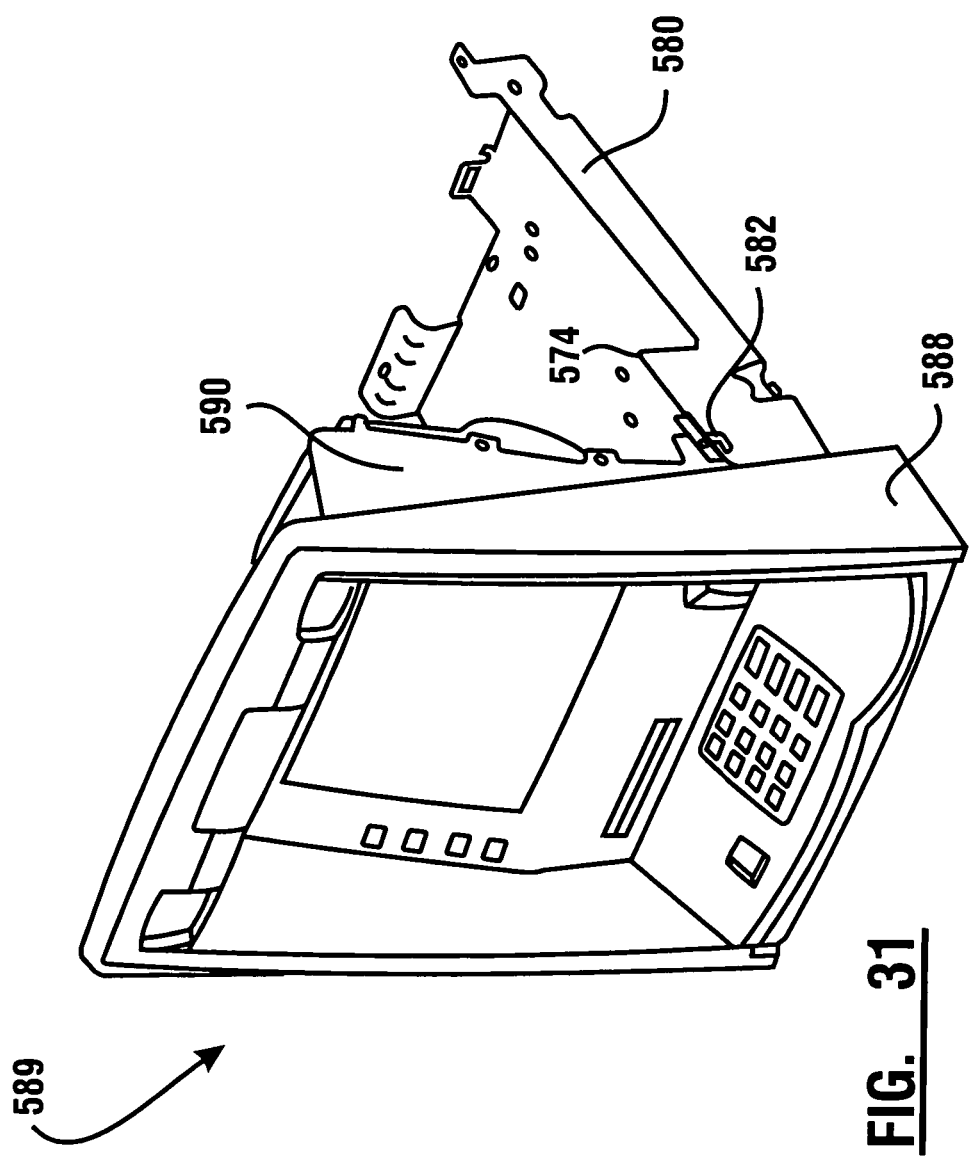
FIG. 31 is an isometric view of a portion of an exemplary automated banking machine illustrating a fascia assembly and a support.

Turning now to FIG. 31, there is shown therein a portion of an automated banking machine of a further exemplary embodiment. (See FIG. 1 for a general exemplary embodiment of an automated banking machine.) In this exemplary embodiment, a fascia assembly 589 comprises a fascia cover 588 operatively connected to a fascia frame 590. While the fascia cover 588 and fascia frame 590 may be described in the exemplary embodiment as separate elements, it is to be understood the fascia cover 588 and the fascia frame 590 may in some embodiments be of a single-piece construction. Also shown in FIG. 31 is a support 580. The support 580 may comprise a tray, which tray may further support automated banking machine components such as, by way of example only, a display 28 (e.g., FIG. 2), a card reader 24 (e.g., FIG. 2) and/or a receipt printer 30 (e.g., FIG. 2). The support 580 may comprise slides 84 (e.g., FIG. 2) either in combination with a tray or separately. The fascia assembly 586 is supported, at least in part, by the support 580. The support 580 is further supportively connected to the housing 12 (e.g., FIG. 2) and/or the chest 40 (e.g., FIG. 2).

Figure 32:
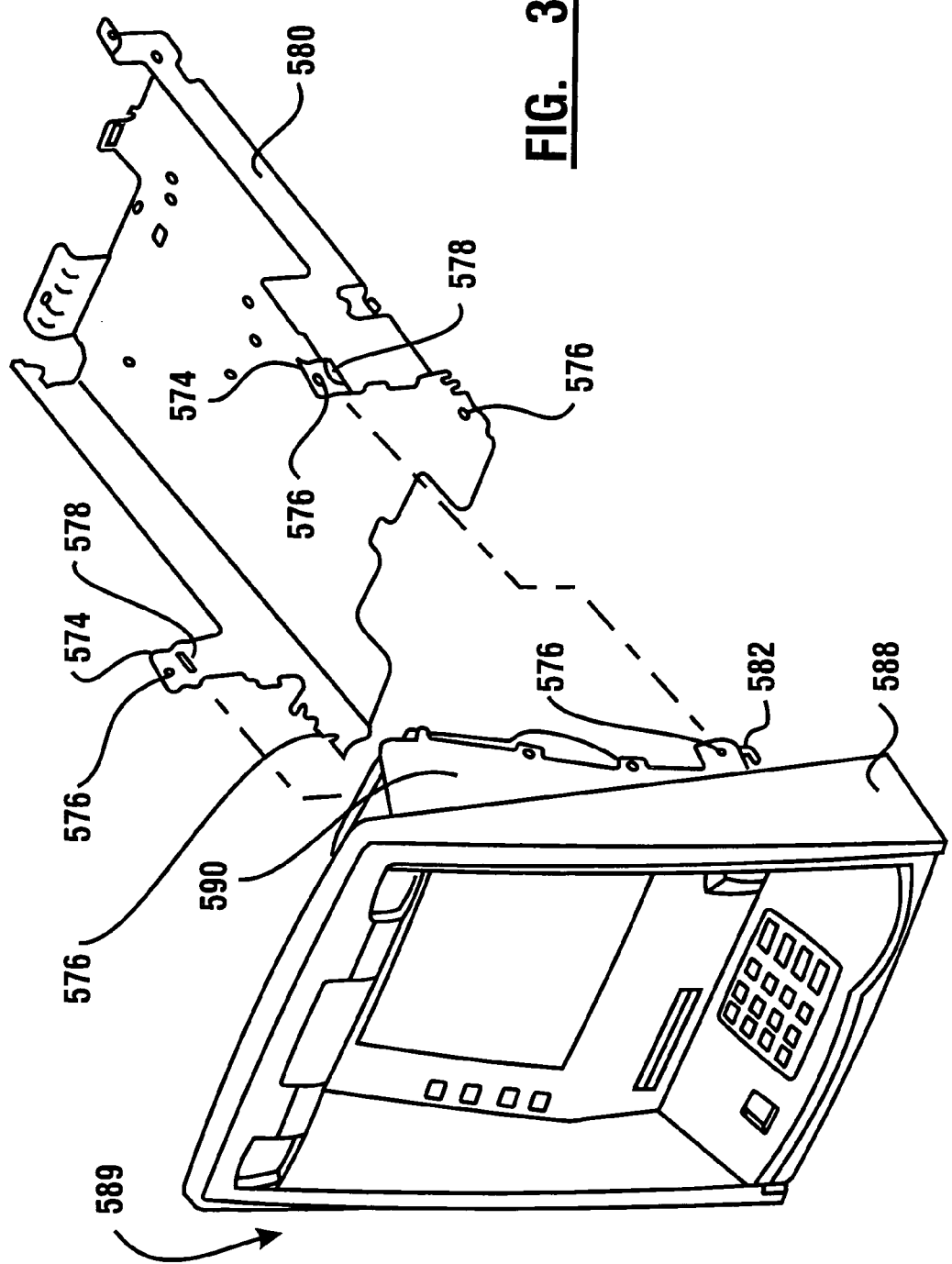
FIG. 32 is an exploded isometric view of a portion of the exemplary automated banking machine of FIG. 31 illustrating the fascia assembly and the support.

Turning now to FIG. 32, there is illustrated an exploded isometric view of the exemplary fascia assembly 586 and exemplary support 580 of FIG. 31 further illustrating the exemplary features. The fascia frame 588 comprises at least one hook 582 and may further comprise two or more hooks 582 (not shown) in spaced-apart relation. The support 580 comprises at least one slot 578 of the exemplary embodiment and may further comprise two or more slots 578. The at least one hook 582 and the at least one slot 578 are formed to enable the at least one hook 582 and the at least one slot 578 to engage and thereby at least partially secure the fascia assembly 586 to the support 580. It is to be understood that either the fascia frame 590 or the support 580 may comprise a hook 582 and the other of the fascia frame 590 or the support 580 comprise a slot 578.

Figure 33:
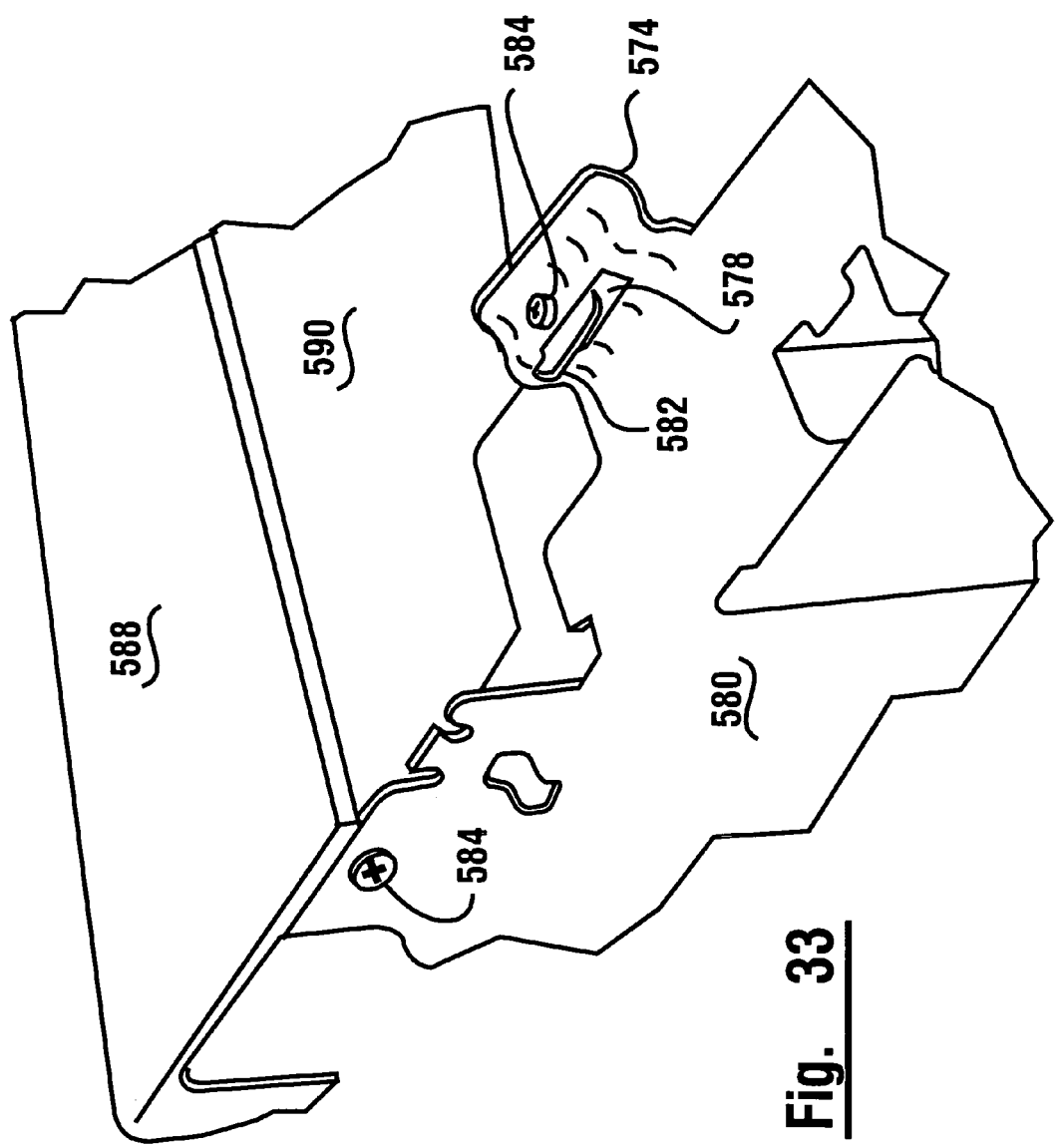
FIG. 33 is an isometric view of a portion of an exemplary automated banking machine illustrating portions of a fascia assembly and a support.
Figure 34:
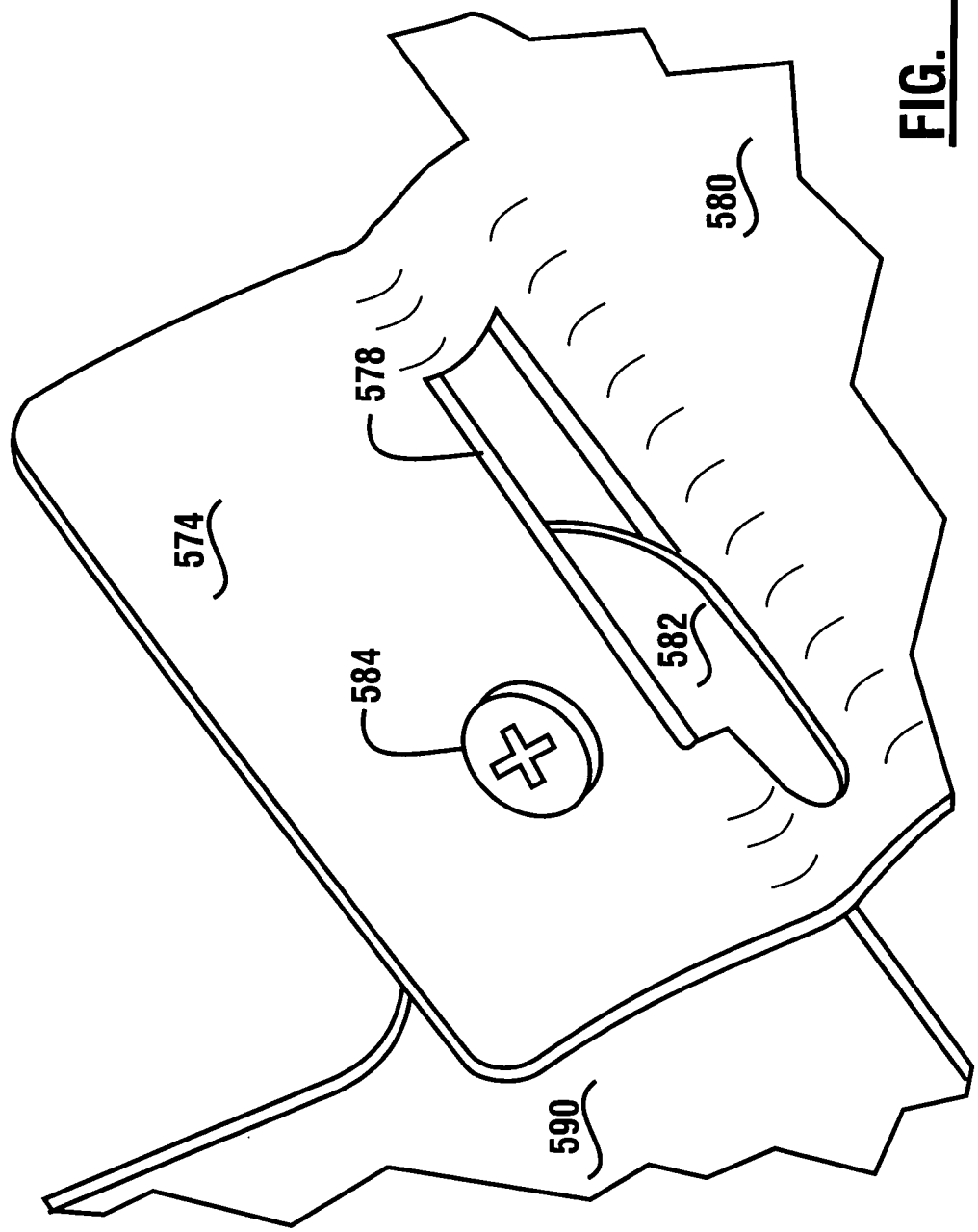
FIG. 34 is an isometric view of a portion of an exemplary automated banking machine illustrating portions of a fascia assembly and a support.

Turning now to Figures and 33 and 34, and with reference to FIG. 32, the details of the engagement of the hook 582 and the slot 578 may be further understood. As the hook 582 is engaged with the slot 578, the fascia assembly 589 becomes at least partially supported by the support 580. As such, the fascia assembly 589 may be initially engaged and further secured by a single person. Further, the fascia assembly 589 may be unsecured and disengaged by a single person. As best seen in FIGS. 33 and 34, the hook 582 may be offset from the slot 578 and thus provide a positive engagement between the hook 582 and the slot 578. To further secure the fascia assembly 589 to the support 580, one or more fasteners 584 may be utilized. By way of example only, as shown in FIGS. 33 and 34, a screw 584 may engage screw holes 576 in the fascia frame 590 and in the support 580.

The support 580 may further comprise one or more tabs 574 which may serve to guide the one or more hooks 582 into the one or more slots 578. As with the hooks 582 and the slots 578, it is to be understood that either the fascia frame 590 or the support 580 may comprise one or more tabs 574.

In an exemplary method, referring also to FIGS. 2, 3, and 31-34, the method comprises mounting a housing 12 in supporting connection with a chest 40 adapted for use in an automated banking machine 10, the housing 12 comprising an interior 20 and at least one opening 22 into the interior 20. The method comprises installing a card reader 24 in operatively supported connection with the housing 12, wherein the card reader 24 is operative to read indicia on user cards corresponding to financial accounts. The method comprises installing a display 28 in operatively supported connection with the housing 12. The method comprises installing a cash dispenser 64 in operatively supported connection with the housing 12. The exemplary method comprises installing a printer 30 in operatively supported connection with the housing 12 and operative to print information corresponding to financial accounts and financial transactions. It is understood the card reader 24, the display 28, the cash dispenser 64, and the printer 30 may be mounted onto various elements of the automated banking machine 10, including, but not limited to, a support 580 which may comprise a tray. The method comprises installing the support 580 in operatively supported connection with the housing 12, the support 580 moveable between a position substantially within the interior area 20 of the housing 12 and a position wherein at least a portion of the support 580 is extended through the housing opening 20. (Best understood by reference to FIG. 2.) The method comprises mounting a fascia assembly 589 to the support 580, the fascia assembly 589 comprising a fascia frame 590 and a fascia cover 588 in operatively supported connection with the fascia frame 590. At least one of the fascia frame 590 and the support 580 comprises at least a first hook 582 and the other comprises at least a first slot 578, the at least first hook 582 and the at least first slot 578 formed to engage each other. The method comprises engaging the at least first hook 582 with the at least first slot 578.

The exemplary method further comprises moving the at least first hook 582 to an offset position relative to the at least first slot 578. (Best seen in FIGS. 33 and 34.)

The exemplary method further comprises securing the fascia assembly 589 to the support 580 with, for example, a fastener 584 such as a screw.

The exemplary method further comprises moving the fascia assembly 589 to a secure closed position adjacent the housing opening 22. (Best seen in FIG. 1.)

In a further exemplary method, the method comprises moving a fascia assembly 589 in operatively supported connection with a housing 12 of an automated banking machine 10 from a secure closed position adjacent an opening 22 to an interior 20 of the housing 12 to a released away position away from the opening 22. (Best seen in FIGS. 1 and 2.) The automated banking machine 10 comprises a card reader 24 in operatively supported connection with the housing 12 and operative to read indicia corresponding to financial accounts on user cards, a display 28 in operatively supported connection with the housing 12, a printer 30 in operatively supported connection with the housing 12 and operative to print information corresponding to financial accounts and financial transactions, a cash dispenser 64 in operatively supported connection with the housing 12, and a support 580 in operatively supported connection with the housing 12, the support 580 moveable between a position substantially within the interior 20 of the housing 12 and a position wherein at least a portion of the support 580 is extended through the housing opening 22. (Best seen in FIGS. 1 and 2.) The fascia assembly 589 comprises a fascia frame 590 and a fascia cover 588 in operatively supported connection with the fascia frame 590. At least one of the fascia frame 590 and the support 580 comprises at least a first hook 582 and the other comprises at least a first slot 578, the at least first hook 582 and the at least first slot 578 formed to engage each other. The method comprises disengaging the at least first hook 582 from the at least first slot 578. The method comprises servicing at least one of a serviceable automated banking machine component. Such serviceable automated banking machine components include, for example, the card reader 24, the display 28, the printer 30, and the cash dispenser 64. The method comprises engaging the at least first hook 582 with the at least first slot 578. The method comprises moving the fascia assembly 589 from the released away position from the opening 22 to the secure closed position adjacent the opening 22 (best seen in FIGS. 1 and 2).

The fascia assembly 589 may be secured to the support 580 with one or more fasteners 584, and the method further comprises releasing the one or more fasteners 584 securing the fascia assembly 586 to the support 580.

The exemplary method further comprises securing the one or more fasteners 584 securing the fascia assembly 586 to the support 580.

Figure 35:
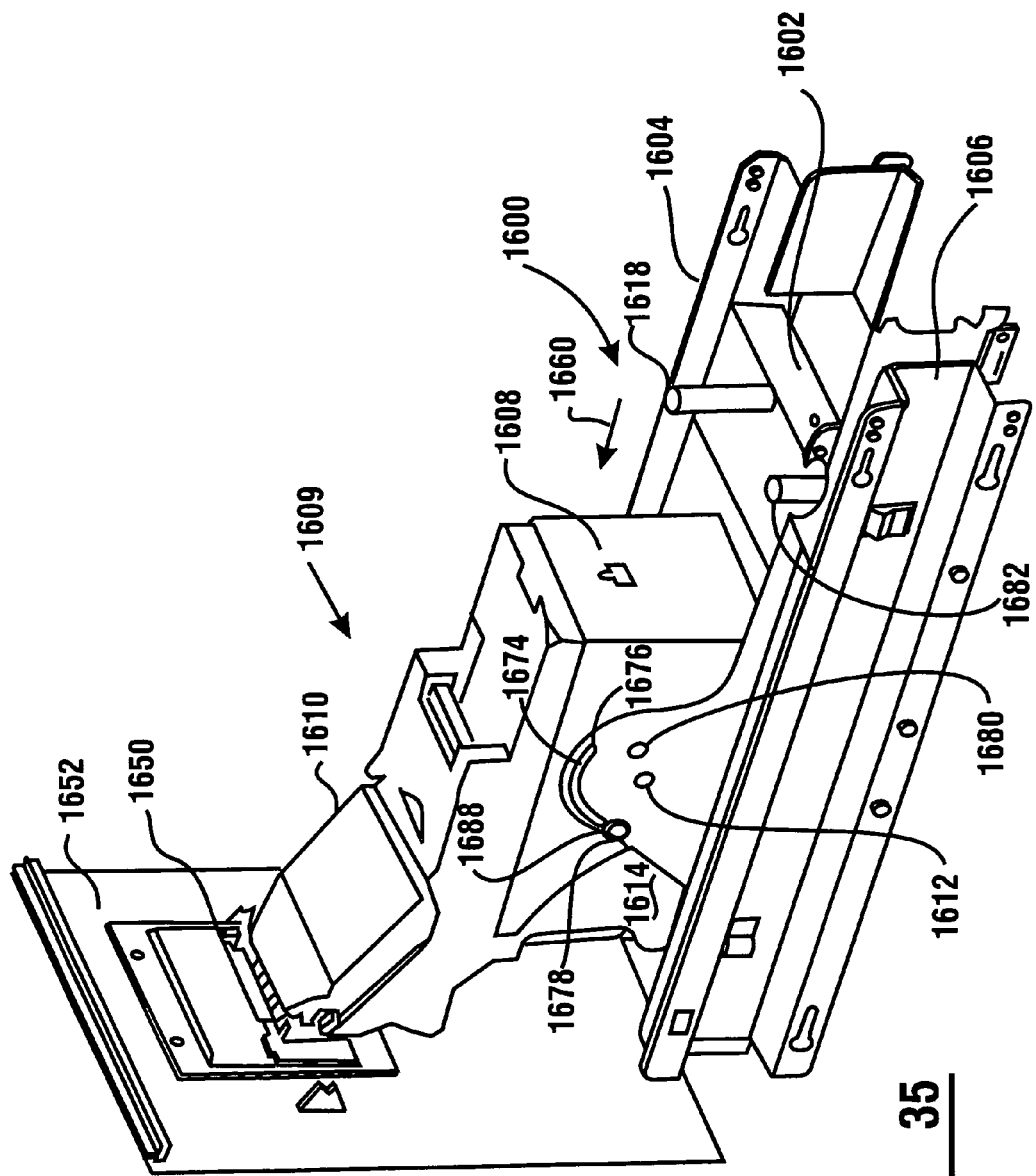
FIG. 35 shows an apparatus that can support and facilitate servicing of a note validator.

FIG. 35 illustrates a further exemplary embodiment of an apparatus 1600 operative to support and facilitate servicing of a note validator or other components that may require service and/or maintenance. In this embodiment, the apparatus may include a movable tray 1602 in operatively sliding and supporting connection with a tray support, such as a pair of slides 1604, 1606. The tray may be operative to move between a retracted position (shown in FIG. 35) and an extended position (shown in FIG. 36) with respect to portions of the pair of slides that are mounted to another structure such as an enclosure. Thus, the tray 1602 may function as a rollout tray. To facilitate moving the tray, the tray may include a handle 1618 that is manually pulled and pushed to move the tray.

With the tray 1602 in the tray extended position (FIG. 36), a first end of the tray (e.g., tray end near the handle) is located horizontally beyond a first end of the tray support (e.g., slides 1604, 1606). Conversely, with the tray 1602 in the tray retracted position (FIG. 35), this (first) tray end is not located horizontally beyond this (first) tray support end. In an exemplary embodiment the tray 1602 comprises side panels that slide relative to the slides. Male side panels can be movably positioned inside female slides. Rollers and bearings can be used to facilitate movement of the tray relative to the slides. In other embodiments the side panels can be telescoping to further extend outward movement of the tray away from the retracted position.

Figure 36:
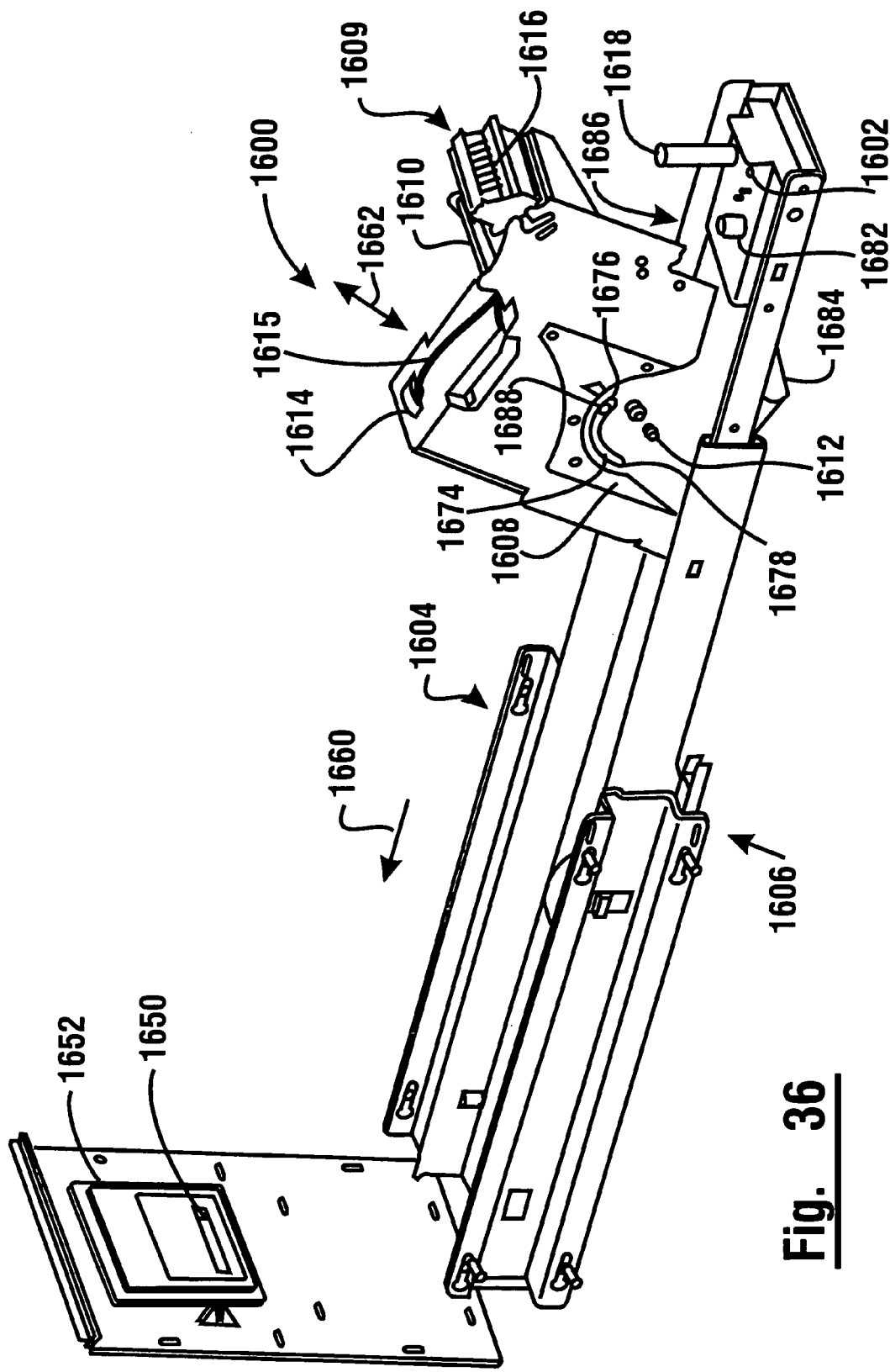
FIG. 36 shows movable tray of the apparatus in a tray extended position.

As shown in FIGS. 35 and 36, the apparatus 1600 also includes a component rack 1608 in operatively pivoting and supporting connection with the tray 1602. The rack 1608 is mounted to pivot (which includes rotating or tilting) relative to the tray 1602 between a service orientation (shown in FIG. 36) and an operation (or docking) orientation (shown in FIG. 35). In this embodiment, the rack 1608 has a size and configuration that is adapted for supporting a validator assembly 1609 which includes a currency note validator 1610. In an exemplary embodiment, the rack is particularly configured and sized so that the validator assembly is fitted therewith. The configuration allows the validator assembly to be engagingly, securely, supported by the rack.

The rack may be comprised of a relatively rigid material, such as metal and/or rigid plastic.

The validator assembly 1609 is mounted in operatively supported connection with the rack 1608 such that both the validator assembly and the rack pivot together as a unit with respect to the tray 1602. However, it should be understood that in other alternative embodiments, the component rack may have other sizes and configurations that are directed to mounting other types and sizes of machine components and devices to the rack.

To enable the rack to pivot with respect to the tray, the tray and rack may be connected via one or more pivot members 1612. Such pivot members may correspond to a bolt, pin, rod, shaft, or other fastener or support structure, about which at least one of the tray and rack may rotate. For example, FIG. 35 shows an example pivot member 1612 that extends into the tray 1602 and the rack 1608. The pivot member 1612 supports the tray and rack in pivoting connection with respect to each other. In this embodiment, the opposite side of the tray and rack also include a correspondingly arranged (second) pivot member.

A pivot member 1612 provides a substantially horizontal axis about which the rack can rotate (or pivot) relative to the tray 1602. In an exemplary embodiment there are two pivot members, which are horizontally and vertically aligned with each other. Each exemplary pivot member 1612 includes a bolt that is threaded into a respective side of the rack 1608.

In an exemplary embodiment the tray 1602 includes opposed sides 1670, 1672. Each tray side has a hole through which a pivot member 1612 can extend. The rack 1608 is positioned between (or intermediate) the opposed sides. The rack 1608 is mounted to the opposed tray sides 1670, 1672 by the pivot members extending in the respective side holes. Thus, the rack 1608 can be supported by the sides 1670, 1672 through the pivot members 1612. As shown in FIG. 35, the tray sides 1670, 1672 can each have an elevated section that extends vertically above the slides 1604, 1606. The sections can have a curved shape, such as a cone shape, parabolic shape, or camel hump shape.

As shown in FIG. 36, the tray 1602 includes an opening 1686. The opening 1686 can be through a bottom (or floor) portion of the tray. The opening 1686 can extend between the tray sides 1670, 1672. The lower opening 1686 allows the rack 1608 to be pivoted relative to the tray 1602. The opening 1686 enables portions 1684 of the rack 1608 (or the note validator) to extend vertically through (and below) the tray during rack pivoting into the service orientation.

As shown in FIG. 36, the validator assembly 1609 can include both the validator 1610 and a removable cassette 1614. The cassette 1614 can be used to hold or store currency notes. The cassette 1614 is shown having a cassette carrying strap 1615. In an exemplary embodiment, when the component rack 1608 is moved with the tray 1602 to the extended position and is pivoted to the service orientation (as shown in FIG. 36), each of the rack 1608, validator 1610, and cassette 1614 are accessible to a service person. That is, the rack 1608 can be horizontally positioned (moved outward) and angularly oriented (pivoted) to allow a cassette to be removed/inserted adjacent to the note validator. Thus, in this extended position and service orientation, the rack is serviceably positioned (by being moved both horizontally and angularly) to permit a cassette to be replaced. Thus, a full cassette can be replaced with an empty cassette.

Once the cassette has been placed into operative engagement with the note validator, the component rack (while including the cassette engaged to the validator) is operative to pivot with respect to the tray from the service orientation to the docking orientation. Once the component rack has been pivoted to the docking orientation, the component rack (including the cassette engaged to the validator) is operative to move with the tray from the extended position to the retracted position. In other embodiments the tray is first moved to its retracted position, and then the rack is pivoted to the docking orientation. While in the retracted position and docking orientation, the currency cassette (supported by the rack) is in a machine operating position which allows the cassette to receive currency notes (from the validator assembly) that were validated (determined as valid) by the validator.

The component rack (supporting a cassette adjacent to the note validator, with the cassette substantially full of currency notes) can be moved out to the extended position of the tray. The rack can then be pivoted to the service orientation to enable the cassette which may be full or partially filled to be manually accessed (reached) so it can be replaced with an empty cassette by a service person (for example). Also, the component rack is operative to move between the extended and retracted positions (via the tray) and also between the docking and service orientations, without a cassette (or without a cassette being engaged with a note validator). Likewise, the rack can be similarly moved (to extended/retracted positions and docking/service orientations) without a note validator (or a cassette) being supported by the rack. As described, the rack can be placed relative to a machine in at least four different end situations, including fully retracted/docking, fully extended/docking, fully extended/service, and fully retracted/service.

Figure 40:
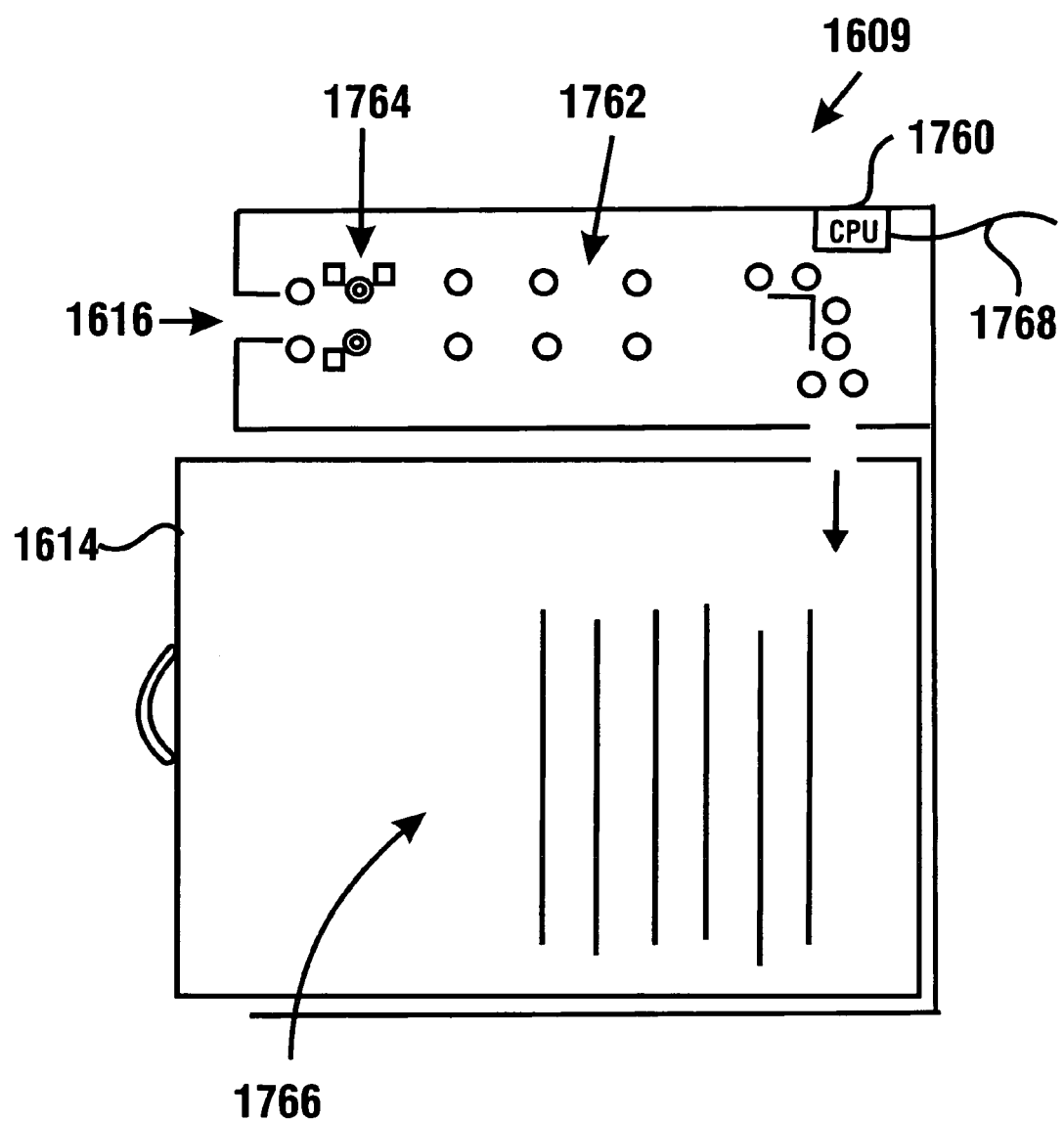
FIG. 40 shows a schematic view of an embodiment of a note validator assembly.

When the cassette is engaged with the note validator, the note validator is operative to receive notes inserted through an opening 1616 in the note validator. As shown schematically in FIG. 40, the note validator assembly 1609 may include a processor 1760, a note transport 1762, and one or more scanning devices 1764. The scanning (or reading) devices may be operative to optically scan both sides of a received note to produce data representative of images or other sensed data of the front and back of each note. The scanning devices may also include other types of sensors such as magnetic sensors, ultraviolet sensors, infrared sensors, ultrasonic sensors or combinations thereof that provide data usable to determine genuineness or other properties of a note. The processor may be responsive to the image data and/or other sensed data to determine the type and denomination of the notes and to determine whether the notes are acceptable by the note validator. For example, the processor may evaluate the image data and other sensed data to determine whether the notes have a high or low probability of being counterfeits. Also the processor may evaluate whether the notes have a country of origin, denomination, and/or other characteristics for which the note validator is configured to analyze or accept.

The validator assembly 1609 can read a currency note (e.g., currency bill or sheet) in the process of determining the (acceptable or unacceptable) validity of the note. Thus, the currency note validator assembly 1609 also functions as a currency note reader assembly. The currency note reader can be used in conjunction with a variety of devices and machines, including an automated banking machine (e.g., ATM), gaming device, vending machine, or any other machine/device that is operative to use a currency note reader to read notes. Thus, the currency note reader can be used in various industries (or businesses) where currency notes are used, including the banking, currency exchange, vending, merchant, and casino industries. Of course it should be understood that while the exemplary embodiment receives currency notes, other embodiments may receive (and/or dispense) other types of sheets.

When the note is determined to be acceptable, the processor is operative to cause the transport to move the note into the adjacent currency cassette 1614. Also, when the note is determined as not acceptable, the processor is operative to cause the transport to move (return) the note to extend through the opening 1616, from which position it can be taken by the user operating the device. In this exemplary embodiment, the cassette may correspond to a plastic stacking cassette that stores notes as a stack 1766 inside the cassette. However, alternative note validators for use with the described apparatus 1600 may be used with other types of cassettes.

An exemplary embodiment of the note validator assembly 1609 may also include a communication link 1768 connected to the processor of the note validator assembly, which may be connected to a communication port of a computer processor of a further machine or device. Such a further machine may include an ATM, gaming device, vending machine, or any other machine that is operative to use a note validator to accept notes. The communication link may correspond to a USB connection, an Ethernet network connection, or any other form of connection which permits communication of data between the note validator and the further machine. Such data may include, for example, messages that indicate that notes have been recently inserted into the machine. Such messages may also indicate the denomination of the notes and any other characteristics of the notes determined by the note validator. The further machine may then use the information to carry out a transaction such as the crediting of a deposit to a financial account, purchasing of an item or service provided by the further machine, or any other transaction that involves the payment of an amount of value via physical notes.

An example of a note validator capable of being mounted to the described apparatus 1600 includes an MEI CashFlow SC series (such as an SLC66 model) bill acceptor. However, it is to be understood that exemplary embodiments of the described apparatus 1600 may be used with other types of note validators or other types of sheet accepting or dispensing devices. Also, as discussed previously, the described apparatus 1600 may be used with other types of components that may be more easily serviced by moving the position and rotational orientation of the component. Such other types of components may include devices that accept and/or dispense items such as tickets, coupons, envelopes, sheets, checks, cards, or any other item capable of being stored in a removable cassette. For example in an alternative exemplary embodiment the deposit accepting device shown in U.S. patent application Ser. No. 11/983,410 filed Nov. 8, 2007 (which is hereby incorporated by reference herein in its entirety) may be adapted for use with the described apparatus 1600.

Furthermore, the described apparatus 1600 may be used with another upper banking machine component instead of the validator 1610. For example, apparatus 1600 may be used with a reader component, such as a card reader or a biometric reader. That is, the validator 1610 can be replaced by (or exchanged with) another upper banking machine component, such as the previously discussed card reader 24 supported on rollout tray 80. Likewise, the discussed currency cassette 1614 can be replaced by (or exchanged with) a card storage unit (e.g., a card cassette). In operation, a card read by the card reader which is determined to be invalid (e.g., counterfeit) would be moved to (and retained in) the card storage unit. After the card storage unit is determined to be full, it would be emptied. The pivoting rack arrangement would function in a manner as previously discussed, except the rack 1608 would support the card reader and the card storage unit (instead of supporting a validator and a currency cassette). The rack which supports the card reader can also be adjustably configured and positioned relative to its rollout tray, especially to allow for a card reader that may have a configuration different from a validator. The adjustment can ensure that both the rollout tray can be moved to its extended position and the rack can be pivoted into its service orientation.

Figure 37:
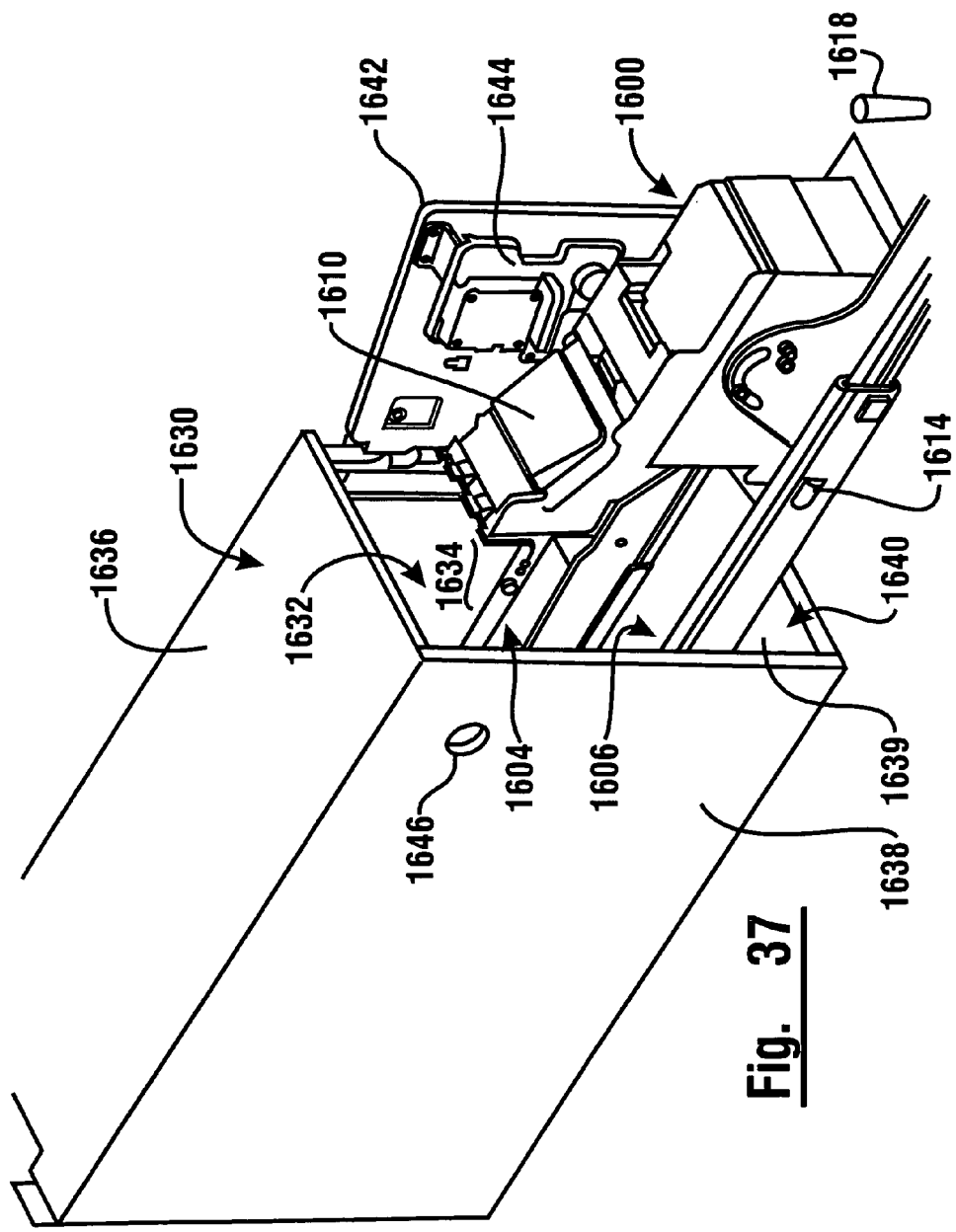
FIG. 37 shows an enclosure in which the apparatus may be mounted.

An example embodiment of the apparatus 1600 may be mounted inside a secure enclosure that is operative to minimize the opportunity for notes stored in the cassette 1614 from being stolen. FIG. 37 shows an example of an enclosure 1630 in which the apparatus 1600 may be mounted. In this embodiment, the enclosure may include an interior area 1632 bounded by a plurality of walls 1634, 1636, 1638, 1639. The enclosure may also include at least one opening 1640 to the interior area, and a door 1642 movable between a closed position that covers the opening and an open position that provides access to the opening 1640. The door may further include a locking mechanism 1644 capable of locking the door in the closed position. In an exemplary embodiment, the pair of slides 1604, 1606 are mounted in operatively supporting connection to the inside surfaces of the opposed side walls 1634, 1638 of the enclosure.

Referring again to FIG. 35, the slides 1604, 1606 may be mounted in positions that are operative to enable the apparatus 1600 (in the described retracted position and docking orientation) to be positioned inside the enclosure with the door in the closed position. In this tray retracted position (and rack docking orientation) inside the enclosure, the opening 1616 of the note validator is located adjacent to at least one slot 1650 (e.g., a currency note slot) through a wall 1652 of the enclosure. In an exemplary embodiment in this position, the note validator opening 1616 is substantially aligned with the currency slot 1650. Thus, currency notes inserted into the currency slot 1650 go into the note validator opening 1616.

Also, as shown in FIG. 37, when the door 1642 is in the open position, the rack (including the cassette engaged to the note validator) is operative to move with the tray with respect to the slides mounted to the enclosure, to the extended position. In the extended position, the rack with the cassette engaged to the note validator extends outside the opening 1640 and may be pivoted to the service orientation (shown in FIG. 36) in order to facilitate replacing the cassette.

The enclosure 1630 shown in FIG. 37 may be for example mounted on or inside another enclosure which houses the further machine that controls the note validator (e.g., an ATM, gaming machine, vending machine, or other apparatus that uses the note validator). In this described example, the enclosure 1630 may include a hole 1646 therethrough, which facilitates the routing of a communication link (e.g., a USB cable) between the note validator and the computer system of the further machine that controls the note validator. Also, in alternative embodiments in which the further machine does not include a housing capable of including the described enclosure 1630 therein, the enclosure 1630 may be mounted to an outside wall of the housing of the further machine.

Figure 38:
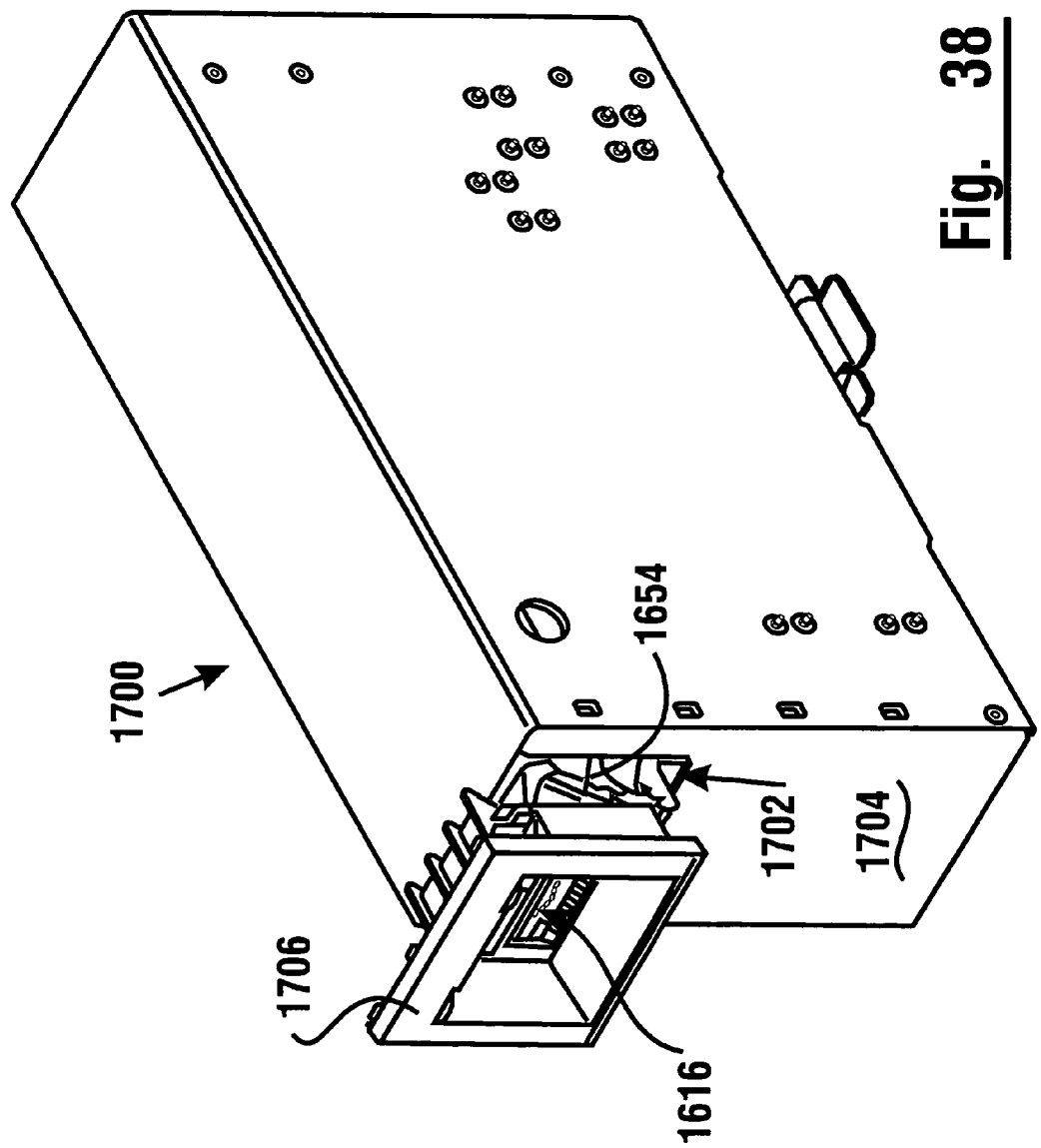
FIG. 38 shows an alternative embodiment of an enclosure for use with the apparatus.

FIG. 38 shows an alternative embodiment of an enclosure 1700 for use with the described apparatus 1600. In this embodiment, the slides may be mounted within the enclosure such that when the tray is in the retracted position, portions 1654 of the note validator that include the opening 1616 of the note validator extend through a slot 1702 in a wall 1704 of the enclosure. In this embodiment, the enclosure 1700 may be mounted on or inside or otherwise in operatively supported connection with a larger enclosure such as a housing of an ATM. In some embodiments the enclosure may be fastened in generally permanently fixed relation to a chest portion of the machine. In such embodiments the enclosure may be fastened using fasteners that are not accessible to unfasten other than from inside of the chest. A machine housing including such an embodiment may include a fascia with a bezel 1706, through which notes can be inserted into the housing and into the opening of the note validator.

Referring back to FIG. 35, example embodiments of the apparatus 1600 may include latch mechanisms 1680, 1682 that when in an operatively locked orientation are operative to prevent movement of the tray from the retracted position and prevent pivoting from either the docking or service orientations. Such latches, for example, may include movable pins mounted to the tray 1602. Such pins may be biased via springs to project into designated holes in the rack 1608 and one of the slides 1606, to prevent relative movement of the tray with respect to the rack and the slides. The pins may include handles that can be manually pulled, to remove the pins from the designated holes and place the latch mechanisms in unlocked orientations. However, when the rack is pivoted to at least one of the docking or service orientations and/or the tray is slid to the retracted position, the pins become aligned with designated holes at the retracted positions and the docking or service orientations, and are urged via respective springs to move into engagement with the holes to place the respective latches in locked orientations.

As shown in FIG. 36, in exemplary embodiments, the tray moves in a first direction 1660 from the extended position to the retracted position. In the retracted position and docking orientation of FIG. 35, the note validator assembly 1609 has an orientation in which the cassette (absent being blocked by a wall 1652 of an enclosure) would be able to slide out of operative engagement with the note validator 1610 by moving further in the first direction 1660. However, as shown in FIG. 36, when the rack is in the extended position and is pivoted with respect to the tray to the service orientation, the note validator assembly 1609 has an orientation such that the cassette 1614 may be slid into and out of operative engagement with the note validator 1610 in directions 1662 that are transverse to (e.g., at an angle to) the first direction 1660. That is, when the rack is in the extended position and in the service orientation, the cassette 1614 may be manually removed from the rack 1608 (and the validator assembly). In addition, in embodiments (such as shown in FIGS. 35 and 36 where the rack is operative to pivot with respect to the tray more than 90 degrees and less than 180 degrees), the cassette 1614 may also be slid out of engagement with the note validator at an angle (typically upwardly) that moves the cassette in a direction substantially opposite the first direction 1660. However, it is to be understood that in alternative embodiments, the rack 1608 may be manually pivoted with respect to the tray between the validator operation orientation and the validator service orientation for other amounts of angular rotation (i.e., 90 degrees, less than 90 degrees, 180 degrees, or greater than 180 degrees).

In some embodiments with latching mechanisms, when the rack is moved to the docking orientation, the rack may include a first designated hole that becomes aligned and engaged with a pin, in order to maintain the rack in the docking orientation. Similarly when the rack is moved to the service orientation, the rack may include a second designated hole positioned to be engaged with the pin after the rack is moved more than 90 degrees from the docking orientation. 11. Thus, in this described embodiment, a latching mechanism may serve to minimize opportunity for the rack to pivot beyond the designated docking and service orientations.

However, some embodiments of the apparatus may include additional or alternative features that are operative to limit the range of angular rotation of the rack with respect to the tray. For example, at least one of the sides 1670, 1672 of the tray may include a curved slot 1674 with opposed ends 1676, 1678, into which a (guide) projection 1688 of the rack extends. The location of the projection 1688 on the rack and the location of the curved slot 1674 on the tray is (radially) spaced apart from the axis of rotation of the pivot member 1612. When the rack pivots with respect to the tray, movement of the projection 1688 is limited to moving between the ends 1676, 1678 of the curved slot. In this described embodiment, one end 1676 of the curved slot may be positioned to stop the rack from rotating at about the docking orientation. Similarly, the opposite end 1678 of the curved slot may be positioned to stop the rack from rotating at about the service orientation.

In addition, as discussed previously with respect to other embodiments, it should be noted that an ATM that comprises the described apparatus 1600 may be operative responsive to data bearing records to cause financial transactions to be carried out. Such an ATM may include or be in operative connection with at least one computer that is in operative connection with a processor of the note validator. The ATM may also include a card reader in operative connection with the at least one computer. Such a card reader is operative to read data on user cards corresponding to financial accounts. Also the ATM may include a printer in operative connection with the at least one computer, which printer is operative to print information corresponding to financial accounts and financial transactions. In addition, the ATM may include a cash dispenser in operative connection with the at least one computer.

Further, it should be understood that the described apparatus 1600 may be used by a technician to facilitate replacing a cassette for the note validator from a rearward position with respect to the front of a machine (e.g., an ATM) from which customers of the machine typically insert notes into the note validator. For example with reference to FIG. 37, such a process of replacing a cassette may include moving the rearward door 1642 of the enclosure 1630 from a closed position adjacent the opening 1640 of the interior area 1632 of the enclosure 1630 to an open position away from the opening. Subsequent to opening the door 1642, the process may include moving the tray 1614 (along with the rack supporting the cassette 1614 and the note validator 1610) from the retracted position to the extended position in order for at least a portion of the note validator to extend out of the opening 1640. In addition, subsequent to moving the tray, the process may include pivoting the rack (supporting the cassette 1614 and the note validator 1610) from the docking orientation (shown in FIG. 35) to the service orientation (shown in FIG. 36). After pivoting the rack, the process may further include sliding an existing cassette 1614 out of engagement with the note validator 1610 and sliding a new cassette into engagement with the note validator. That is, an existing cassette 1614 that is positioned adjacent to the note validator 1610 can be removed from its cassette position on the rack, and then another cassette can be inserted into that vacated cassette position.

In addition, subsequent to engaging the new cassette with the note validator, the process may include pivoting the component rack including the new cassette engaged with the note validator from the service orientation to the docking orientation. After pivoting the rack to the docking orientation, the process may include moving the tray including the new cassette engaged with the note validator from the extended position to the retracted position, to place the note validator adjacent to the at least one slot 1650 (as shown in FIG. 35) to enable the note validator to receive notes inserted through the at least one slot. In addition, subsequent to moving the tray to the retracted position, the process may include closing the door (and locking the door) of the enclosure.

Figure 39:
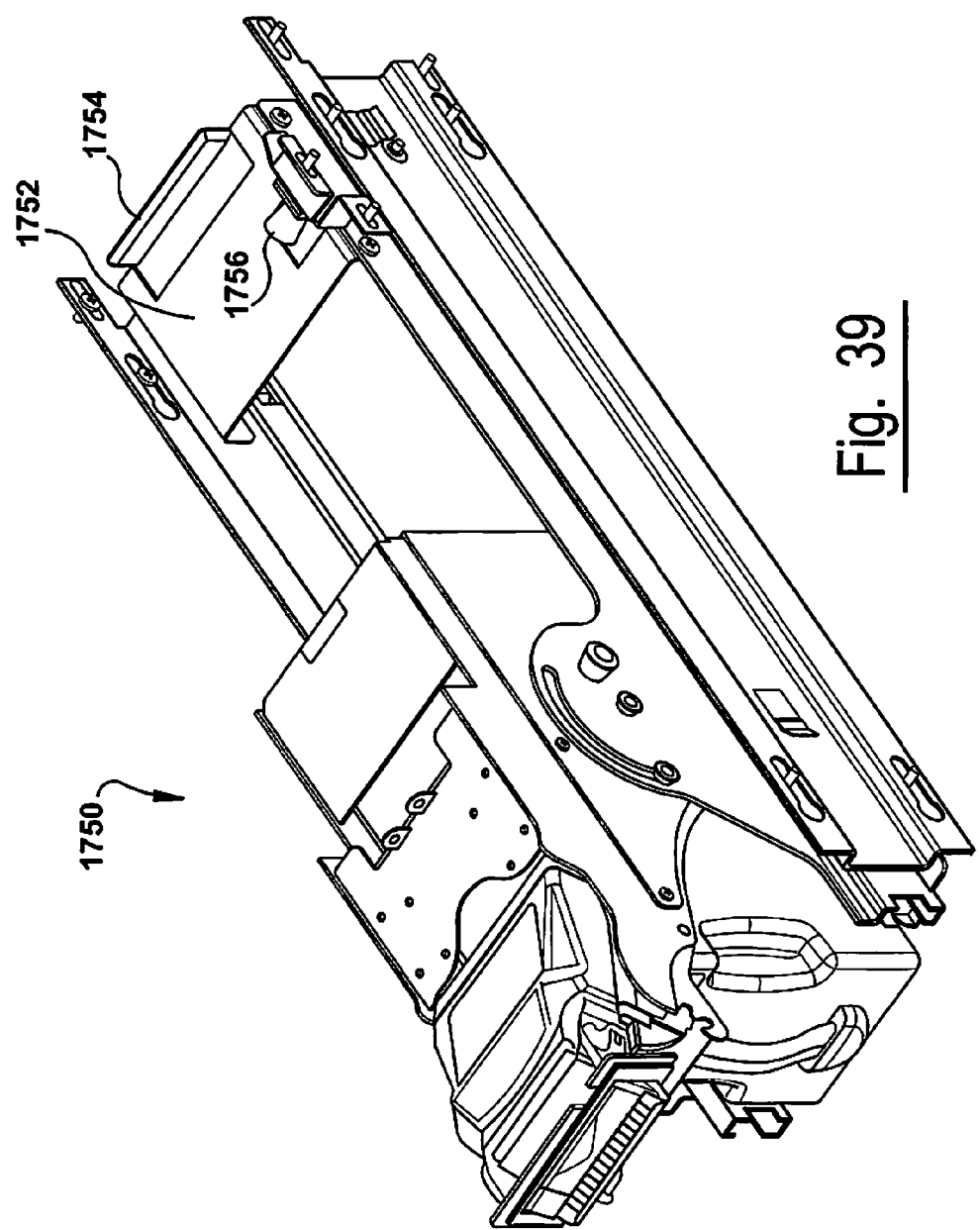
FIG. 39 shows an alternative embodiment of an apparatus that can support and facilitate servicing of a note validator.

In addition, although the apparatus 1600 has been described with various features, it is to be understood that alternative embodiments may include different features, additional features, and/or different combinations of features. For example, FIG. 39, shows an alternative embodiment of the apparatus 1750 for use with servicing a component such as a note validator. Here, the apparatus 1750 includes a tray 1750 that includes a raised back wall 1754, which can be grasped to move the tray between the extended and retracted positions. Also, the tray 1750 includes an alternative latch mechanism 1756 that is pulled horizontally to enable the tray to move out of the retracted position.

While the exemplary embodiments include particular structures to achieve the desirable results, those having skill in the art may devise numerous other embodiments with other structures which employ the same principles described herein and which are encompassed by the subject matter as claimed.

Thus, the exemplary embodiments achieve at least some of the above stated objectives, eliminate difficulties encountered in the making and use of prior devices, solve problems, and attain the desirable results described herein.

In the foregoing description, certain terms have been used for brevity, clarity, and understanding. However, no unnecessary limitations are to be implied therefrom, because such terms are for descriptive purposes and are intended to be broadly construed. Moreover, the descriptions and illustrations herein are given by way of examples, and the invention is not limited to the exact details shown and described.

In the following claims, any feature described as a means for performing a function will be construed as encompassing any means capable of performing the recited function, and will not be deemed limited to the particular means shown as performing that function in the foregoing description or mere equivalents thereof.

Having described the features, discoveries, and principles of the invention, the manner in which it is constructed and operated, and the advantages and useful results attained; the new and useful structures, devices, elements, arrangements, parts, combinations, systems, operations, methods, and relationships are set forth in the appended claims.

I claim:

1. Apparatus comprising:
 a banking system comprising:
  at least one automated banking machine,
   wherein the at least one automated banking machine includes a banking machine,
    wherein the banking machine is operative to cause financial transfers responsive at least in part to data provided by machine users,
    wherein the banking machine includes:
     at least one data reader device,
      wherein the at least one data reader device operative to read customer identification data provided by a machine user,
     a cash dispenser,
      wherein the cash dispenser is operative to cause stored cash to be dispensed, and
     at least one display device,
     a currency note reader assembly,
      wherein the currency note reader assembly includes an assembly opening sized to receive at least one currency note therethrough,
      wherein the currency note reader assembly includes a currency note validator,
     an enclosure,
      wherein the enclosure includes a plurality of walls and an interior area,
      wherein a wall of the plurality of walls includes a currency slot that is sized to receive at least one currency note therethrough,
      wherein the enclosure includes slides mounted in the interior area,
     a movable tray in operatively sliding and supported connection with the slides,
      wherein the tray is movable with respect to the slides between a tray retracted position and a tray extended position,
      wherein in the tray retracted position, the tray is located inside of the interior area,
      wherein in the tray extended position, at least part of the tray is located outside of the interior area,
     a component rack supported by the tray,
      wherein tray support of the rack causes the rack to move with the tray when the tray moves with respect to the slides,
      wherein the rack supports the currency note reader assembly,
      wherein the rack supports a removable currency cassette in a cassette position which allows the cassette to receive currency notes validated by the validator,
      wherein the rack while supporting the cassette and the validator, is movable with the tray between the tray extended position and the tray retracted position,
      wherein the rack while supporting the cassette and the validator, is pivotable relative to the tray about an axis between a service orientation and an operation orientation,
      wherein with the rack in the service orientation and with the tray in the tray extended position, the cassette is accessible by a machine servicer,
      wherein with the rack in the operation orientation and with the tray in the tray retracted position, the assembly opening is located adjacent to the currency slot,
  at least one computer associated with the banking machine,
   wherein the at least one computer is in operative connection with the at least one data reader device, the cash dispenser, the at least one display device, and the validator,
   wherein the at least one computer is operative to
    cause customer identification data to be read through operation of the at least one data reader device,
    cause read customer identification data to be compared with authorized machine user identification data stored in an authorized machine user information data store, and
    cause cash to be dispensed from the machine through operation of the cash dispenser,
   wherein the at least one computer is operative to allow a machine user to request a cash dispense transaction responsive at least in part to the machine user being recognized as an authorized user of the machine based at least in part on computer-determined correspondence between
    customer identification data read by the at least one data reader device, and
    authorized Machine user identification data stored in the authorized machine user information data store, wherein the at least one computer is operative to cause a financial account to be assessed a value associated with cash dispensed.

2. The apparatus according to claim 1 wherein the at least one automated banking machine comprises a plurality of banking machines,
   wherein each banking machine includes at least one data reader device,
      wherein the at least one data reader device includes a card reader and a biometric reader,
   wherein each banking machine includes at least one computer,
      wherein the at least one computer is operative during a transaction to
         cause card data to be read from a user card through operation of the card reader, and
         cause biometric data to be read from a user through operation of the biometric reader,
      wherein the at least one computer is operative to cause the read card data to be compared with card information stored in the authorized machine user information data store,
      wherein the at least one computer is operative to cause the read biometric data to be compared with biometric information stored in the authorized machine user information data store,
   wherein a customer is authorized to request the cash dispense transaction responsive at least in part to both
      computer-determined correspondence between the read card data and stored card information, and
      computer-determined correspondence between the read biometric data and stored biometric information.

3. An automated banking machine including:
   a currency note reader assembly,
      wherein the currency note reader assembly includes an assembly opening sized to receive at least one currency note therethrough,
      wherein the currency note reader assembly includes a currency note validator,
   an enclosure, wherein the enclosure includes:
      a plurality of walls and an interior area,
         wherein a wall of the plurality of walls includes a currency slot,
            wherein the currency slot is sized to receive at least one currency note therethrough,
      slides mounted in the interior area,
      a movable tray in operatively sliding and supported connection with the slides,
         wherein the tray is movable with respect to the slides between a tray retracted position and a tray extended position,
            wherein in the tray retracted position, the tray is located inside of the interior area,
            wherein in the tray extended position, at least part of the tray is located outside of the interior area,
      a component rack supported by the tray,
         wherein tray support of the rack causes the rack to move with the tray when the tray moves with respect to the slides,
         wherein the rack supports the currency note reader assembly,
         wherein the rack is configured to support a removable currency cassette in a cassette position adjacent to the validator,
         wherein the rack while supporting the cassette and the validator, is movable with the tray between the tray extended position and the tray retracted position,
         wherein the rack while supporting the cassette and the validator, is pivotable relative to the tray about an axis between a service orientation and an operation orientation,
            wherein with the rack in the service orientation and with the tray in the tray extended position, the cassette position is accessible by a machine servicer,
            wherein with the rack in the operation orientation and with the tray in the tray retracted position, the assembly opening is in a location adjacent to the currency slot,
               wherein the location allows the cassette to receive currency notes validated by the validator which were received through the currency slot.

4. The apparatus according to claim 3
   wherein the tray includes opposed sides,
      wherein at least one side includes a curved slot,
         wherein the curved slot is bounded by at least one closed end,
         wherein the curved slot is radially spaced from the axis,
   wherein the rack includes a guide projection,
      wherein the guide projection extends into the curved slot,
      wherein daring pivoting of the rack, the guide projection moves relative to the curved slot,
   wherein pivoting of the rack is limited in at least one pivot direction by contact of the guide projection with the at least one closed end.

5. The apparatus according to claim 4 wherein during rack pivot from the operation orientation to the service orientation, the rack pivots an angle that is greater than 90 degrees.

6. A currency note validator assembly arrangement including:
   a pivotable rack configured to engagingly support a currency note validator assembly including a note validator and an assembly opening sized to receive at least one currency note therethrough,
      wherein the rack is in engagement with and supported by a movable tray,
         wherein the engagement causes the rack to move with the tray,
      wherein the rack is pivotable relative to the tray about a substantially horizontal axis,
      wherein the tray includes a first tray end,
      wherein the tray is supported by a tray support including a first support end,
      wherein the tray while being supported by the tray support, is horizontally movable relative to the tray support between a tray retracted position and a tray extended position,
         wherein with the tray in the tray extended position, the first tray end is located horizontally beyond the first support end,
         wherein with the tray in the tray retracted position, the first tray end is not located horizontally beyond the first support end,
      wherein the rack is configured to engagingly support a removable currency cassette in a position adjacent to the note validator, wherein the position allows the cassette to receive from the note validator, currency notes deemed valid by the note validator,
wherein the rack when loaded supports the cassette and the currency note validator assembly including the note validator,
wherein the loaded rack is movable with the tray between the tray extended position and the tray retracted position,
wherein the loaded rack is pivotable about the axis between a validator service orientation and a validator operation orientation,
wherein when the loaded rack is in the validator service orientation and the tray is in the tray extended position, the validator and cassette are manually accessible by a service person,
wherein when the loaded rack is in the validator operation orientation and the tray is in the tray retracted position, the currency note validator assembly is operationally positioned to receive currency notes through the assembly opening and to move currency notes deemed valid by the note validator to the cassette.

7. The apparatus according to claim 6 and further comprising an automated banking machine operative responsive to data bearing records to cause financial transactions to be carried out,
wherein the automated banking machine includes:
the loaded rack,
wherein the loaded rack is supporting the currency note validator assembly and the cassette,
a cash dispenser,
wherein the cash dispenser is operative to cause stored cash to be dispensed,
a card reader,
wherein the card reader is operative to read from user cards, card data corresponding to financial accounts,
at least one computer,
wherein the at least one computer is in operative connection with the card reader, the cash dispenser, and the note validator,
wherein the at least one computer is operative to allow a machine user to request a cash dispense transaction responsive at least in part on card data read by the card reader being recognized as corresponding to an authorized user of the machine.

8. The apparatus according to claim 7 wherein the automated banking machine includes an enclosure,
wherein the enclosure includes:
a plurality of walls and an interior area,
wherein a wall of the plurality of walls includes a currency slot,
wherein the currency slot is sized to receive at least one currency note therethrough,
an access opening to the interior area,
wherein the tray support comprises slides mounted in the interior area,
wherein the tray is slidably movable with respect to the slides,
a door movable between a closed position that covers the access opening and an open position,
wherein when the door is in the open position, the tray is movable between the tray retracted position and the tray extended position,
wherein in the tray retracted position, the tray is located inside of the interior area,
wherein in the tray extended position, at least part of the tray is located outside of the interior area,
wherein when the door is in the closed position the tray is prevented from moving between the tray retracted position and the tray extended position,
wherein when the loaded rack is in the validator operation orientation and the tray is in the tray retracted position, the assembly opening is substantially aligned with the currency slot.

9. The apparatus according to claim 6 and further comprising an enclosure,
wherein the enclosure includes:
a plurality of walls and an interior area,
wherein a wall of the plurality of walls includes a currency slot,
wherein the currency slot is sized to receive at least one currency note therethrough,
slides mounted in the interior area,
wherein the tray is in operatively sliding and supported connection with the slides,
wherein the tray is movable with respect to the slides between the tray retracted position and the tray extended position,
wherein in the tray retracted position, the tray is located inside the interior area,
wherein in the tray extended position, at least part of the tray is located outside the interior area,
wherein when the loaded rack is in the validator operation orientation and the tray is in the tray retracted position, the assembly opening is positioned adjacent to the currency slot.

10. The apparatus according to claim 9 and further comprising
an access opening to the interior area,
a door movable between a closed position that covers the access opening and an open position,
wherein when the door is in the open position, the tray is movable between the tray retracted position and the tray extended position,
wherein when the door is in the closed position, the tray is prevented from moving between the tray retracted position and the tray extended position.

11. The apparatus according to claim 6
wherein the enclosure includes a currency slot that is sized to receive at least one currency note therethrough,
wherein the tray moves in a first direction from the tray retracted position to the tray extended position,
wherein when the loaded rack is in the validator service orientation and the tray is in the tray extended position, the cassette is slidably removable from the rack in a direction that is transverse to the first direction,
wherein when the loaded rack is in the validator operation orientation and the tray is in the tray retracted position, the assembly opening is substantially aligned with the currency slot.

12. The apparatus according to claim 6 and further comprising a first latch mechanism,
wherein the first latch mechanism includes a first latch,
wherein pivoting of the rack from the validator service orientation to the validator operation orientation causes the first latch to move to a locking position with respect to the rack,
wherein while in the locking position, the first latch prevents the rack from pivoting from the validator operation orientation to the validator service orientation, wherein the first latch is manually movable from the locking position to an unlocked position, wherein manual movement of the first latch from the locking position to the unlocked position allows the rack to be pivoted from the validator operation orientation to the validator service orientation.

13. The apparatus according to claim 12 and further comprising a second latch mechanism, wherein the second latch mechanism includes a second latch, wherein movement of the tray from the tray extended position to the tray retracted position causes the second latch to move to a locking position with respect to the tray, wherein while in the locking position, the second latch prevents the tray from moving from the tray refracted position to the tray extended position, wherein the second latch is manually movable from the locking position to an unlocked position, wherein manual movement of the second latch from the locking position to the unlocked position allows the tray to be moved from the tray retracted position to the tray extended position.

14. The apparatus according to claim 6 wherein during rack pivot from the validator operation orientation to the validator service orientation, the rack angularly pivots at least 90 degrees.

15. The apparatus according to claim 14 wherein during rack pivot from the validator operation orientation to the validator service orientation, the rack angularly pivots between 90 degrees and 180 degrees.

16. The apparatus according to claim 6
wherein the tray includes opposed sides,
   wherein at least one side includes a curved slot,
      wherein the curved slot is bounded by at least one closed end,
      wherein the curved slot is radially spaced from the axis,
   wherein the rack includes a guide projection,
      wherein the guide projection extends into the curved slot,
      wherein during pivoting of the rack, the guide projection moves relative to the curved slot,
   wherein pivoting of the rack is limited in at least one pivot direction by contact of the guide projection with the at least one closed end.

17. The apparatus according to claim 16
wherein the rack includes opposed rack sides,
   wherein each rack side has a respective pivot member extending outward therefrom,
   wherein each pivot member extends along the axis,
wherein each side of the tray has an side opening therein,
   wherein each pivot member extends through a respective side opening,
   wherein each pivot member is able to rotate relative to a respective side opening,
      wherein rotation of the pivot members relative to the respective side openings causes the rack to pivot relative to the tray.

18. The apparatus according to claim 6
wherein the tray includes opposed tray sides,
wherein the tray includes an open bottom section between the opposed tray sides,
   wherein in the validator service orientation, a portion of the rack extends through the open bottom section and is vertically lower than the tray,
   wherein in the validator operation orientation, the portion of the rack does not extend through the open bottom section.

19. The apparatus according to claim 6
wherein the tray is in the tray retracted position,
wherein the loaded rack is in the validator operation orientation,
   wherein the loaded rack is supporting the note validator and the cassette.

20. The apparatus according to claim 6
wherein the tray is in the tray extended position,
wherein the loaded rack is in the validator service orientation,
   wherein the loaded rack is supporting the currency note validator assembly.

* * * * *